United States Patent
Ko et al.

(10) Patent No.: US 12,058,358 B2
(45) Date of Patent: Aug. 6, 2024

(54) VIDEO SIGNAL PROCESSING METHOD AND APPARATUS USING ADAPTIVE MOTION VECTOR RESOLUTION

(71) Applicant: WILUS INSTITUTE OF STANDARDS AND TECHNOLOGY INC., Seongnam-si (KR)

(72) Inventors: Geonjung Ko, Seoul (KR); Dongcheol Kim, Suwon-Si (KR); Juhyung Son, Uiwang-Si (KR); Jaehong Jung, Seoul (KR); Jinsam Kwak, Uiwang-si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 151 days.

(21) Appl. No.: 17/512,584

(22) Filed: Oct. 27, 2021

(65) Prior Publication Data
US 2022/0053206 A1 Feb. 17, 2022

Related U.S. Application Data

(63) Continuation of application No. PCT/KR2020/005830, filed on May 4, 2020.

(30) Foreign Application Priority Data

Apr. 30, 2019 (KR) .................. 10-2019-0050960
May 15, 2019 (KR) .................. 10-2019-0057185
May 17, 2019 (KR) .................. 10-2019-0057650

(51) Int. Cl.
*H04N 19/46* (2014.01)
*H04N 19/105* (2014.01)
(Continued)

(52) U.S. Cl.
CPC .......... *H04N 19/46* (2014.11); *H04N 19/105* (2014.11); *H04N 19/137* (2014.11); *H04N 19/159* (2014.11); *H04N 19/176* (2014.11)

(58) Field of Classification Search
None
See application file for complete search history.

(56) References Cited

U.S. PATENT DOCUMENTS

2018/0077417 A1* 3/2018 Huang ................ H04N 19/70
2018/0098089 A1* 4/2018 Chen .................. H04N 19/136
(Continued)

FOREIGN PATENT DOCUMENTS

WO 2017-157259 9/2017
WO 2019-066574 4/2019
(Continued)

OTHER PUBLICATIONS

Chen J et al: "Algorithm description for Versatile Video Coding and Test Modle 4 (VTM 4)", 125. MPEG Meeting; Jan. 14, 2019-Jan. 18, 2019; Marrakech; (Motion Picture Expert Group or ISO/IEC JTC1/SC29/WG11), Mar. 19, 2019.
(Continued)

*Primary Examiner* — Talha M Nawaz
(74) *Attorney, Agent, or Firm* — BROADVIEW IP LAW, PC

(57) ABSTRACT

The present disclosure relates to a method and apparatus for processing a video signal and, more specifically, comprises the steps of: parsing, from a bitstream, an adaptive motion vector resolution (AMVR) enabled flag (sps_amvr_enabled_ flag) indicating whether or not adaptive motion vector differential resolution is used; parsing, from the bitstream, an affine enabled flag (sps_affine_enabled_flag) indicating whether or not affine motion compensation is usable; on the basis of the affine enabled flag, determining
(Continued)

| mvd_coding( x0, y0, refList ) { | Descriptor |
|---|---|
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | | whether or not the affine motion compensation is usable; when the affine motion compensation is usable, determining, on the basis of the AMVR enabled flag, whether or not the adaptive motion vector differential resolution is used; and, when the adaptive motion vector differential resolution is used, parsing, from the bitstream, an affine AMVR enabled flag (sps_affine_amvr_enabled flag) indicating whether or not the adaptive motion vector differential resolution is usable for the affine motion compensation.

20 Claims, 46 Drawing Sheets

(51) Int. Cl.
  *H04N 19/137* (2014.01)
  *H04N 19/159* (2014.01)
  *H04N 19/176* (2014.01)

(56) References Cited

U.S. PATENT DOCUMENTS

| | | | | |
|---|---|---|---|---|
| 2018/0359483 | A1* | 12/2018 | Chen | H04N 19/44 |
| 2019/0320195 | A1* | 10/2019 | Lim | H04N 19/119 |
| 2020/0213612 | A1* | 7/2020 | Liu | H04N 19/159 |
| 2020/0296408 | A1* | 9/2020 | Kim | H04N 19/463 |
| 2021/0044833 | A1* | 2/2021 | Yang | H04N 19/184 |
| 2022/0046270 | A1* | 2/2022 | Kim | H04N 19/463 |

FOREIGN PATENT DOCUMENTS

| | | |
|---|---|---|
| WO | 2020/058888 A1 | 3/2020 |
| WO | 2020/181250 A1 | 9/2020 |
| WO | 2021/136747 A1 | 7/2021 |

OTHER PUBLICATIONS

Ko (Wilusgroup) G et al: "Non-CE4: Cleanup for affine AMVR enabling flag in SPS level", 127. MPEG Meeting; Jul. 8, 2019-Jul. 12, 2019; Gothenburg; (Motion Picture Expert Group or ISO/IEC JTC1/SC29/WG11), Jun. 25, 2019.

Naser (Interdigital) K et al: "Non-CE: Clean-up of High-Level Syntax Related to AMVR", 17. JVET Meeting; Jan. 7, 2020-Jan. 17, 2020; Brussels; (The Joint Video Exploration Team of ISO/IEC JTC1/SC29/WG11 and ITU-T SG.16), JVET-Q0444; Jan. 9, 2020.

Extended European Search Report for EP20798098 by European Patent Office dated Jun. 3, 2022.

Non-Final Office Action for IN202127049163 by Intellectual Property India dated Jul. 8, 2022.

Liu H et al: "CE2: Adaptive Motion Vector Resolution for Affine Inter Mode (Test 2.1.2)" MPEG Meeting; Jan. 14, 2019-Jan. 18, 2019; Marrakech; (Motion Picture Expert Group or ISO/IEC JTC1/SC29/WG11), Jan. 2, 2019.

Li X et al: "CE4-related: Signaling of maximum number of triangle candidates" Mar. 19, 2019-Mar. 27, 2019; Geneva; (The Joint Video Exploration Team of ISO/IEC JTC1/SC29/WG11 and ITU-T SG.16), JVET-N0400; Mar. 23, 2019.

Chang Y et al: "Non-CE4: On triangle merge mode" Mar. 19, 2019-Mar. 27, 2019; Geneva; (The Joint Video Exploration Team of ISO/IEC JTC1/SC29/WG11 and ITU-T SG.16), JVET-N0447; Mar. 13, 2019.

Solovyev T et al: "Non-CE4: Restrictions on triangular merge list size" Mar. 19, 2019-Mar. 27, 2019; Geneva; (The Joint Video Exploration Team of ISO/IEC JTC1/SC29/WG11 and ITU-T SG.16), JVET-N0500; Mar. 13, 2019.

Hsu C et al: "CE4-related: On merge list construction" Mar. 19, 2019-Mar. 27, 2019; Geneva; (The Joint Video Exploration Team of ISO/IEC JTC1/SC29/WG11 and ITU-T SG.16), JVET-N0851; Mar. 24, 2019.

Bross, Benjamin et al. Versatile Video Coding (Draft 5). Joint Video Experts Team (JVET) of ITU-T SG 16 WP 3 and ISO/IEC JTC 1/SC 29/WG 11. 14th Meeting: Geneva, CH. pp. 1-394, Mar. 27, 2019, pp. 1, 33-35, 44, 57-58, 81-82, 100.

Notice of Reasons for Refusal for JP2021-564599 by Japan Patent Office dated Dec. 21, 2022.

International Search Report & Written Opinion of the International Searching Authority dated Jul. 29, 2020.

* cited by examiner

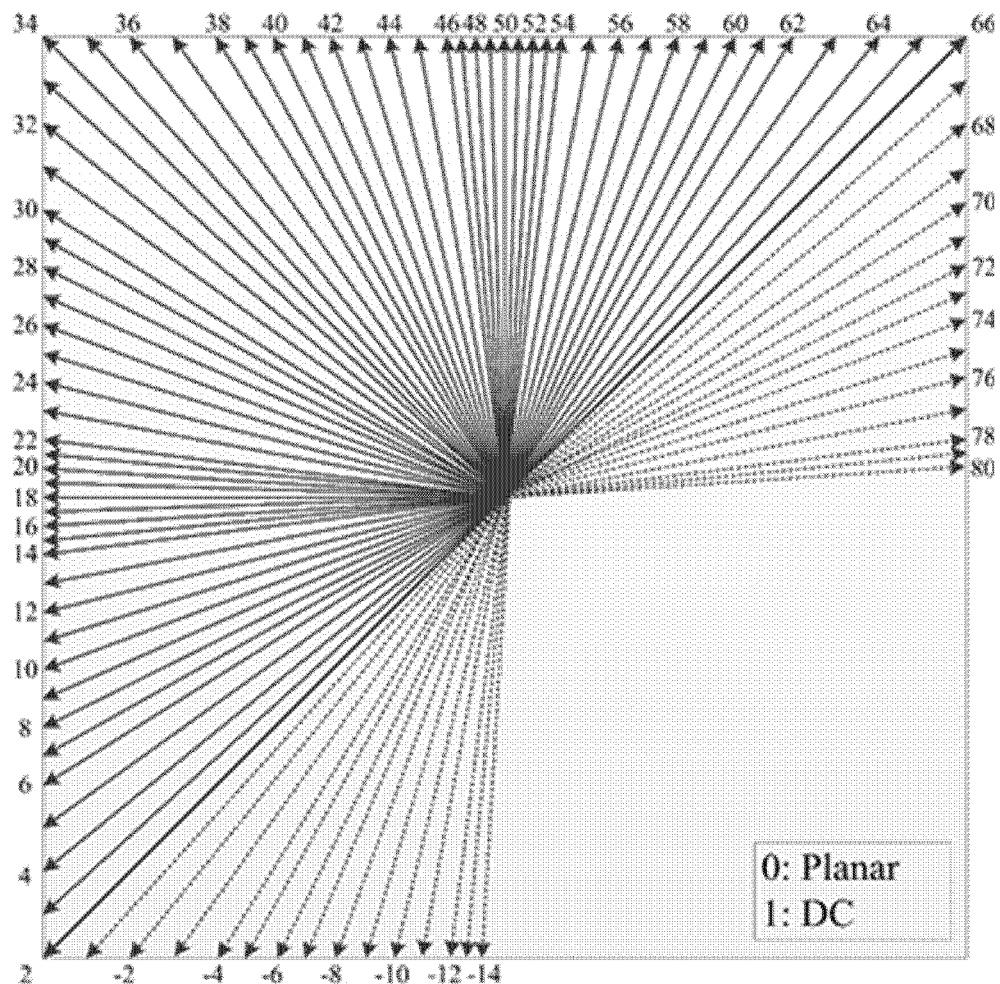
FIG. 7
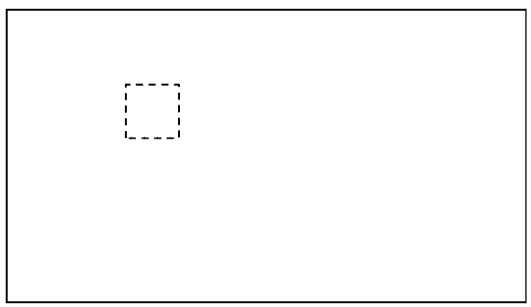 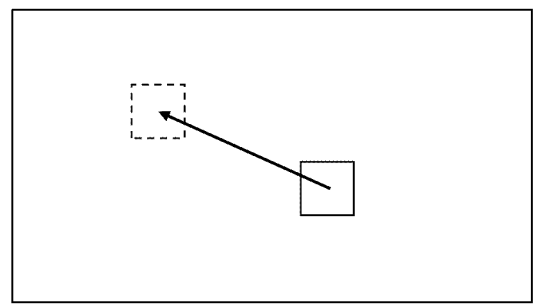
FIG. 8

| mvd_coding( x0, y0, refList ) { | Descriptor |
|---|---|
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

*Case 1*
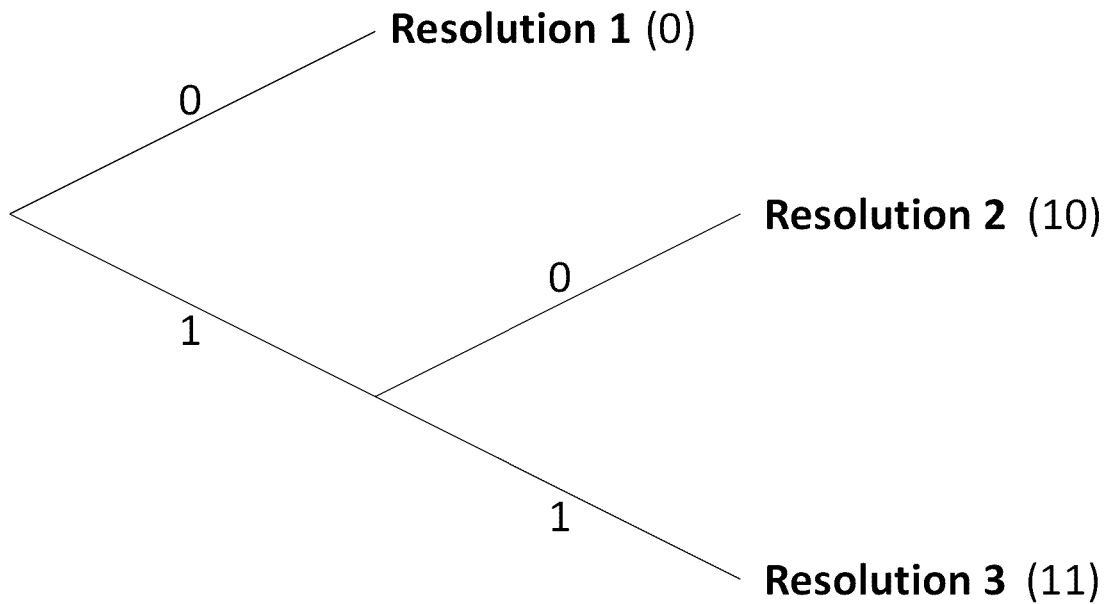
*Case 2*
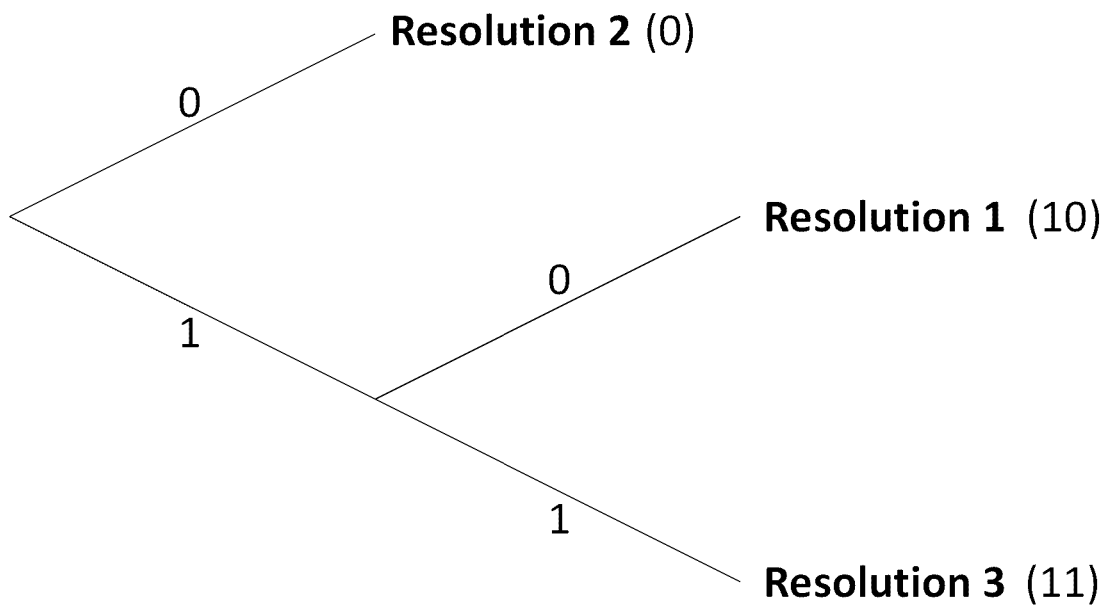
FIG. 12

(a)
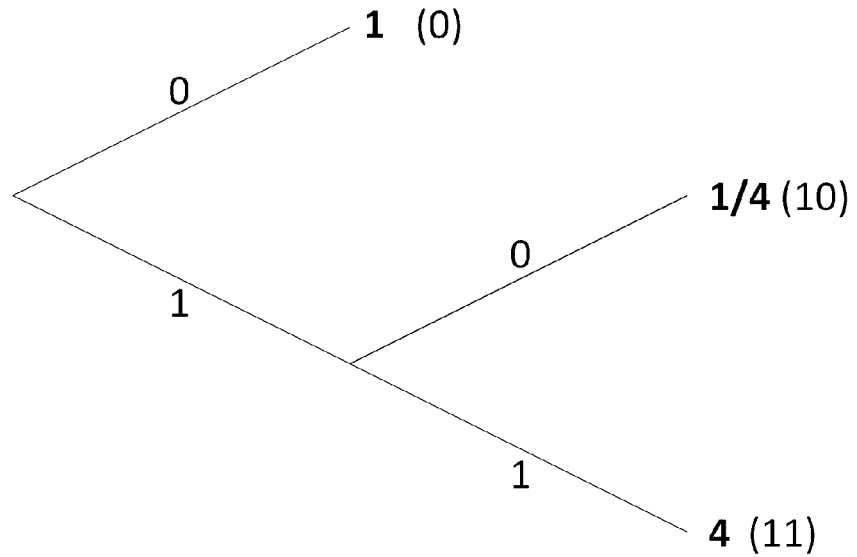
(b)
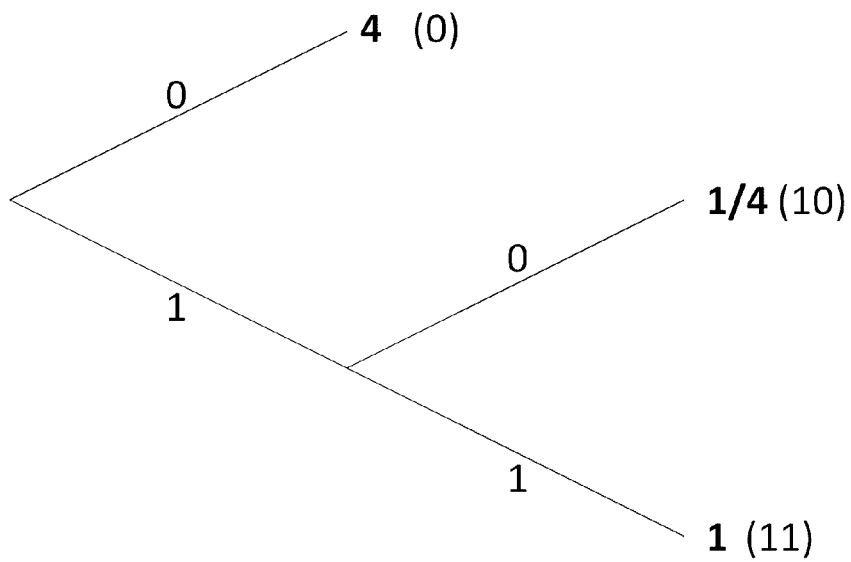
FIG. 13

*Case 1*
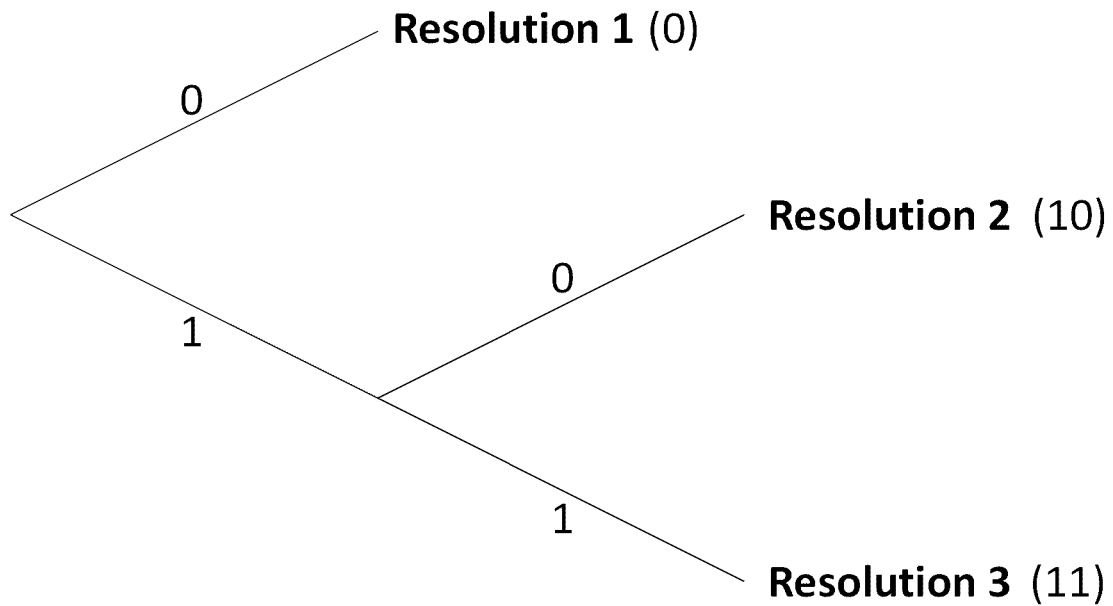
*Case 2*
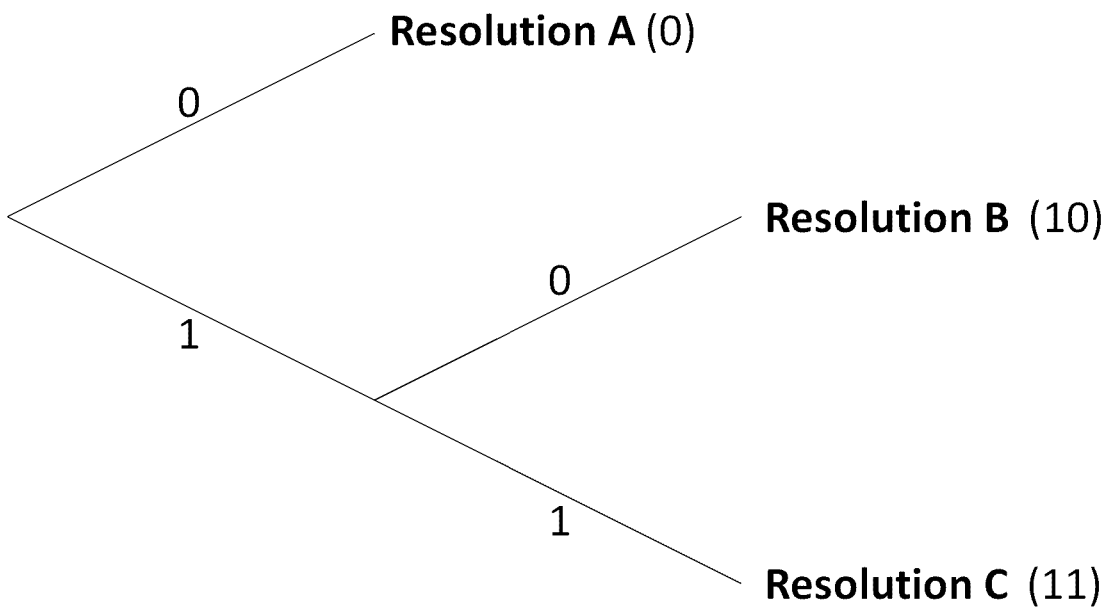
FIG. 14

MVP candidates
- Candidate 1
- Candidate 2
- ...
- Candidate N
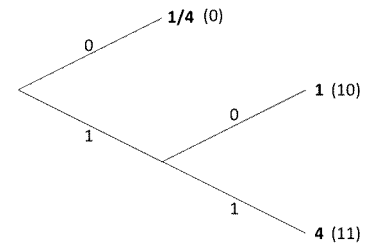
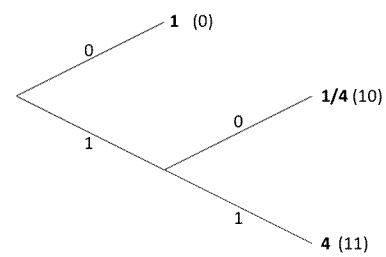
FIG. 15
MVP candidates
- Candidate 1
- Candidate 2
- ...
- Candidate N
  (temporal candidate, zero motion vector, non-adjacent spatial candidate, or w/ or w/o refinement)
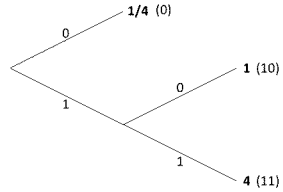
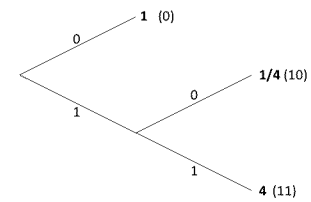
FIG. 16

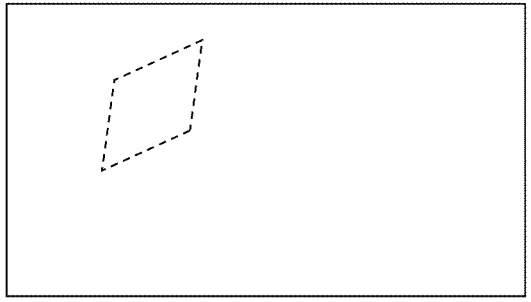
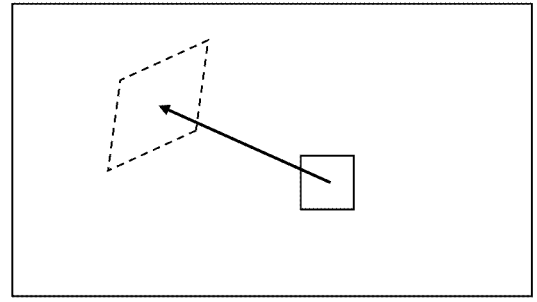
FIG. 17
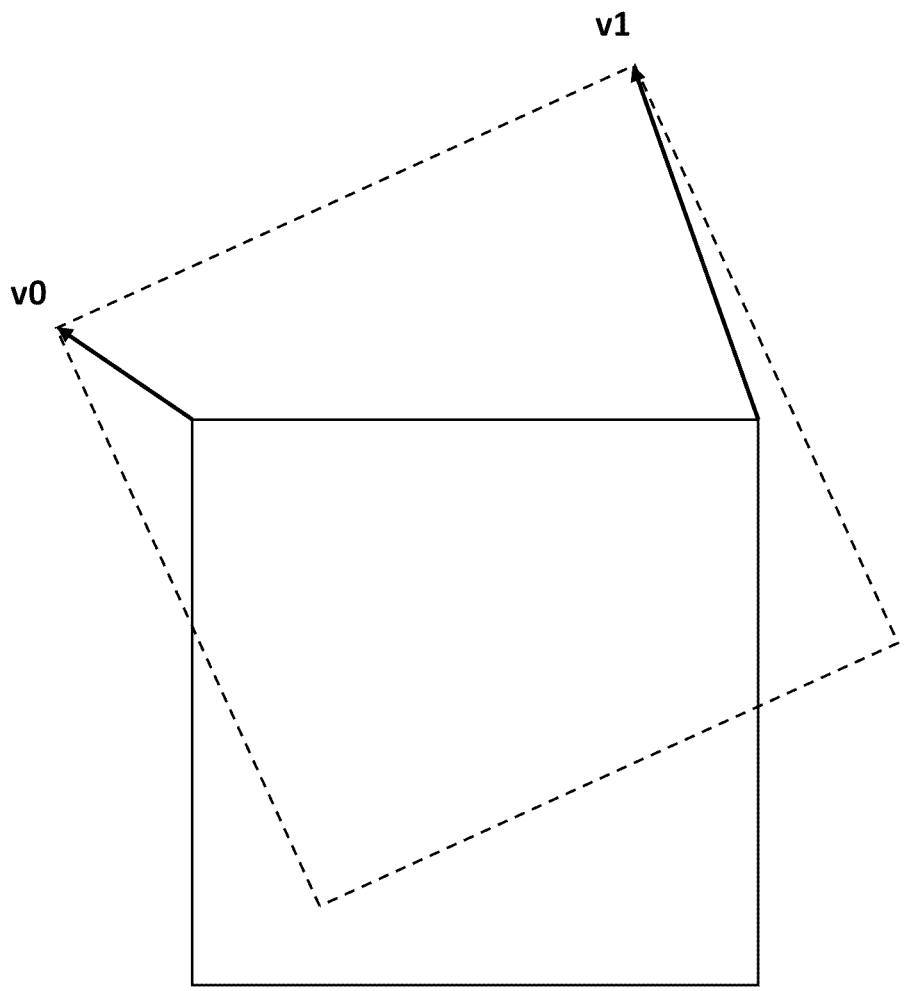
FIG. 18

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases}$$

$$mv^x = \frac{(mv_1^x - mv_0^x)}{w}x + \frac{(mv_2^x - mv_0^x)}{h}y + mv_0^x$$

$$mv^y = \frac{(mv_1^y - mv_0^y)}{w}x + \frac{(mv_2^y - mv_0^y)}{h}y + mv_0^y$$

FIG. 21

(a)
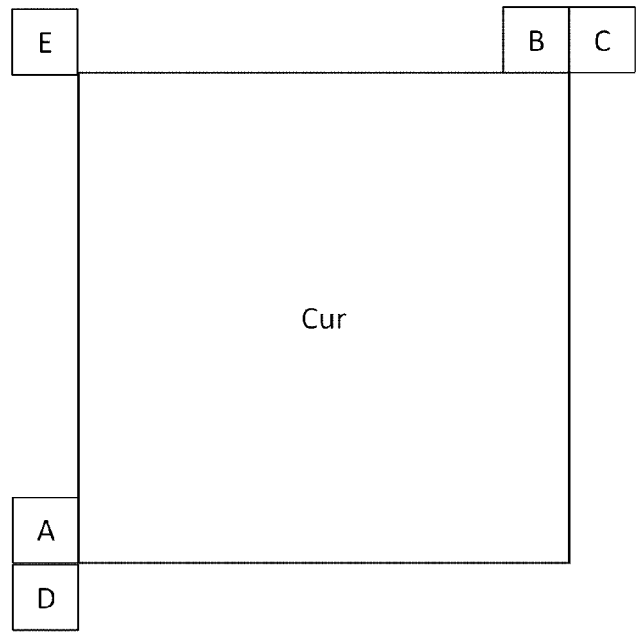
(b)
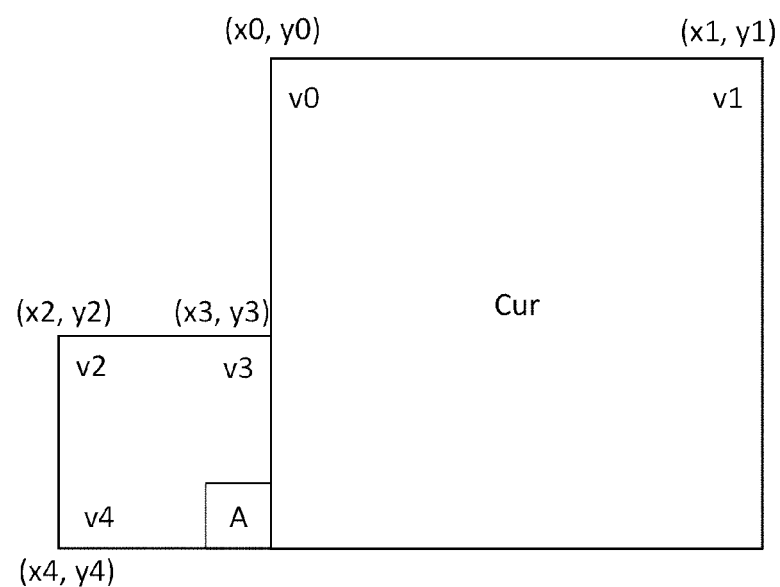
FIG. 24

$$\begin{cases} v_{0x} = \dfrac{(v_{E1x} - v_{E0x})}{(x_{E1} - x_{E0})}(x_0 - x_{E0}) + \dfrac{(v_{E2x} - v_{E0x})}{(y_{E2} - y_{E0})}(y_0 - y_{E0}) + v_{E0x} \\ v_{0y} = \dfrac{(v_{E1y} - v_{E0y})}{(x_{E1} - x_{E0})}(x_0 - x_{E0}) + \dfrac{(v_{E2y} - v_{E0y})}{(y_{E2} - y_{E0})}(y_0 - y_{E0}) + v_{E0y} \end{cases}$$

$$\begin{cases} v_{1x} = \dfrac{(v_{E1x} - v_{E0x})}{(x_{E1} - x_{E0})}(x_1 - x_{E0}) + \dfrac{(v_{E2x} - v_{E0x})}{(y_{E2} - y_{E0})}(y_1 - y_{E0}) + v_{E0x} \\ v_{1y} = \dfrac{(v_{E1y} - v_{E0y})}{(x_{E1} - x_{E0})}(x_1 - x_{E0}) + \dfrac{(v_{E2y} - v_{E0y})}{(y_{E2} - y_{E0})}(y_1 - y_{E0}) + v_{E0y} \end{cases}$$

- If only $\overline{mv}_0$ and $\overline{mv}_1$ can be found, $\overline{mv}_2$ is derived as:

$$\overline{mv}_2^x = \overline{mv}_0^x - h\frac{(\overline{mv}_1^y - \overline{mv}_0^y)}{w}, \overline{mv}_2^y = \overline{mv}_0^y + h\frac{(\overline{mv}_1^x - \overline{mv}_0^x)}{w},$$

where the current block size is $W \times H$.

- If only $\overline{mv}_0$ and $\overline{mv}_2$ can be found, $\overline{mv}_1$ is derived as:

$$\overline{mv}_1^x = \overline{mv}_0^x + h\frac{(\overline{mv}_2^y - \overline{mv}_0^y)}{w}, \overline{mv}_1^y = \overline{mv}_0^y - h\frac{(\overline{mv}_2^x - \overline{mv}_0^x)}{w}.$$

FIG. 28

(a)
$$mv_0 = \overline{mv}_0 + mvd_0$$
$$mv_1 = \overline{mv}_1 + mvd_1$$

(b)
$$mv_0 = \overline{mv}_0 + mvd_0$$
$$mv_1 = \overline{mv}_1 + mvd_1$$
$$mv_2 = \overline{mv}_2 + mvd_2$$

FIG. 29 lMvd[ compIdx ] = abs_mvd_greater0_flag[ compIdx ] *
    ( abs_mvd_minus2[ compIdx ] + 2 ) * ( 1 − 2 * mvd_sign_flag[ compIdx ] )

- If refList is equal to 0, MvdL0[ x0 ][ y0 ][ compIdx ] is set equal to lMvd[ compIdx ] for compIdx = 0..1.
- Otherwise (refList is equal to 1), MvdL1[ x0 ][ y0 ][ compIdx ] is set equal to lMvd[ compIdx ] for compIdx = 0..1.

$$mv_0 = \overline{mv}_0 + mvd_0$$
$$mv_1 = \overline{mv}_1 + mvd_1 + mvd_0$$

(b)

$$mv_0 = \overline{mv}_0 + mvd_0$$
$$mv_1 = \overline{mv}_1 + mvd_1 + mvd_0$$
$$mv_2 = \overline{mv}_2 + mvd_2 + mvd_0$$

FIG. 31 lMvd[ cpIdx ][ compIdx ] = abs_mvd_greater0_flag[ cpIdx ][ compIdx ] *
  ( abs_mvd_minus2[ cpIdx ][ compIdx ] + 2 ) * ( 1 − 2 * mvd_sign_flag[ cpIdx ][ compIdx ] )

If cpIdx is equal to 0, MvdLX[x0][y0][cpIdx][compIdx] is set equal to lMvd[cpIdx][compIdx]

Otherwise, MvdLX[x0][y0][cpIdx][compIdx] is set equal to lMvd[cpIdx][compIdx] + lMvd[0][compIdx]

FIG. 32

| mvd_coding( x0, y0, refList , cpIdx ) { | Descriptor |
|---|---|
| abs_mvd_greater0_flag[cpIdx][ 0 ] | ae(v) |
| abs_mvd_greater0_flag[cpIdx][ 1 ] | ae(v) |
| if( abs_mvd_greater0_flag[cpIdx][ 0 ] ) | |
|   abs_mvd_greater1_flag[cpIdx][ 0 ] | ae(v) |
| if( abs_mvd_greater0_flag[cpIdx][ 1 ] ) | |
|   abs_mvd_greater1_flag[cpIdx][ 1 ] | ae(v) |
| if( abs_mvd_greater0_flag[cpIdx][ 0 ] ) { | |
|   if( abs_mvd_greater1_flag[cpIdx][ 0 ] ) | |
|     abs_mvd_minus2[cpIdx][ 0 ] | ae(v) |
|   mvd_sign_flag[cpIdx][ 0 ] | ae(v) |
| } | |
| if( abs_mvd_greater0_flag[cpIdx][ 1 ] ) { | |
|   if( abs_mvd_greater1_flag[cpIdx][ 1 ] ) | |
|     abs_mvd_minus2[cpIdx][ 1 ] | ae(v) |
|   mvd_sign_flag[cpIdx][ 1 ] | ae(v) |
| } | |
| } | |

FIG. 33

| | Descriptor |
|---|---|
| seq_parameter_set_rbsp( ) { | |
| // ... | |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_affine_amvr_enabled_flag | u(1) |
|   sps_dmvr_enabled_flag | u(1) |
|   sps_cclm_enabled_flag | u(1) |
|   if( sps_cclm_enabled_flag && chroma_format_idc == 1 ) | |
|     sps_cclm_colocated_chroma_flag | u(1) |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
|   sps_sbt_enabled_flag | u(1) |
|   if( sps_sbt_enabled_flag ) | |
|     sps_sbt_max_size_64_flag | u(1) |
|   sps_affine_enabled_flag | u(1) |
|   if( sps_affine_enabled_flag ) | |
|     sps_affine_type_flag | u(1) |
|   sps_gbi_enabled_flag | u(1) |
|   sps_ibc_enabled_flag | u(1) |
|   sps_ciip_enabled_flag | u(1) |
|   sps_fpel_mmvd_enabled_flag | u(1) |
|   sps_triangle_enabled_flag | u(1) |
|   sps_lmcs_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

FIG. 34

| | |
|---|---|
| } else if( treeType != DUAL_TREE_CHROMA ) { /* MODE_INTER or MODE_IBC */ | |
|   if( cu_skip_flag[ x0 ][ y0 ] == 0 ) | |
|     merge_flag[ x0 ][ y0 ] | ae(v) |
|   if( merge_flag[ x0 ][ y0 ] ) { | |
|     merge_data( x0, y0, cbWidth, cbHeight ) | |
|   } else if ( CuPredMode[ x0 ][ y0 ] == MODE_IBC ) { | |
|     mvd_coding( x0, y0, 0, 0 ) | |
|     mvp_l0_flag[ x0 ][ y0 ] | ae(v) |
|     if( sps_amvr_enabled_flag && | |
|       ( MvdL0[ x0 ][ y0 ][ 0 ] != 0 \|\| MvdL0[ x0 ][ y0 ][ 1 ] != 0 ) ) { | |
|       amvr_precision_flag[ x0 ][ y0 ] | ae(v) |
|     } | |
|   } else { | |
|     if( slice_type == B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
| // sym_mvd_flag[ x0 ][ y0 ], ref_idx_l0[ x0 ][ y0 ], mvd_coding, mvp_l0_flag[ x0 ][ y0 ], ref_idx_l1[ x0 ][ y0 ], mvp_l1_flag[ x0 ][ y0 ] | |
|     if( ( sps_amvr_enabled_flag && inter_affine_flag == 0 && | |
|       ( MvdL0[ x0 ][ y0 ][ 0 ] != 0 \|\| MvdL0[ x0 ][ y0 ][ 1 ] != 0 \|\| | |
|       MvdL1[ x0 ][ y0 ][ 0 ] != 0 \|\| MvdL1[ x0 ][ y0 ][ 1 ] != 0 ) ) \|\| | |
|       ( sps_affine_amvr_enabled_flag && inter_affine_flag[ x0 ][ y0 ] == 1 && | |
|       ( MvdCpL0[ x0 ][ y0 ][ 0 ][ 0 ] != 0 \|\| MvdCpL0[ x0 ][ y0 ][ 0 ][ 1 ] != 0 \|\| | |
|       MvdCpL1[ x0 ][ y0 ][ 0 ][ 0 ] != 0 \|\| MvdCpL1[ x0 ][ y0 ][ 0 ][ 1 ] != 0 \|\| | |
|       MvdCpL0[ x0 ][ y0 ][ 1 ][ 0 ] != 0 \|\| MvdCpL0[ x0 ][ y0 ][ 1 ][ 1 ] != 0 \|\| | |
|       MvdCpL1[ x0 ][ y0 ][ 1 ][ 0 ] != 0 \|\| MvdCpL1[ x0 ][ y0 ][ 1 ][ 1 ] != 0 \|\| | |
|       MvdCpL0[ x0 ][ y0 ][ 2 ][ 0 ] != 0 \|\| MvdCpL0[ x0 ][ y0 ][ 2 ][ 1 ] != 0 \|\| | |
|       MvdCpL1[ x0 ][ y0 ][ 2 ][ 0 ] != 0 \|\| MvdCpL1[ x0 ][ y0 ][ 2 ][ 1 ] != 0 ) ) { | |
|       amvr_flag[ x0 ][ y0 ] | ae(v) |
|       if( amvr_flag[ x0 ][ y0 ] ) | |
|         amvr_precision_flag[ x0 ][ y0 ] | ae(v) |
|     } | |
|     if( sps_gbi_enabled_flag && inter_pred_idc[ x0 ][ y0 ] == PRED_BI && | |
|       luma_weight_l0_flag[ ref_idx_l0 [ x0 ][ y0 ] ] == 0 && | |
|       luma_weight_l1_flag[ ref_idx_l1 [ x0 ][ y0 ] ] == 0 && | |
|       chroma_weight_l0_flag[ ref_idx_l0 [ x0 ][ y0 ] ] == 0 && | |
|       chroma_weight_l1_flag[ ref_idx_l1 [ x0 ][ y0 ] ] == 0 && | |
|       cbWidth * cbHeight >= 256 ) | |
|       gbi_idx[ x0 ][ y0 ] | ae(v) |
|   } | |
| } | |

FIG. 35

| seq_parameter_set_rbsp( ) { | Descriptor |
|---|---|
| // ... | |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   sps_dmvr_enabled_flag | u(1) |
|   sps_cclm_enabled_flag | u(1) |
|   if( sps_cclm_enabled_flag && chroma_format_idc == 1 ) | |
|     sps_cclm_colocated_chroma_flag | u(1) |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
|   sps_sbt_enabled_flag | u(1) |
|   if( sps_sbt_enabled_flag ) | |
|     sps_sbt_max_size_64_flag | u(1) |
|   sps_affine_enabled_flag | u(1) |
|   if( sps_affine_enabled_flag ) { | |
|     sps_affine_type_flag | u(1) |
|     sps_affine_amvr_enabled_flag | u(1) |
|   } | |
|   sps_gbi_enabled_flag | u(1) |
|   sps_ibc_enabled_flag | u(1) |
|   sps_ciip_enabled_flag | u(1) |
|   sps_fpel_mmvd_enabled_flag | u(1) |
|   sps_triangle_enabled_flag | u(1) |
|   sps_lmcs_enabled_flag | u(1) |
|   sps_ladf_enabled_flag | u(1) |
|   if ( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

| seq_parameter_set_rbsp( ) { | Descriptor |
|---|---|
| // ... | |
| sps_amvr_enabled_flag | u(1) |
| if ( sps_amvr_enabled_flag ) | |
|    sps_affine_amvr_enabled_flag | u(1) |
| // ... | |
| sps_affine_enabled_flag | u(1) |
| if( sps_affine_enabled_flag ) | |
|    sps_affine_type_flag | u(1) |
| // ... | |
| } | |

(b)

| seq_parameter_set_rbsp( ) { | Descriptor |
|---|---|
| // ... | |
| sps_amvr_enabled_flag | u(1) |
| // ... | |
| sps_affine_enabled_flag | u(1) |
| if( sps_affine_enabled_flag ) { | |
|    sps_affine_type_flag | u(1) |
|    if ( sps_amvr_enabled_flag ) | |
|      sps_affine_amvr_enabled_flag | u(1) |
| } | |
| // ... | |
| } | |

- 3701 → sps_affine_enabled_flag
- 3702 → sps_affine_type_flag
- 3703 → sps_affine_amvr_enabled_flag
- 4303

| | |
|---|---|
| } else if( treeType != DUAL_TREE_CHROMA ) { /* MODE_INTER or MODE_IBC */ | |
|   if( cu_skip_flag[ x0 ][ y0 ] == 0 ) | |
|     merge_flag[ x0 ][ y0 ] | ae(v) |
|   if( merge_flag[ x0 ][ y0 ] ) { | |
|     merge_data( x0, y0, cbWidth, cbHeight ) | |
|   } else if( CuPredMode[ x0 ][ y0 ] == MODE_IBC ) { //.... | |
|   } else { | |
|     if( slice_type == B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     // sym_mvd_flag[ x0 ][ y0 ], ref_idx_l0[ x0 ][ y0 ], mvd_coding, mvp_l0_flag[ x0 ][ y0 ], ref_idx_l1[ x0 ][ y0 ], mvp_l1_flag[ x0 ][ y0 ] | |
|     if( sps_amvr_enabled_flag && inter_affine_flag == 0 && | |
|       ( ( ( MvdL0[ x0 ][ y0 ][ 0 ] != 0 \|\| MvdL0[ x0 ][ y0 ][ 1 ] != 0 ) && inter_pred_idc != PRED_L1 ) \|\| | |
|       ( ( MvdL1[ x0 ][ y0 ][ 0 ] != 0 \|\| MvdL1[ x0 ][ y0 ][ 1 ] != 0 ) && inter_pred_idc != PRED_L0 ) ) \|\| | |
|       (sps_affine_amvr_enabled_flag && inter_affine_flag[ x0 ][ y0 ] == 1 && | |
|       ( ( ( MvdCpL0[ x0 ][ y0 ][ 0 ][ 0 ] != 0 \|\| MvdCpL0[ x0 ][ y0 ][ 0 ][ 1 ] != 0 ) && inter_pred_idc != PRED_L1 ) \|\| | |
|       ( MvdCpL1[ x0 ][ y0 ][ 0 ][ 0 ] != 0 \|\| MvdCpL1[ x0 ][ y0 ][ 0 ][ 1 ] != 0 ) && inter_pred_idc != PRED_L0 ) \|\| | |
|       ( MvdCpL0[ x0 ][ y0 ][ 1 ][ 0 ] != 0 \|\| MvdCpL0[ x0 ][ y0 ][ 1 ][ 1 ] != 0 ) && inter_pred_idc != PRED_L1 ) \|\| | |
|       ( MvdCpL1[ x0 ][ y0 ][ 1 ][ 0 ] != 0 \|\| MvdCpL1[ x0 ][ y0 ][ 1 ][ 1 ] != 0 ) && inter_pred_idc != PRED_L0 ) \|\| | |
|       ( MvdCpL0[ x0 ][ y0 ][ 2 ][ 0 ] != 0 \|\| MvdCpL0[ x0 ][ y0 ][ 2 ][ 1 ] != 0 ) && (inter_pred_idc != PRED_L1 && MotionModelIdc[ x0 ][ y0 ] == 2 ) ) \|\| | |
|       ( MvdCpL1[ x0 ][ y0 ][ 2 ][ 0 ] != 0 \|\| MvdCpL1[ x0 ][ y0 ][ 2 ][ 1 ] != 0 ) && (inter_pred_idc != PRED_L0 && MotionModelIdc[ x0 ][ y0 ] == 2 ) ) ) { | |
|       amvr_flag[ x0 ][ y0 ] | ae(v) |
|       if( amvr_flag[ x0 ][ y0 ] ) | |
|         amvr_precision_flag[ x0 ][ y0 ] | ae(v) |
|     } | |
|     // .... | |
|   } | | abs_mvd_greater0_flag[ compIdx ] specifies whether the absolute value of a motion vector component difference is greater than 0.

When abs_mvd_greater0_flag[ compIdx ] is not present, it is inferred to be equal to 0.

abs_mvd_greater1_flag[ compIdx ] specifies whether the absolute value of a motion vector component difference is greater than 1.

When abs_mvd_greater1_flag[ compIdx ] is not present, it is inferred to be equal to 0.

abs_mvd_minus2[ compIdx ] plus 2 specifies the absolute value of a motion vector component difference.

When abs_mvd_minus2[ compIdx ] is not present, it is inferred to be equal to −1.

mvd_sign_flag[ compIdx ] specifies the sign of a motion vector component difference as follows:

- If mvd_sign_flag[ compIdx ] is equal to 0, the corresponding motion vector component difference has a positive value.

- Otherwise (mvd_sign_flag[ compIdx ] is equal to 1), the corresponding motion vector component difference has a negative value.

When mvd_sign_flag[ compIdx ] is not present, it is inferred to be equal to 0.

The motion vector difference lMvd[ compIdx ] for compIdx = 0..1 is derived as follows:

$$\text{lMvd}[\text{compIdx}] = \text{abs\_mvd\_greater0\_flag}[\text{compIdx}] * (\text{abs\_mvd\_minus2}[\text{compIdx}] + 2) * (1 - 2 * \text{mvd\_sign\_flag}[\text{compIdx}]) \quad (7\text{-}121)$$

The value of lMvd[ compIdx ] shall be in the range of $-2^{15}$ to $2^{15} - 1$, inclusive.

Depending in the value of MotionModelIdc[ x ][ y ], motion vector differences are derived as follows:

- If MotionModelIdc[ x ][ y ] is equal to 0, the variable MvdLX[ x0 ][ y0 ][ compIdx ], with X being 0 or 1, specifies the difference between a list X vector component to be used and its prediction. The array indices x0, y0 specify the location ( x0, y0 ) of the top-left luma sample of the considered coding block relative to the top-left luma sample of the picture. The horizontal motion vector component difference is assigned compIdx = 0 and the vertical motion vector component is assigned compIdx = 1.

- If refList is equal to 0, MvdL0[ x0 ][ y0 ][ compIdx ] is set equal to lMvd[ compIdx ] for compIdx = 0..1.

- Otherwise (refList is equal to 1), MvdL1[ x0 ][ y0 ][ compIdx ] is set equal to lMvd[ compIdx ] for compIdx = 0..1.

- Otherwise (MotionModelIdc[ x ][ y ] is not equal to 0), the variable MvdCpLX[ x0 ][ y0 ][ cpIdx ][ compIdx ], with X being 0 or 1, specifies the difference between a list X vector component to be used and its prediction. The array indices x0, y0 specify the location ( x0, y0 ) of the top-left luma sample of the considered coding block relative to the top-left luma sample of the picture, the array index cpIdx specifies the control point index. The horizontal motion vector component difference is assigned compIdx = 0 and the vertical motion vector component is assigned compIdx = 1.

- If refList is equal to 0, MvdCpL0[ x0 ][ y0 ][ cpIdx ][ compIdx ] is set equal to lMvd[ compIdx ] for compIdx = 0..1.

- Otherwise (refList is equal to 1), MvdCpL1[ x0 ][ y0 ][ cpIdx ][ compIdx ] is set equal to lMvd[ compIdx ] for compIdx = 0..1.

FIG. 39

| | |
|---|---|
|    } else { | |
|      if( slice_type = = B ) | |
|        inter_pred_idc[ x0 ][ y0 ] | ae(v) |
|      if( sps_affine_enabled_flag && cbWidth >= 16 && cbHeight >= 16 ) { | |
|        inter_affine_flag[ x0 ][ y0 ] | ae(v) |
|        if( sps_affine_type_flag && inter_affine_flag[ x0 ][ y0 ] ) | |
|          cu_affine_type_flag[ x0 ][ y0 ] | ae(v) |
|      } | |
|      if( sps_smvd_enabled_flag && inter_pred_idc[ x0 ][ y0 ] == PRED_BI && <br>       !inter_affine_flag[ x0 ][ y0 ] && RefIdxSymL0 > −1 && RefIdxSymL1 > −1 ) | |
|        sym_mvd_flag[ x0 ][ y0 ] | ae(v) |
|      if( inter_pred_idc[ x0 ][ y0 ] != PRED_L1 ) { | |
|        if( NumRefIdxActive[ 0 ] > 1 && !sym_mvd_flag[ x0 ][ y0 ] ) | |
|          ref_idx_l0[ x0 ][ y0 ] | ae(v) |
|        mvd_coding( x0, y0, 0, 0 ) | |
|        if( MotionModelIdc[ x0 ][ y0 ] > 0 ) | |
|          mvd_coding( x0, y0, 0, 1 ) | |
|        if( MotionModelIdc[ x0 ][ y0 ] > 1 ) | |
|          mvd_coding( x0, y0, 0, 2 ) | |
|        mvp_l0_flag[ x0 ][ y0 ] | ae(v) |
|        if( MotionModelIdc[ x0 ][ y0 ] == 1 ) { | |
|          MvdCpL0[ x0 ][ y0 ][ 2 ][ 0 ] = 0 | |
|          MvdCpL0[ x0 ][ y0 ][ 2 ][ 1 ] = 0 | |
|        } | |
|      } else { | |
|        MvdL0[ x0 ][ y0 ][ 0 ] = 0 | |
|        MvdL0[ x0 ][ y0 ][ 1 ] = 0 | |
|        MvdCpL0[ x0 ][ y0 ][ 0 ][ 0 ] = 0 | |
|        MvdCpL0[ x0 ][ y0 ][ 0 ][ 1 ] = 0 | |
|        MvdCpL0[ x0 ][ y0 ][ 1 ][ 0 ] = 0 | |
|        MvdCpL0[ x0 ][ y0 ][ 1 ][ 1 ] = 0 | |
|        MvdCpL0[ x0 ][ y0 ][ 2 ][ 0 ] = 0 | |
|        MvdCpL0[ x0 ][ y0 ][ 2 ][ 1 ] = 0 | |
|      } | |

FIG. 40A

```
if( inter_pred_idc[ x0 ][ y0 ] != PRED_L0 ) {
    if( NumRefIdxActive[ 1 ] > 1 && !sym_mvd_flag[ x0 ][ y0 ] )
        ref_idx_l1[ x0 ][ y0 ]                                              ae(v)
    if( mvd_l1_zero_flag && inter_pred_idc[ x0 ][ y0 ] == PRED_BI ) {
        MvdL1[ x0 ][ y0 ][ 0 ] = 0
        MvdL1[ x0 ][ y0 ][ 1 ] = 0
        MvdCpL1[ x0 ][ y0 ][ 0 ][ 0 ] = 0
        MvdCpL1[ x0 ][ y0 ][ 0 ][ 1 ] = 0
        MvdCpL1[ x0 ][ y0 ][ 1 ][ 0 ] = 0
        MvdCpL1[ x0 ][ y0 ][ 1 ][ 1 ] = 0
        MvdCpL1[ x0 ][ y0 ][ 2 ][ 0 ] = 0
        MvdCpL1[ x0 ][ y0 ][ 2 ][ 1 ] = 0
    } else {
        if( sym_mvd_flag[ x0 ][ y0 ] ) {
            MvdL1[ x0 ][ y0 ][ 0 ] = -MvdL0[ x0 ][ y0 ][ 0 ]
            MvdL1[ x0 ][ y0 ][ 1 ] = -MvdL0[ x0 ][ y0 ][ 1 ]
        } else
            mvd_coding( x0, y0, 1, 0 )
        if( MotionModelIdc[ x0 ][ y0 ] > 0 )
            mvd_coding( x0, y0, 1, 1 )
        if( MotionModelIdc[ x0 ][ y0 ] > 1 )
            mvd_coding( x0, y0, 1, 2 )
        mvp_l1_flag[ x0 ][ y0 ]                                             ae(v)
        if( MotionModelIdc[ x0 ][ y0 ] == 1 ) {
            MvdCpL1[ x0 ][ y0 ][ 2 ][ 0 ] = 0
            MvdCpL1[ x0 ][ y0 ][ 2 ][ 1 ] = 0
        }
    }
} else {
    MvdL1[ x0 ][ y0 ][ 0 ] = 0
    MvdL1[ x0 ][ y0 ][ 1 ] = 0
    MvdCpL1[ x0 ][ y0 ][ 0 ][ 0 ] = 0
    MvdCpL1[ x0 ][ y0 ][ 0 ][ 1 ] = 0
    MvdCpL1[ x0 ][ y0 ][ 1 ][ 0 ] = 0
    MvdCpL1[ x0 ][ y0 ][ 1 ][ 1 ] = 0
    MvdCpL1[ x0 ][ y0 ][ 2 ][ 0 ] = 0
    MvdCpL1[ x0 ][ y0 ][ 2 ][ 1 ] = 0
}
if( ( sps_amvr_enabled_flag && inter_affine_flag[ x0 ][ y0 ] == 0 &&
    ( MvdL0[ x0 ][ y0 ][ 0 ] != 0 || MvdL0[ x0 ][ y0 ][ 1 ] != 0 ||
      MvdL1[ x0 ][ y0 ][ 0 ] != 0 || MvdL1[ x0 ][ y0 ][ 1 ] != 0 ) ) ||
    ( sps_affine_amvr_enabled_flag && inter_affine_flag[ x0 ][ y0 ] == 1 &&
    ( MvdCpL0[ x0 ][ y0 ][ 0 ][ 0 ] != 0 || MvdCpL0[ x0 ][ y0 ][ 0 ][ 1 ] != 0 ||
      MvdCpL1[ x0 ][ y0 ][ 0 ][ 0 ] != 0 || MvdCpL1[ x0 ][ y0 ][ 0 ][ 1 ] != 0 ||
      MvdCpL0[ x0 ][ y0 ][ 1 ][ 0 ] != 0 || MvdCpL0[ x0 ][ y0 ][ 1 ][ 1 ] != 0 ||
      MvdCpL1[ x0 ][ y0 ][ 1 ][ 0 ] != 0 || MvdCpL1[ x0 ][ y0 ][ 1 ][ 1 ] != 0 ||
      MvdCpL0[ x0 ][ y0 ][ 2 ][ 0 ] != 0 || MvdCpL0[ x0 ][ y0 ][ 2 ][ 1 ] != 0 ||
      MvdCpL1[ x0 ][ y0 ][ 2 ][ 0 ] != 0 || MvdCpL1[ x0 ][ y0 ][ 2 ][ 1 ] != 0 ) ) {
    amvr_flag[ x0 ][ y0 ]                                                   ae(v)
    if( amvr_flag[ x0 ][ y0 ] )
        amvr_precision_flag[ x0 ][ y0 ]                                     ae(v)
}
```

| | |
|---|---|
| } else if( treeType != DUAL_TREE_CHROMA ) { /* MODE_INTER or MODE_IBC */ | |
|   if( cu_skip_flag[ x0 ][ y0 ] == 0 ) | |
|     merge_flag[ x0 ][ y0 ] | ae(v) |
|   if( merge_flag[ x0 ][ y0 ] ) { | |
|     merge_data( x0, y0, cbWidth, cbHeight ) | |
|   } else if( CuPredMode[ x0 ][ y0 ] == MODE_IBC ) { //... | |
|   } else { | |
|     if( slice_type == B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     // sym_mvd_flag[ x0 ][ y0 ], ref_idx_l0[ x0 ][ y0 ], mvd_coding, mvp_l0_flag[ x0 ][ y0 ], ref_idx_l1[ x0 ][ y0 ], mvp_l1_flag[ x0 ][ y0 ] | |
|     if( sps_amvr_enabled_flag && inter_affine_flag == 0 && | |
|       ( ( (MvdL0[ x0 ][ y0 ][ 0 ] != 0 \|\| MvdL0[ x0 ][ y0 ][ 1 ] != 0) && inter_pred_idc != 0) \|\| | |
|       ( (MvdL1[ x0 ][ y0 ][ 0 ] != 0 \|\| MvdL1[ x0 ][ y0 ][ 1 ] != 0) && inter_pred_idc != 0) && (inter_pred_idc != PRED_L1) \|\| (mvd_l1_zero_flag && inter_pred_idc != PRED_BI) ) ) \|\| | |
|     ( sps_affine_amvr_enabled_flag && inter_affine_flag[ x0 ][ y0 ] == 1 && | |
|       ( ( (MvdCpL0[ x0 ][ y0 ][ 0 ][ 0 ] != 0 \|\| MvdCpL0[ x0 ][ y0 ][ 0 ][ 1 ] != 0) && inter_pred_idc != PRED_L1) \|\| | |
|       ( (MvdCpL1[ x0 ][ y0 ][ 0 ][ 0 ] != 0 \|\| MvdCpL1[ x0 ][ y0 ][ 0 ][ 1 ] != 0) && inter_pred_idc != PRED_L0 && !(mvd_l1_zero_flag && inter_pred_idc != | |
|     PRED_BI) ) \|\| | |
|       ( (MvdCpL0[ x0 ][ y0 ][ 1 ][ 0 ] != 0 \|\| MvdCpL0[ x0 ][ y0 ][ 1 ][ 1 ] != 0) && inter_pred_idc != PRED_L1) \|\| | |
|       ( (MvdCpL1[ x0 ][ y0 ][ 1 ][ 0 ] != 0 \|\| MvdCpL1[ x0 ][ y0 ][ 1 ][ 1 ] != 0) && inter_pred_idc != PRED_L0 && !(mvd_l1_zero_flag && inter_pred_idc != PRED_BI) ) \|\| | |
|       ( (MvdCpL0[ x0 ][ y0 ][ 2 ][ 0 ] != 0 \|\| MvdCpL0[ x0 ][ y0 ][ 2 ][ 1 ] != 0) && inter_pred_idc != PRED_L1 && MotionModelIdc[ x0 ][ y0 ] == 2) \|\| | |
|       ( (MvdCpL1[ x0 ][ y0 ][ 2 ][ 0 ] != 0 \|\| MvdCpL1[ x0 ][ y0 ][ 2 ][ 1 ] != 0) && (inter_pred_idc != PRED_L0 && MotionModelIdc[ x0 ][ y0 ] == 2 && !(mvd_l1_zero_flag && inter_pred_idc != PRED_BI) ) ) ) ) { | |
|       amvr_flag[ x0 ][ y0 ] | ae(v) |
|       if( amvr_flag[ x0 ][ y0 ] ) | |
|         amvr_precision_flag[ x0 ][ y0 ] | ae(v) |
|     } | |
|     // ... | |
|   } | |

| | |
|---|---|
| if( cu_skip_flag[ x0 ][ y0 ] = = 0 ) | |
|   general_merge_flag[ x0 ][ y0 ] | ae(v) |
| if( general_merge_flag[ x0 ][ y0 ] ) { | |
|   merge_data( x0, y0, cbWidth, cbHeight ) | |
| } else if ( CuPredMode[ x0 ][ y0 ] = = MODE_IBC ) { | |
|   mvd_coding( x0, y0, 0, 0 ) | |
|   mvp_l0_flag[ x0 ][ y0 ] | ae(v) |
|   if( sps_amvr_enabled_flag && | |
|     ( MvdL0[ x0 ][ y0 ][ 0 ] != 0 \|\| MvdL0[ x0 ][ y0 ][ 1 ] != 0 ) ) { | |
|     amvr_precision_flag[ x0 ][ y0 ] | ae(v) |
|   } | |
| } else { | |
|   if( slice_type = = B ) | |
|     inter_pred_idc[ x0 ][ y0 ] | ae(v) |
|   if( sps_affine_enabled_flag && cbWidth >= 16 && cbHeight >= 16 ) { | |
|     inter_affine_flag[ x0 ][ y0 ] | ae(v) |
|     if( sps_affine_type_flag && inter_affine_flag[ x0 ][ y0 ] ) | |
|       cu_affine_type_flag[ x0 ][ y0 ] | ae(v) |
|   } | |
|   if( sps_smvd_enabled_flag && inter_pred_idc[ x0 ][ y0 ] = = PRED_BI && | |
|     !inter_affine_flag[ x0 ][ y0 ] && RefIdxSymL0 > -1 && RefIdxSymL1 > -1 ) | |
|     sym_mvd_flag[ x0 ][ y0 ] | ae(v) |
|   if( inter_pred_idc[ x0 ][ y0 ] != PRED_L1 ) { | |
|     if( NumRefIdxActive[ 0 ] > 1 && !sym_mvd_flag[ x0 ][ y0 ] ) | |
|       ref_idx_l0[ x0 ][ y0 ] | ae(v) |
|     mvd_coding( x0, y0, 0, 0 ) | |
|     if( MotionModelIdc[ x0 ][ y0 ] > 0 ) | |
|       mvd_coding( x0, y0, 0, 1 ) | |
|     if( MotionModelIdc[ x0 ][ y0 ] > 1 ) | |
|       mvd_coding( x0, y0, 0, 2 ) | |
|     mvp_l0_flag[ x0 ][ y0 ] | ae(v) |
|   } else { | |
|     MvdL0[ x0 ][ y0 ][ 0 ] = 0 | |
|     MvdL0[ x0 ][ y0 ][ 1 ] = 0 | |
|   } | |

FIG. 42A

| | |
|---|---|
| if( inter_pred_idc[ x0 ][ y0 ] != PRED_L0 ) { | |
|   if( NumRefIdxActive[ 1 ] > 1 && !sym_mvd_flag[ x0 ][ y0 ] ) | |
|     ref_idx_l1[ x0 ][ y0 ] | ae(v) |
|   if( mvd_l1_zero_flag && inter_pred_idc[ x0 ][ y0 ] == PRED_BI ) { | |
|     MvdL1[ x0 ][ y0 ][ 0 ] = 0 | |
|     MvdL1[ x0 ][ y0 ][ 1 ] = 0 | |
|     MvdCpL1[ x0 ][ y0 ][ 0 ][ 0 ] = 0 | |
|     MvdCpL1[ x0 ][ y0 ][ 0 ][ 1 ] = 0 | |
|     MvdCpL1[ x0 ][ y0 ][ 1 ][ 0 ] = 0 | |
|     MvdCpL1[ x0 ][ y0 ][ 1 ][ 1 ] = 0 | |
|     MvdCpL1[ x0 ][ y0 ][ 2 ][ 0 ] = 0 | |
|     MvdCpL1[ x0 ][ y0 ][ 2 ][ 1 ] = 0 | |
|   } else { | |
|     if( sym_mvd_flag[ x0 ][ y0 ] ) { | |
|       MvdL1[ x0 ][ y0 ][ 0 ] = −MvdL0[ x0 ][ y0 ][ 0 ] | |
|       MvdL1[ x0 ][ y0 ][ 1 ] = −MvdL0[ x0 ][ y0 ][ 1 ] | |
|     } else | |
|       mvd_coding( x0, y0, 1, 0 ) | |
|     if( MotionModelIdc[ x0 ][ y0 ] > 0 ) | |
|       mvd_coding( x0, y0, 1, 1 ) | |
|     if(MotionModelIdc[ x0 ][ y0 ] > 1 ) | |
|       mvd_coding( x0, y0, 1, 2 ) | |
|     mvp_l1_flag[ x0 ][ y0 ] | ae(v) |
|   } | |
| } else { | |
|   MvdL1[ x0 ][ y0 ][ 0 ] = 0 | |
|   MvdL1[ x0 ][ y0 ][ 1 ] = 0 | |
| } | |

FIG. 42B

| | |
|---|---|
| if( cu_skip_flag[ x0 ][ y0 ] = = 0 ) | |
|   general_merge_flag[ x0 ][ y0 ] | ae(v) |
|   if( general_merge_flag[ x0 ][ y0 ] ) { | |
|     merge_data( x0, y0, cbWidth, cbHeight ) | |
|   } else if ( CuPredMode[ x0 ][ y0 ] = = MODE_IBC ) { | |
|     mvd_coding( x0, y0, 0, 0 ) | |
|     mvp_l0_flag[ x0 ][ y0 ] | ae(v) |
|     if( sps_amvr_enabled_flag &&<br>      ( MvdL0[ x0 ][ y0 ][ 0 ] != 0 \|\| MvdL0[ x0 ][ y0 ][ 1 ] != 0 ) ) { | |
|       amvr_precision_flag[ x0 ][ y0 ] | ae(v) |
|     } | |
|   } else { | |
|     if( slice_type = = B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     if( sps_smvd_enabled_flag && inter_pred_idc[ x0 ][ y0 ] = = PRED_BI &&<br>      !inter_affine_flag[ x0 ][ y0 ] && RefIdxSymL0 > -1 && RefIdxSymL1 > -1 ) | |
|       sym_mvd_flag[ x0 ][ y0 ] | ae(v) |
|     if( inter_pred_idc[ x0 ][ y0 ] != PRED_L1 ) { | |
|       if( NumRefIdxActive[ 0 ] > 1 && !sym_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if(MotionModelIdc[ x0 ][ y0 ] > 1 ) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |

| | |
|---|---|
| if( inter_pred_idc[ x0 ][ y0 ] != PRED_L0 ) { | |
|   if( NumRefIdxActive[ 1 ] > 1 && !sym_mvd_flag[ x0 ][ y0 ] ) | |
|     ref_idx_l1[ x0 ][ y0 ] | ae(v) |
|   if( mvd_l1_zero_flag && inter_pred_idc[ x0 ][ y0 ] == PRED_BI ) { | |
|     MvdL1[ x0 ][ y0 ][ 0 ] = 0 | |
|     MvdL1[ x0 ][ y0 ][ 1 ] = 0 | |
|     MvdCpL1[ x0 ][ y0 ][ 0 ][ 0 ] = 0 | |
|     MvdCpL1[ x0 ][ y0 ][ 0 ][ 1 ] = 0 | |
|     MvdCpL1[ x0 ][ y0 ][ 1 ][ 0 ] = 0 | |
|     MvdCpL1[ x0 ][ y0 ][ 1 ][ 1 ] = 0 | |
|     MvdCpL1[ x0 ][ y0 ][ 2 ][ 0 ] = 0 | |
|     MvdCpL1[ x0 ][ y0 ][ 2 ][ 1 ] = 0 | |
|   } else { | |
|     if( sym_mvd_flag[ x0 ][ y0 ] ) { | |
|       MvdL1[ x0 ][ y0 ][ 0 ] = −MvdL0[ x0 ][ y0 ][ 0 ] | |
|       MvdL1[ x0 ][ y0 ][ 1 ] = −MvdL0[ x0 ][ y0 ][ 1 ] | |
|     } else | |
|       mvd_coding( x0, y0, 1, 0 ) | |
|     if( MotionModelIdc[ x0 ][ y0 ] > 0 ) | |
|       mvd_coding( x0, y0, 1, 1 ) | |
|     if(MotionModelIdc[ x0 ][ y0 ] > 1 ) | |
|       mvd_coding( x0, y0, 1, 2 ) | |
|   } | |
|   mvp_l1_flag[ x0 ][ y0 ] | ae(v) |
| } else { | |
|   MvdL1[ x0 ][ y0 ][ 0 ] = 0 | |
|   MvdL1[ x0 ][ y0 ][ 1 ] = 0 | |
| } | |

| | |
|---|---|
| if( cu_skip_flag[ x0 ][ y0 ] = = 0 ) | |
|   general_merge_flag[ x0 ][ y0 ] | ae(v) |
|   if( general_merge_flag[ x0 ][ y0 ] ) { | |
|     merge_data( x0, y0, cbWidth, cbHeight ) | |
|   } else if ( CuPredMode[ x0 ][ y0 ] = = MODE_IBC ) { | |
|     mvd_coding( x0, y0, 0, 0 ) | |
|     mvp_l0_flag[ x0 ][ y0 ] | ae(v) |
|     if( sps_amvr_enabled_flag && | |
|       ( MvdL0[ x0 ][ y0 ][ 0 ] != 0 \|\| MvdL0[ x0 ][ y0 ][ 1 ] != 0 ) ) { | |
|       amvr_precision_flag[ x0 ][ y0 ] | ae(v) |
|     } | |
|   } else { | |
|     if( slice_type = = B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     if( sps_smvd_enabled_flag && inter_pred_idc[ x0 ][ y0 ] = = PRED_BI && | |
|       !inter_affine_flag[ x0 ][ y0 ] && RefIdxSymL0 > −1 && RefIdxSymL1 > −1 ) | |
|       sym_mvd_flag[ x0 ][ y0 ] | ae(v) |
|     if( inter_pred_idc[ x0 ][ y0 ] != PRED_L1 ) { | |
|       if( NumRefIdxActive[ 0 ] > 1 && !sym_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if( MotionModelIdc[ x0 ][ y0 ] > 1 ) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |

FIG. 44A

| | |
|---|---|
| if( inter_pred_idc[ x0 ][ y0 ] != PRED_L0 ) { | |
|   if( NumRefIdxActive[ 1 ] > 1 && !sym_mvd_flag[ x0 ][ y0 ] ) | |
|     ref_idx_l1[ x0 ][ y0 ] | ae(v) |
|   if( mvd_l1_zero_flag && inter_pred_idc[ x0 ][ y0 ] == PRED_BI ) { | |
|     MvdL1[ x0 ][ y0 ][ 0 ] = 0 | |
|     MvdL1[ x0 ][ y0 ][ 1 ] = 0 | |
|     MvdCpL1[ x0 ][ y0 ][ 0 ][ 0 ] = 0 | |
|     MvdCpL1[ x0 ][ y0 ][ 0 ][ 1 ] = 0 | |
|     MvdCpL1[ x0 ][ y0 ][ 1 ][ 0 ] = 0 | |
|     MvdCpL1[ x0 ][ y0 ][ 1 ][ 1 ] = 0 | |
|     MvdCpL1[ x0 ][ y0 ][ 2 ][ 0 ] = 0 | |
|     MvdCpL1[ x0 ][ y0 ][ 2 ][ 1 ] = 0 | |
|     mvp_l1_flag[ x0 ][ y0 ] | ae(v) |
|   } else { | |
|     if( sym_mvd_flag[ x0 ][ y0 ] ) { | |
|       MvdL1[ x0 ][ y0 ][ 0 ] = −MvdL0[ x0 ][ y0 ][ 0 ] | |
|       MvdL1[ x0 ][ y0 ][ 1 ] = −MvdL0[ x0 ][ y0 ][ 1 ] | |
|     } else | |
|       mvd_coding( x0, y0, 1, 0 ) | |
|     if( MotionModelIdc[ x0 ][ y0 ] > 0 ) | |
|       mvd_coding( x0, y0, 1, 1 ) | |
|     if(MotionModelIdc[ x0 ][ y0 ] > 1 ) | |
|       mvd_coding( x0, y0, 1, 2 ) | |
|     mvp_l1_flag[ x0 ][ y0 ] | ae(v) |
|   } | |
| } else { | |
|   MvdL1[ x0 ][ y0 ][ 0 ] = 0 | |
|   MvdL1[ x0 ][ y0 ][ 1 ] = 0 | |
| } | |

FIG. 44B

| coding_unit( x0, y0, cbWidth, cbHeight, treeType ) { | Descriptor |
|---|---|
| { /* MODE_INTER */ | |
|   if( cu_skip_flag[ x0 ][ y0 ] ) { | |
|     if( sps_affine_enabled_flag && cbWidth >= 8 && cbHeight >= 8 ) | |
|       merge_subblock_flag[ x0 ][ y0 ] | ae(v) |
|     if( merge_subblock_flag[ x0 ][ y0 ] = = 0 && MaxNumMergeCand > 1 ) | |
|       merge_idx[ x0 ][ y0 ] | ae(v) |
|     if( merge_subblock_flag[ x0 ][ y0 ] = = 1 && MaxNumSubblockMergeCand > 1 ) | |
|       merge_subblock_idx[ x0 ][ y0 ] | ae(v) |
|   } else { | |
|     merge_flag[ x0 ][ y0 ] | ae(v) |
|     if( merge_flag[ x0 ][ y0 ] ) { | |
|       if( sps_affine_enabled_flag && cbWidth >= 8 && cbHeight >= 8) | |
|         merge_subblock_flag[ x0 ][ y0 ] | ae(v) |
|       if( merge_subblock_flag[ x0 ][ y0 ] = = 0 && MaxNumMergeCand > 1 ) | |
|         merge_idx[ x0 ][ y0 ] | ae(v) |
|       if( merge_subblock_flag[ x0 ][ y0 ] = = 1 && MaxNumSubblockMergeCand > 1 ) | |
|         merge_subblock_idx[ x0 ][ y0 ] | ae(v) |
|     } else { | |
|       if( slice_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0, 0 ) | |
|         if( MotionModelIdc[ x0 ][ y0 ] > 0 ) | |
|           mvd_coding( x0, y0, 0, 1 ) | |
|         if(MotionModelIdc[ x0 ][ y0 ] > 1 ) | |
|           mvd_coding( x0, y0, 0, 2 ) | |
|         mvp_l0_flag[ x0 ][ y0 ] | ae(v) |
|       } else { | |
|         MvdL0[ x0 ][ y0 ][ 0 ] = 0 | |
|         MvdL0[ x0 ][ y0 ][ 1 ] = 0 | |
|       } | |

FIG. 45A

```
if( inter_pred_idc[ x0 ][ y0 ] != PRED_L0 ) {
    if( num_ref_idx_l1_active_minus1 > 0 )
        ref_idx_l1[ x0 ][ y0 ]                                              ae(v)
    if( mvd_l1_zero_flag && inter_pred_idc[ x0 ][ y0 ] == PRED_BI ) {
        MvdL1[ x0 ][ y0 ][ 0 ] = 0
        MvdL1[ x0 ][ y0 ][ 1 ] = 0
        MvdCpL1[ x0 ][ y0 ][ 0 ][ 0 ] = 0
        MvdCpL1[ x0 ][ y0 ][ 0 ][ 1 ] = 0
        MvdCpL1[ x0 ][ y0 ][ 1 ][ 0 ] = 0
        MvdCpL1[ x0 ][ y0 ][ 1 ][ 1 ] = 0
        MvdCpL1[ x0 ][ y0 ][ 2 ][ 0 ] = 0
        MvdCpL1[ x0 ][ y0 ][ 2 ][ 1 ] = 0
    } else {
        mvd_coding( x0, y0, 1, 0 )
        if( MotionModelIdc[ x0 ][ y0 ] > 0 )
            mvd_coding( x0, y0, 1, 1 )
        if(MotionModelIdc[ x0 ][ y0 ] > 1 )
            mvd_coding( x0, y0, 1, 2 )
        mvp_l1_flag[ x0 ][ y0 ]                                             ae(v)
    } else {
        MvdL1[ x0 ][ y0 ][ 0 ] = 0
        MvdL1[ x0 ][ y0 ][ 1 ] = 0
    }
    if( sps_amvr_enabled_flag && inter_affine_flag == 0 &&
        ( MvdL0[ x0 ][ y0 ][ 0 ] != 0 || MvdL0[ x0 ][ y0 ][ 1 ] != 0 ||
          MvdL1[ x0 ][ y0 ][ 0 ] != 0 || MvdL1[ x0 ][ y0 ][ 1 ] != 0 ) )
        amvr_mode[ x0 ][ y0 ]                                               ae(v)
        }
    }
}
if( CuPredMode[ x0 ][ y0 ] != MODE_INTRA && cu_skip_flag[ x0 ][ y0 ] == 0 )
    cu_cbf                                                                  ae(v)
if( cu_cbf ) {
    transform_tree( x0, y0, cbWidth, cbHeight, treeType )
}
```

FIG. 45B

| | Descriptor |
|---|---|
| merge_data( x0, y0, cbWidth, cbHeight ) { | |
|   if ( CuPredMode[ x0 ][ y0 ] == MODE_IBC ) { | |
|     if( MaxNumMergeCand > 1 ) | |
|       merge_idx[ x0 ][ y0 ] | ae(v) |
|   } else { | |
|     if( sps_mmvd_enabled_flag \|\| cbWidth * cbHeight != 32 ) | |
|       regular_merge_flag[ x0 ][ y0 ] | ae(v) |
|     if ( regular_merge_flag[ x0 ][ y0 ] == 1 ){ | |
|       if( MaxNumMergeCand > 1 ) | |
|         merge_idx[ x0 ][ y0 ] | ae(v) |
|     } else { | |
|       if( sps_mmvd_enabled_flag && cbWidth * cbHeight != 32 ) | |
|         mmvd_merge_flag[ x0 ][ y0 ] | ae(v) |
|       if( mmvd_merge_flag[ x0 ][ y0 ] == 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumSubblockMergeCand > 0 && cbWidth >= 8 && cbHeight >= 8 ) | |
|           merge_subblock_flag[ x0 ][ y0 ] | ae(v) |
|         if( merge_subblock_flag[ x0 ][ y0 ] == 1 ) { | |
|           if( MaxNumSubblockMergeCand > 1 ) | |
|             merge_subblock_idx[ x0 ][ y0 ] | ae(v) |
|         } else { | |
|           if( sps_ciip_enabled_flag && cu_skip_flag[ x0 ][ y0 ] == 0 && | |
|             ( cbWidth * cbHeight ) >= 64 && cbWidth < 128 && cbHeight < 128 ) { | |
|             ciip_flag[ x0 ][ y0 ] | ae(v) |
|           if( ciip_flag[ x0 ][ y0 ] && MaxNumMergeCand > 1 ) | |
|             merge_idx[ x0 ][ y0 ] | ae(v) |
|           } | |
|           if( MergeTriangleFlag[ x0 ][ y0 ] ) { | |
|             merge_triangle_split_dir[ x0 ][ y0 ] | ae(v) |
|             merge_triangle_idx0[ x0 ][ y0 ] | ae(v) |
|             merge_triangle_idx1[ x0 ][ y0 ] | ae(v) |
|           } | |
|         } | |
|       } | |
|     } | |
|   } | |
| } | |

FIG. 47

| slice_header( ) { | Descriptor |
|---|---|
| // ... | |
|   if ( slice_type != I ) { | |
|     if( sps_temporal_mvp_enabled_flag ) | |
|       slice_temporal_mvp_enabled_flag | u(1) |
|     if( slice_type == B ) | |
|       mvd_l1_zero_flag | u(1) |
|     if( cabac_init_present_flag ) | |
|       cabac_init_flag | u(1) |
|     if( slice_temporal_mvp_enabled_flag ) { | |
|       if( slice_type == B ) | |
|         collocated_from_l0_flag | u(1) |
|     } | |
|     if( ( weighted_pred_flag && slice_type == P ) \|\| | |
|       ( weighted_bipred_flag && slice_type == B ) ) | |
|       pred_weight_table( ) | |
|     six_minus_max_num_merge_cand | ue(v) |
|     if( sps_affine_enabled_flag ) | |
|       five_minus_max_num_subblock_merge_cand | ue(v) |
|     if( sps_fpel_mmvd_enabled_flag ) | |
|       slice_fpel_mmvd_enabled_flag | u(1) |
|     if( sps_triangle_enabled_flag && MaxNumMergeCand >= 2 ) | |
|       max_num_merge_cand_minus_max_num_triangle_cand | ue(v) |
|   } else if ( sps_ibc_enabled_flag ) | |
|     six_minus_max_num_merge_cand | ue(v) |
|   // ... | |
| } | |

FIG. 48 max_num_merge_cand_minus_max_num_triangle_cand specifies the maximum number of triangular merge mode candidates supported in the slice subtracted from MaxNumMergeCand. The maximum number of triangular merge mode candidates, MaxNumTriangleMergeCand is derived as follows:

MaxNumTriangleMergeCand =
        MaxNumMergeCand − max_num_merge_cand_minus_max_num_triangle_cand    (7-59)

When max_num_merge_cand_minus_max_num_triangle_cand is present, the value of MaxNumTriangleMergeCand shall be in the range of 2 to MaxNumMergeCand, inclusive. When max_num_merge_cand_minus_max_num_triangle_cand is not present, MaxNumTriangleMergeCand is set equal to 0. When MaxNumTriangleMergeCand is equal to 0, triangle merge mode is not allowed for the current slice.

FIG. 49

| slice_header( ) { | Descriptor |
|---|---|
| // ... | |
|   if( sps_triangle_enabled_flag && MaxNumMergeCand > 2 ) | |
|     max_num_merge_cand_minus_max_num_triangle_cand | ue(v) |
| // ... | |
| } | |

5001

FIG. 50 max_num_merge_cand_minus_max_num_triangle_cand specifies the maximum number of triangular merge mode candidates supported in the slice subtracted from MaxNumMergeCand. The maximum number of triangular merge mode candidates, MaxNumTriangleMergeCand is derived as follows:

5101 — MaxNumTriangleMergeCand =
      MaxNumMergeCand − max_num_merge_cand_minus_max_num_triangle_cand    (7-60)

When max_num_merge_cand_minus_max_num_triangle_cand is present, the value of MaxNumTriangleMergeCand shall be in the range of 2 to MaxNumMergeCand, inclusive.

When max_num_merge_cand_minus_max_num_triangle_cand is not present,

5102 — If sps_triangle_enabled_flag is equal to 1 and MaxNumMergeCand is equal to 2, MaxNumTriangleMergeCand is set equal to 2.

5103 — Otherwise (sps_triangle_enalged_flag is equal to 0 or MaxNumMergeCand is not equal to 2), MaxNumTriangleMergeCand is set equal to 0.

When MaxNumTriangleMergeCand is equal to 0, triangle merge mode is not allowed for the current slice.

FIG. 51

| if( MergeTriangleFlag[ x0 ][ y0 ] ) { | |
|---|---|
|   merge_triangle_split_dir[ x0 ][ y0 ] | ae(v) |
|   if( MaxNumTriangleMergeCand > 2 ) { | |
|     merge_triangle_idx0[ x0 ][ y0 ] | ae(v) |
|     merge_triangle_idx1[ x0 ][ y0 ] | ae(v) |
|   } else { | |
|     merge_triangle_idx_indicator[ x0 ][ y0 ] | ae(v) |
|   } | |
| } | |

FIG. 52 merge_triangle_idx0[ x0 ][ y0 ] specifies the first merging candidate index of the triangular shape based motion compensation candidate list where x0, y0 specify the location ( x0, y0 ) of the top-left luma sample of the considered coding block relative to the top-left luma sample of the picture.

When merge_triangle_idx0[ x0 ][ y0 ] is not present, it is inferred as follows:

↗ If MergeTriangleFlag[ x0 ][ y0 ] is equal to 1, MaxNumTriangleMergeCand is equal to 2 and merge_triangle_idx_indicator[ x0 ][ y0 ] is equal to 1, it is inferred to be equal to 1.

↗ Otherwise, it is inferred to be equal to 0.

merge_triangle_idx1[ x0 ][ y0 ] specifies the second merging candidate index of the triangular shape based motion compensation candidate list where x0, y0 specify the location ( x0, y0 ) of the top-left luma sample of the considered coding block relative to the top-left luma sample of the picture.

When merge_triangle_idx1[ x0 ][ y0 ] is not present, it is inferred to be equal to 0.

FIG. 53

| if( MergeTriangleFlag[ x0 ][ y0 ] ) { | |
|---|---|
| merge_triangle_split_dir[ x0 ][ y0 ] | ae(v) |
| merge_triangle_idx0[ x0 ][ y0 ] | ae(v) |
| merge_triangle_idx1[ x0 ][ y0 ] | ae(v) |
| merge_triangle_bigger[ x0 ][ y0 ] | ae(v) |
| } | |

The variables m and n, being the merge index for triangle partition 0 and 1 respectively, are derived using merge_triangle_idx0[ xCb ][ yCb ] and merge_triangle_idx1[ xCb ][ yCb ] as follows:

If merge_triangle_bigger[ xCb ][ yCb ] is equal to 0,
m = merge_triangle_idx0[ xCb ][ yCb ]
n = merge_triangle_idx1[ xCb ][ yCb ] + m + 1
Otherwise,
n = merge_triangle_idx0[ xCb ][ yCb ]
m = merge_triangle_idx1[ xCb ][ yCb ] + n + 1

FIG. 54

| | |
|---|---|
| if( MergeTriangleFlag[ x0 ][ y0 ] ) { | |
|     merge_triangle_split_dir[ x0 ][ y0 ] | ae(v) |
|     merge_triangle_idx0[ x0 ][ y0 ] | ae(v) |
|     if( merge_triangle_idx0[ x0 ][ y0 ] > 0 ) | |
|         merge_triangle_idx1[ x0 ][ y0 ] | ae(v) |
|     merge_triangle_bigger[ x0 ][ y0 ] | ae(v) |
| } | |

The variables m and n, being the merge index for triangle partition 0 and 1 respectively, are derived using merge_triangle_idx0[ xCb ][ yCb ] and merge_triangle_idx1[ xCb ][ yCb ] as follows:

If merge_triangle_bigger[ xCb ][ yCb ] is equal to 0,
m = merge_triangle_idx0[ xCb ][ yCb ] + 1
n = merge_triangle_idx1[ xCb ][ yCb ]
Otherwise,
n = merge_triangle_idx0[ xCb ][ yCb ] + 1
m = merge_triangle_idx1[ xCb ][ yCb ]

FIG. 55

VIDEO SIGNAL PROCESSING METHOD AND APPARATUS USING ADAPTIVE MOTION VECTOR RESOLUTION

CROSS-REFERENCE TO RELATED APPLICATIONS

This application is a continuation of pending PCT International Application No. PCT/KR2020/005830, which was filed on May 4, 2020, and which claims priority under 35 U.S.C. 119(a) to Korean Patent Application No. 10-2019-0050960 filed with the Korean Intellectual Property Office on Apr. 30, 2019, Korean Patent Application No. 10-2019-0057185 filed with the Korean Intellectual Property Office on May 15, 2019, and Korean Patent Application No. 10-2019-0057650 filed with the Korean Intellectual Property Office on May 17, 2019. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

An object of the present disclosure is to increase coding efficiency of a video signal.

Technical Solution

A method for processing a video signal according to an embodiment of the present disclosure comprise the steps of parsing, from a bitstream, an adaptive motion vector resolution (AMVR) enabled flag sps_amvr_enabled_flag indicating whether or not adaptive motion vector differential resolution is used, parsing, from the bitstream, an affine enabled flag sps_affine_enabled_flag indicating whether or not affine motion compensation is usable, on the basis of the affine enabled flag sps_affine_enabled_flag, determining whether or not the affine motion compensation is usable, when the affine motion compensation is usable, determining, on the basis of the AMVR enabled flag sps_amvr_enabled_flag, whether or not the adaptive motion vector differential resolution is used, and when the adaptive motion vector differential resolution is used, parsing, from the bitstream, an affine AMVR enabled flag sps_affine_amvr_enabled flag indicating whether or not the adaptive motion vector differential resolution is usable for the affine motion compensation.

In the method for processing a video signal according to an embodiment of the present disclosure, one of the AMVR enable flag sps_amvr_enabled_flag, the affine enabled flag sps_affine_enabled_flag, or the affine AMVR enabled flag sps_affine_amvr_enabled_flag is signaled as one of a coding tree unit, a slice, a tile, a tile group, a picture, or a sequence unit.

In the method for processing a video signal according to an embodiment of the present disclosure, when the affine motion compensation is usable and the adaptive motion vector differential resolution is not used, the affine AMVR enabled flag sps_affine_amvr_enabled_flag infers that adaptive motion vector differential resolution is not usable for the affine motion compensation.

In the method for processing a video signal according to an embodiment of the present disclosure, when the affine motion compensation is not usable, the affine AMVR enabled flag sps_affine_amvr_enabled_flag infers that adaptive motion vector differential resolution is not usable for the affine motion compensation.

The method for processing a video signal according to an embodiment of the present disclosure further comprises, when the AMVR enabled flag sps_amvr_enabled_flag indicates the use of adaptive motion vector differential resolution, an inter affine flag inter_affine_flag obtained from the bitstream indicates that the affine motion compensation is not used for a current block, and at least one of a plurality of motion vector differences for the current block is non-zero, and parsing information about resolution of the motion vector difference from the bitstream, and modifying the plurality of motion vector differences for the current block on the basis of information about the resolution of the motion vector difference.

The method for processing a video signal according to an embodiment of the present disclosure further comprises, when the affine AMVR enabled flag indicates that the adaptive motion vector differential resolution is usable for the affine motion compensation, an inter affine flag inter_affine_flag obtained from the bitstream indicates the use of affine motion compensation for a current block, and at least one of a plurality of control point motion vector differences for the current block is non-zero, parsing information about resolution of the motion vector difference from the bitstream, and modifying the plurality of control point motion vector differences for the current block on the basis of information about the resolution of the motion vector difference.

The method for processing a video signal according to an embodiment of the present disclosure further comprises, obtaining information inter_pred_idc about a reference picture list for a current block, when the information inter_pred_idc about the reference picture list indicates that only the zeroth reference picture list is not used, parsing a motion vector predictor index mvp_l1_flag of a first reference picture list from the bitstream, generating motion vector predictor candidates, obtaining a motion vector predictor from the motion vector predictor candidates on the basis of the motion vector predictor index, and predicting the current block on the basis of the motion vector predictor.

The method for processing a video signal according to an embodiment of the present disclosure further comprises, obtaining, from the bitstream, a motion vector difference zero flag mvd_l1_zero_flag indicating whether or not a motion vector difference and a plurality of control point motion vector differences are set to zero for the first reference picture list, in which the step of parsing the motion vector predictor index mvp_l1_flag includes, the motion vector difference zero flag mvd_l1_zero_flag is 1 and regardless of whether or not the information inter_pred_idc about the reference picture list indicates that both the zeroth reference picture list and the first reference picture list are used, parsing the motion vector predictor index mvp_l1_flag.

A method for processing a video signal according to an embodiment of the present disclosure the steps of parsing, from a bitstream, first information six_minus_max_num_merge_cand related to a maximum number of candidates for merge motion vector prediction in units of sequences, obtaining a maximum number of merge candidates on the basis of the first information, parsing, from the bitstream, second information indicating whether or not a block is partitioned for inter prediction, and, when the second information indicates 1 and the maximum number of merge candidates is greater than 2, parsing, from the bitstream, third information related to the maximum number of merge mode candidates for the partitioned block.

The method for processing a video signal according to an embodiment of the present disclosure further comprises, when the second information indicates 1 and the maximum number of merge candidates is greater than or equal to 3, obtaining a maximum number of merge mode candidates for the partitioned block by subtracting the third information from the maximum number of merge candidates, when the second information indicates 1 and the maximum number of merge candidates is 2, setting the maximum number of merge mode candidates for the partitioned block to 2, and, when the second information is 0 or the maximum number of merge candidates is 1, setting the maximum number of merge mode candidates for the partitioned block to 0.

An apparatus for processing a video signal according to an embodiment of the present disclosure comprises a processor and a memory, in which, on the basis of instructions stored in the memory, the processor parses, from a bitstream, an adaptive motion vector resolution (AMVR) enabled flag sps_amvr_enabled_flag indicating whether or not adaptive motion vector differential resolution is used, parses, from the bitstream, an affine enabled flag sps_affine_enabled flag indicating whether or not affine motion compensation is usable, on the basis of the affine enabled flag sps_affine_enabled_flag, determines whether or not the affine motion compensation is usable, when the affine motion compensation is usable, determines, on the basis of the AMVR enabled flag sps_amvr_enabled_flag, whether or not the adaptive motion vector differential resolution is used, and, when the adaptive motion vector differential resolution is used, parses, from the bitstream, an affine AMVR enabled flag sps_affine_amvr_enabled flag indicating whether or not the adaptive motion vector differential resolution is usable for the affine motion compensation.

In the apparatus for processing a video signal according to an embodiment of the present disclosure, one of the AMVR enable flag sps_amvr_enabled_flag, the affine enabled flag sps_affine_enabled_flag, or the affine AMVR enabled flag sps_affine_amvr_enabled_flag is signaled as one of a coding tree unit, a slice, a tile, a tile group, a picture, or a sequence unit.

In the apparatus for processing a video signal according to an embodiment of the present disclosure, when the affine motion compensation is usable and the adaptive motion vector differential resolution is not used, the affine AMVR enabled flag sps_affine_amvr_enabled_flag infers that adaptive motion vector differential resolution is not usable for the affine motion compensation.

In the apparatus for processing a video signal according to an embodiment of the present disclosure, when the affine motion compensation is not usable, the affine AMVR enabled flag sps_affine_amvr_enabled_flag infers that adaptive motion vector differential resolution is not usable for the affine motion compensation.

In the apparatus for processing a video signal according to an embodiment of the present disclosure, on the basis of instructions stored in the memory, the processor, when the AMVR enabled flag sps_amvr_enabled_flag indicates the use of adaptive motion vector differential resolution, an inter affine flag inter_affine_flag obtained from the bitstream indicates that the affine motion compensation is not used for a current block, and at least one of a plurality of motion vector differences for the current block is non-zero, parses information about resolution of the motion vector difference from the bitstream, and modifies the plurality of motion vector differences for the current block on the basis of information about the resolution of the motion vector difference.

In the apparatus for processing a video signal according to an embodiment of the present disclosure, on the basis of instructions stored in the memory, the processor, when the affine AMVR enabled flag indicates that the adaptive motion vector differential resolution is usable for the affine motion compensation, an inter affine flag inter_affine_flag obtained from the bitstream indicates the use of affine motion compensation for a current block, and at least one of a plurality of control point motion vector differences for the current block is non-zero, parses information about resolution of the motion vector difference from the bitstream, and modifies the plurality of control point motion vector differences for the current block on the basis of information about the resolution of the motion vector difference.

In the apparatus for processing a video signal according to an embodiment of the present disclosure, on the basis of instructions stored in the memory, the processor obtains information inter_pred_idc about a reference picture list for a current block, when the information inter_pred_idc about the reference picture list indicates that only the zeroth reference picture list list 0 is not used, parses a motion vector predictor index mvp_l1_flag of a first reference picture list list 1 from the bitstream, generates motion vector predictor candidates, obtains a motion vector predictor from the motion vector predictor candidates on the basis of the motion vector predictor index, and predicts the current block on the basis of the motion vector predictor.

In the apparatus for processing a video signal according to an embodiment of the present disclosure, on the basis of instructions stored in the memory, the processor obtains, from the bitstream, a motion vector difference zero flag mvd_l1_zero_flag indicating whether or not a motion vector difference and a plurality of control point motion vector differences are set to zero for the first reference picture list, and the motion vector difference zero flag mvd_l1_zero_flag is 1 and regardless of whether or not the information inter_pred_idc about the reference picture list indicates that both the zeroth reference picture list and the first reference picture list are used, parses the motion vector predictor index mvp_l1_flag.

An apparatus for processing a video signal according to an embodiment of the present disclosure comprises a processor and a memory, in which, on the basis of instructions stored in the memory, the processor parses, from a bitstream, first information six_minus_max_num_merge_cand related to a maximum number of candidates for merge motion vector prediction in units of sequences, obtains a maximum number of merge candidates on the basis of the first information, parses, from the bitstream, second information indicating whether or not a block is partitioned for inter prediction, and, when the second information indicates 1 and the maximum number of merge candidates is greater than 2, parses, from the bitstream, third information related to the maximum number of merge mode candidates for the partitioned block.

In the apparatus for processing a video signal according to an embodiment of the present disclosure, on the basis of instructions stored in the memory, the processor, when the second information indicates 1 and the maximum number of merge candidates is greater than or equal to 3, obtains a maximum number of merge mode candidates for the partitioned block by subtracting the third information from the maximum number of merge candidates, when the second information indicates 1 and the maximum number of merge candidates is 2, sets the maximum number of merge mode candidates for the partitioned block to 2, and, when the second information is 0 or the maximum number of merge candidates is 1, sets the maximum number of merge mode candidates for the partitioned block to 0.

A method for processing a video signal according to an embodiment of the present disclosure comprises the steps of generating an adaptive motion vector resolution (AMVR) enabled flag sps_amvr_enabled_flag indicating whether or not adaptive motion vector differential resolution is used, generating an affine enabled flag sps_affine_enabled_flag indicating whether or not affine motion compensation is usable; on the basis of the affine enabled flag sps_affine_enabled_flag, determining whether or not the affine motion compensation is usable, when the affine motion compensation is usable, determining, on the basis of the AMVR enabled flag sps_amvr_enabled_flag, whether or not the adaptive motion vector differential resolution is used, when the adaptive motion vector differential resolution is used, generating an affine AMVR enabled flag sps_affine_amvr_enabled flag indicating whether or not the adaptive motion vector differential resolution is usable for the affine motion compensation, and generating a bitstream by performing entropy coding the AMVR enabled flag sps_amvr_enabled_flag, the affine enabled flag sps_affine_enabled_flag, and the AMVR enabled flag sps_amvr_enabled_flag.

The method for processing a video signal according to an embodiment of the present disclosure further comprises generating, on the basis of a maximum number of merge candidates, first information six_minus_max_num_merge_cand related to a maximum number of candidates for merge motion vector prediction, generating second information indicating whether or not a block is able to be partitioned for inter prediction, when the second information indicates 1 and the maximum number of merge candidates is greater than 2, generating third information related to a maximum number of merge mode candidates for a partitioned block, and performing entropy coding the first information six_minus_max_num_merge_cand, the second information, and the third information to generate a bitstream in units of sequences.

Advantageous Effects

According to an embodiment of the present disclosure, coding efficiency of a video signal can be increased.

BRIEF DESCRIPTION OF THE DRAWINGS

FIG. 7 is a diagram illustrating an embodiment of prediction modes used for intra prediction.

FIG. 8 is a diagram illustrating inter prediction according to an embodiment of the present disclosure.

FIG. 12 is a diagram illustrating signaling of adaptive motion vector resolution according to an embodiment of the present disclosure FIG. 13 is a diagram illustrating signaling of adaptive motion vector resolution according to an embodiment of the present disclosure.

FIG. 14 is a diagram illustrating signaling of adaptive motion vector resolution according to an embodiment of the present disclosure.

FIG. 15 is a diagram illustrating signaling of adaptive motion vector resolution according to an embodiment of the present disclosure.

FIG. 16 is a diagram illustrating signaling of adaptive motion vector resolution according to an embodiment of the present disclosure.

FIG. 17 is a diagram illustrating affine motion prediction according to an embodiment of the present disclosure.

FIG. 18 is a diagram illustrating affine motion prediction according to an embodiment of the present disclosure.

FIG. 21 is an expression illustrating a motion vector field according to an embodiment of the present disclosure.

FIG. 24 is a diagram illustrating one mode of affine motion prediction according to an embodiment of the present disclosure.

FIG. 28 is a diagram illustrating affine motion predictor derivation according to an embodiment of the present disclosure.

FIG. 29 is a diagram illustrating a method of generating a control point motion vector according to an embodiment of the present disclosure.

FIG. 30 is a diagram illustrating a method of determining a motion vector difference through the method described with reference to FIG. 29.

FIG. 31 is a diagram illustrating a method of generating a control point motion vector according to an embodiment of the present disclosure.

FIG. 32 is a diagram illustrating a method of determining a motion vector difference through the method described with reference to FIG. 31.

FIG. 33 is a diagram illustrating motion vector difference syntax according to an embodiment of the present disclosure.

FIG. 34 is a diagram illustrating a higher level signaling structure according to an embodiment of the present disclosure.

FIG. 35 is a diagram illustrating a coding unit syntax structure according to an embodiment of the present disclosure.

FIG. 36 is a diagram illustrating a higher level signaling structure according to an embodiment of the present disclosure.

FIG. 37 is a diagram illustrating a higher level signaling structure according to an embodiment of the present disclosure.

FIG. 38 is a diagram illustrating a coding unit syntax structure according to an embodiment of the present disclosure.

FIG. 39 is a diagram illustrating MVD default value setting according to an embodiment of the present disclosure FIG. 40A and FIG. 40B illustrate MVD default setting according to an embodiment of the present disclosure.

FIG. 41 is a diagram illustrating an AMVR-related syntax structure according to an embodiment of the present disclosure.

FIG. 42A and FIG. 42B illustrate an inter prediction-related syntax structure according to an embodiment of the present disclosure.

FIG. 43A and FIG. 43B illustrate an inter prediction-related syntax structure according to an embodiment of the present disclosure.

FIG. 44A and FIG. 44B illustrate an inter prediction-related syntax structure according to an embodiment of the present disclosure.

FIG. 45A and FIG. 45B illustrate an inter prediction-related syntax according to an embodiment of the present invention.

FIG. 47 is a diagram illustrating merge data syntax according to an embodiment of the present invention.

FIG. 48 is a diagram illustrating higher level signaling according to an embodiment of the present invention.

FIG. 49 is a diagram illustrating a maximum number of candidates used in TPM according to an embodiment of the present invention.

FIG. 50 is a diagram illustrating higher level signaling related to the TPM according to an embodiment of the present invention.

FIG. 51 is a diagram illustrating a maximum number of candidates used in the TPM according to an embodiment of the present invention.

FIG. 52 is a diagram TPM-related syntax elements according to an embodiment of the present invention.

FIG. 53 is a diagram illustrating signaling of a TPM candidate index according to an embodiment of the present invention.

FIG. 54 is a diagram illustrating signaling of a TPM candidate index according to an embodiment of the present invention.

FIG. 55 is a diagram illustrating signaling of a TPM candidate index according to an embodiment of the present invention.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In the present disclosure, the following terms may be interpreted based on the following criteria, and even terms not described may be interpreted according to the following purpose. Coding may be interpreted as encoding or decoding in some cases, information is a term including all of values, parameters, coefficients, elements, etc. and the meaning thereof may be interpreted differently in some cases, and thus, the present disclosure is not limited thereto. 'Unit' is used to refer to a basic unit of image (picture) processing or a specific position of a picture, and may be used interchangeably with terms such as 'block', 'partition' or 'region' in some cases. Also, in the present specification, a unit may be used as a concept including all of a coding unit, a prediction unit, and a transformation unit.

Figure 1:
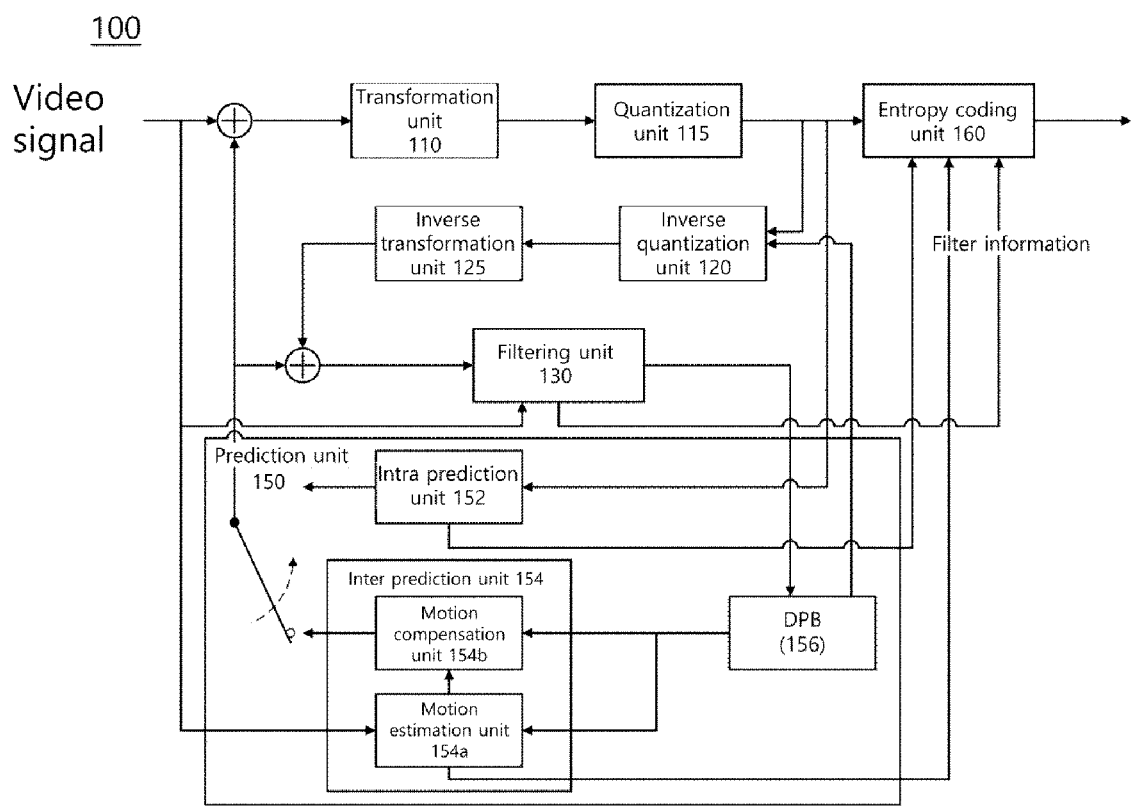
FIG. 1 is a schematic block diagram of a video signal encoder apparatus according to an embodiment of the present disclosure.

FIG. 1 is a schematic block diagram of a video signal encoding apparatus according to an embodiment of the present disclosure. Referring to FIG. 1, an encoding apparatus 100 of the present disclosure largely includes a transformation unit 110, a quantization unit 115, an inverse quantization unit 120, an inverse transformation unit 125, a filtering unit 130, and a prediction unit 150, and an entropy coding unit 160.

The transformation unit 110 obtains a transform coefficient value by transforming a pixel value of a received video signal. For example, a discrete cosine transform (DCT) or a wavelet transform can be used. In particular, in the discrete cosine transform, the transform is performed by dividing an input picture signal into blocks of a predetermined size. In the transform, coding efficiency can vary according to distribution and characteristics of values in a transform region.

The quantization unit 115 quantizes the transform coefficient value output from the transformation unit 110. The inverse quantization unit 120 dequantizes the transform coefficient value, and the inverse transformation unit 125 reconstructs an original pixel value using the dequantized transform coefficient value.

The filtering unit 130 performs a filtering computation for improving quality of a reconstructed picture. For example, a deblocking filter and an adaptive loop filter can be included. The filtered picture is output or stored in a decoded picture buffer 156 to be used as a reference picture.

In order to improve coding efficiency, a picture signal is not coded as it is, but a method of predicting a picture via the prediction unit 150 by using a region that has been already coded, and adding, to the predicted picture, a residual value between an original picture and the predicted picture, thereby obtaining a reconstructed picture, is used. The intra prediction unit 152 performs intra prediction within a current picture, and the inter prediction unit 154 predicts the current picture by using a reference picture stored in the decoding picture buffer 156. The intra prediction unit 152 performs intra prediction from reconstructed regions in the current picture, and transfers intra coding information to the entropy coding unit 160. The inter prediction unit 154 may include a motion estimation unit 154*a* and a motion compensation unit 154*b*. The motion estimation unit 154*a* obtains a motion vector value of the current region by referring to a specific reconstructed region. The motion estimation unit 154*a* transfers location information (reference frame, motion vector, etc.) of the reference region to the entropy coding unit 160 so as to enable the location information to be included in a bitstream. The motion compensation unit 154*b* performs inter motion compensation by using the motion vector value transferred from the motion estimation unit 154*a*.

The entropy coding unit 160 performs entropy coding on the quantized transform coefficient, inter coding information, intra coding information, and reference region information input from the inter prediction unit 154 to generate a video signal bitstream. Here, in the entropy coding unit 160, a variable length coding (VLC) scheme, arithmetic coding, etc. can be used. The variable length coding (VLC) scheme transforms input symbols into consecutive codewords, and the length of the codewords can be variable. For example, symbols that occur frequently are expressed as short codewords and symbols that do not occur frequently are expressed as long codewords. As the variable length coding scheme, a context-based adaptive variable length coding (CAVLC) scheme can be used. Arithmetic coding transforms consecutive data symbols into one prime number, and an optimal fractional bit required to represent each symbol can be obtained in the arithmetic coding. A context-based adaptive binary arithmetic code (CABAC) can be used as the arithmetic coding.

The generated bitstream is encapsulated using a network abstraction layer (NAL) unit as a basic unit. The NAL unit includes a coded slice segment, and the slice segment consists of an integer number of coding tree units. In order to decode the bitstream in the video decoder, the bitstream should be separated into NAL units first, and then each separated NAL unit should be decoded.

Figure 2:
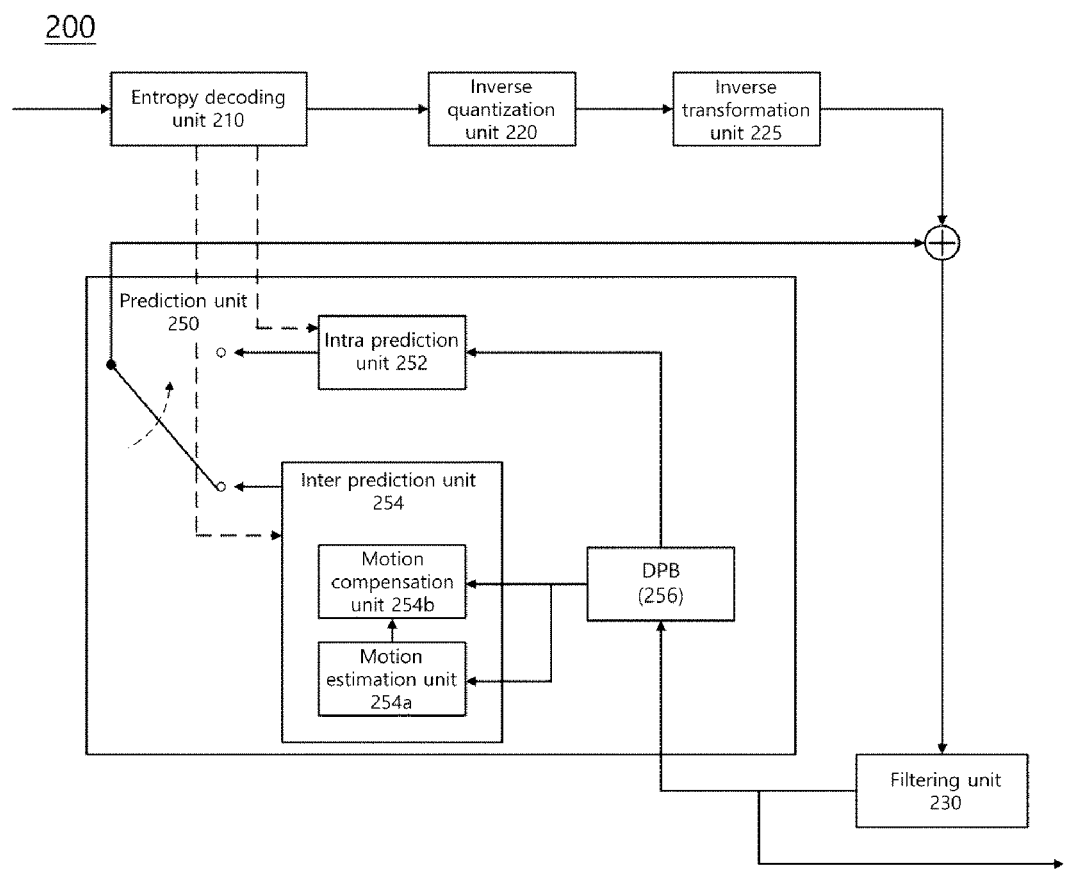
FIG. 2 is a schematic block diagram of a video signal decoder apparatus according to an embodiment of the present disclosure.

FIG. 2 is a schematic block diagram of a video signal decoding apparatus 200 according to an embodiment of the present disclosure. Referring to FIG. 2, the decoding apparatus 200 of the present disclosure includes an entropy decoding unit 210, an inverse quantization unit 220, an inverse transformation unit 225, a filtering unit 230, and a prediction unit 250.

The entropy decoding unit 210 performs entropy decoding on the video signal bitstream to extract a transform coefficient and motion information for each region. The inverse quantization unit 220 dequantizes the entropy-decoded transform coefficient, and the inverse transformation unit 225 reconstructs the original pixel value by using the dequantized transform coefficient.

Meanwhile, the filtering unit 230 improves picture quality by performing filtering on the picture. In this filtering unit, a deblocking filter for reducing block distortion and/or an adaptive loop filter for removing distortion from the entire picture can be included. The filtered picture is output or stored in a decoded picture buffer 256 to be used as a reference picture for the next frame.

Also, the prediction unit 250 of the present disclosure includes an intra prediction unit 252 and an inter prediction unit 254, and reconstructs the prediction picture using an encoding type, the transform coefficient for each region, motion information, etc. decoded through the entropy decoding unit 210 described above.

In this regard, the intra prediction unit 252 performs intra prediction from a decoded sample in the current picture. The inter prediction unit 254 generates a prediction picture by using the reference picture stored in the decoded picture buffer 256 and motion information. The inter prediction unit 254 can be configured to include a motion estimation unit 254*a* and a motion compensation unit 254*b* again. The motion estimation unit 254*a* obtains a motion vector indicating a positional relationship between the current block and a reference block of a reference picture used for coding, and transmits the obtained motion vector to the motion compensation unit 254*b*.

The predictor output from the intra prediction unit 252 or the inter prediction unit 254 and the pixel value output from the inverse transformation unit 225 are added to generate a reconstructed video frame.

Hereinafter, in the operation of the encoding apparatus 100 and the decoding apparatus 200, a method of splitting a coding unit and a prediction unit with reference to FIGS. 3 to 5 will be described.

The coding unit means a basic unit for processing a picture in the process of processing the video signal described above, for example, in the process of intra/inter prediction, transform, quantization, and/or entropy coding. A size of the coding unit used to code one picture may not be constant. A coding unit can have a rectangular shape, and one coding unit can be split into several coding units.

Figure 3:
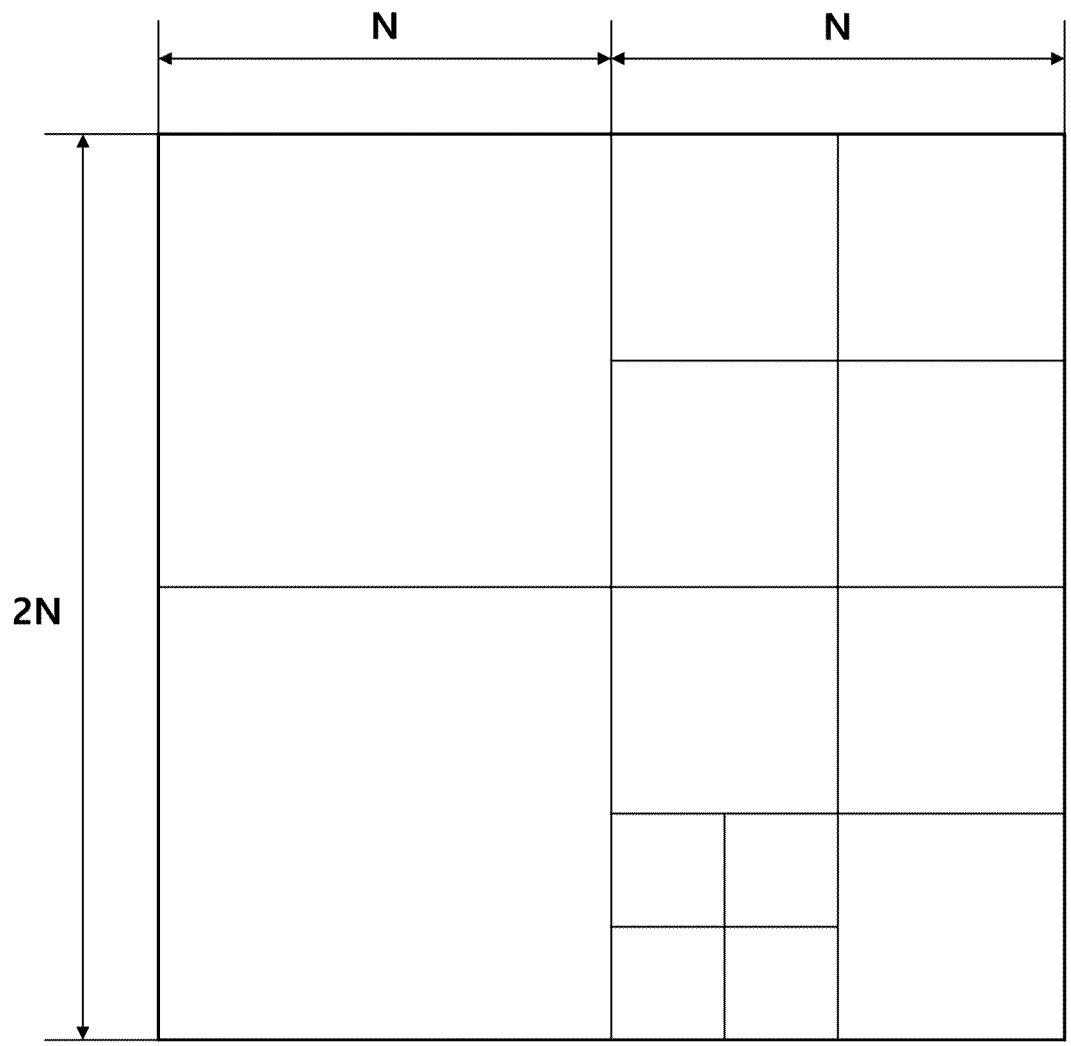
FIG. 3 is a diagram illustrating an embodiment of the present disclosure for splitting a coding unit.
Figure 4:
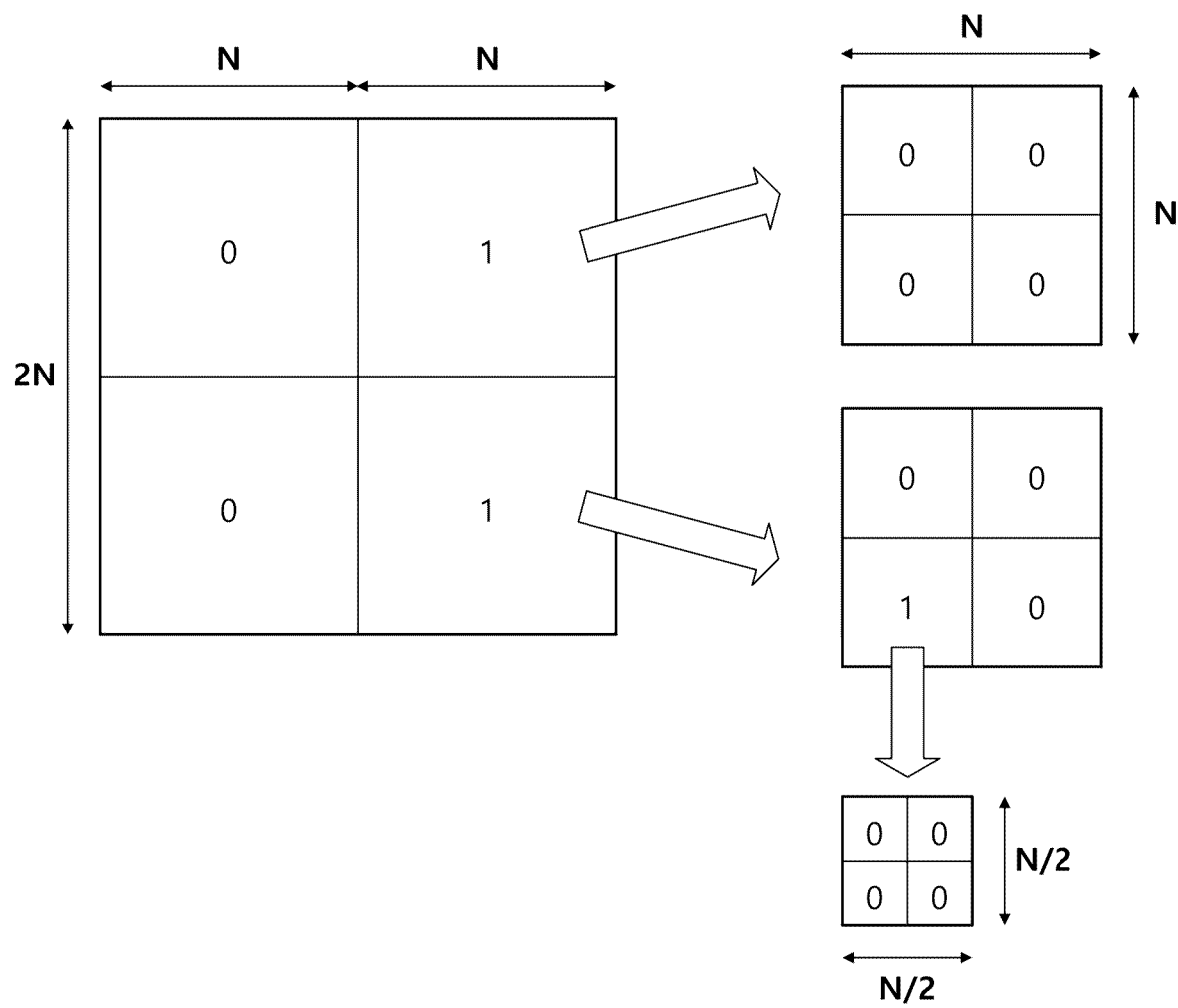
FIG. 4 is a diagram illustrating an embodiment of a method for hierarchically representing a split structure of FIG. 3.

FIG. 3 illustrates an embodiment of the present disclosure for splitting a coding unit. For example, one coding unit having a size of 2N×2N can be split into four coding units having a size of N×N again. The splitting of such a coding unit can be made recursively, and not all coding units need to be split in the same form. However, for convenience in coding and the process of processing, there may be restrictions on the size of the maximum coding unit and/or the size of the minimum coding unit.

With respect to one coding unit, information indicating whether or not the corresponding coding unit is split can be stored. FIG. 4 illustrates an embodiment of a method of hierarchically representing a split structure of the coding unit illustrated in FIG. 3 using a flag value. A value of '1' can be allocated to information when the unit is split, and a value of '0' can be allocated thereto when the unit is not split. As illustrated in FIG. 4, if the flag value indicating whether or not to split is 1, the coding unit corresponding to the corresponding node is again divided into 4 coding units. If the flag value is 0, the coding unit is no longer divided and a processing process for the coding unit can be performed.

The structure of the coding unit described above can be represented using a recursive tree structure. That is, a coding unit split into other coding units with one picture or maximum size coding unit as a root has as many child nodes as the number of split coding units. Therefore, a coding unit that is no longer split becomes a leaf node. Assuming that only square splitting is possible for one coding unit, since one coding unit can be split into a maximum of four other coding units, a tree representing the coding unit can be in the form of a quad tree.

In the encoder, an optimal size of a coding unit is selected according to a characteristic (e.g., resolution) of a video picture or in consideration of coding efficiency, and information about the optimal size of the coding unit or information with which the optimal size of the coding unit can be derived can be included in the bitstream. For example, the size of the largest coding unit and the maximum depth of the tree can be defined. In the case of performing square splitting, since the height and width of a coding unit are half of the height and width of a coding unit of a parent node, the minimum coding unit size can be obtained by using the above information. Or, conversely, the minimum coding unit size and the maximum depth of the tree can be predefined and used, and the size of the maximum coding unit can be derived and used by using the minimum coding unit size and the maximum depth of the tree. Since a size of a unit is changed in a multiple of 2 in square splitting, an actual size of the coding unit is expressed as a logarithmic value with a base of 2 to increase transmission efficiency.

The decoder can obtain information indicating whether or not the current coding unit is split. If such information is obtained (transmitted) only under a specific condition, efficiency can be increased. For example, since the condition that the current coding unit can be split is a case where a size of a unit obtained by adding the current coding unit size at the current position is smaller than the size of the picture and the current unit size is larger than the preset minimum coding unit size, information indicating whether or not the current coding unit is split can be obtained only in this case.

If the above information indicates that the coding unit is split, the size of the coding unit to be split becomes half of the current coding unit, and is split into four square coding units on the basis of the current processing position. The above processing can be repeated for each of the divided coding units.

Figure 5:
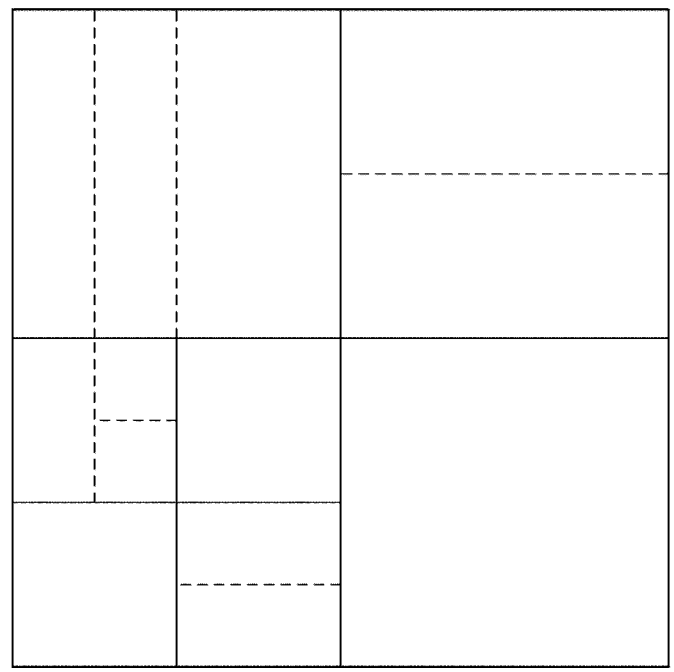
FIG. 5 is a diagram illustrating a further embodiment of the present disclosure for splitting the coding unit.

FIG. 5 illustrates a further embodiment of the present disclosure for splitting the coding unit. According to the further embodiment of the present disclosure, the quad tree-shaped coding unit described above can be further split into a binary tree structure of horizontal splitting or vertical splitting. That is, square quad-tree splitting can be applied to the root coding unit first, and rectangular binary tree splitting can be additionally applied at the leaf nodes of the quad tree. According to an embodiment, the binary tree splitting may be a symmetrical horizontal splitting or a symmetrical vertical splitting, but the present disclosure is not limited thereto.

In each split node of the binary tree, a flag indicating a split type (i.e., horizontal splitting or vertical splitting) can be additionally signaled. According to an embodiment, when the value of the flag is '0', horizontal splitting can be instructed, and when the value of the flag is '1', vertical splitting can be instructed.

However, the method of splitting the coding unit in the embodiment of the present disclosure is not limited to the methods described above and asymmetric horizontal/vertical splitting, a triple tree split into three rectangular coding units, etc. may be applied thereto.

Picture prediction (motion compensation) for coding is performed on a coding unit that is no longer divided (i.e., a leaf node of a coding unit tree). A basic unit for performing such prediction is hereinafter called a prediction unit or a prediction block.

Hereinafter, the term "unit" used in this specification may be used as a term replacing the prediction unit, which is a basic unit for performing prediction. However, the present disclosure is not limited thereto, and more broadly, the term may be understood as a concept including the coding unit.

In order to reconstruct the current unit on which decoding is performed, the current picture including the current unit or the decoded portion of other pictures can be used. A picture (slice) for which only the current picture is used for reconstruction, that is, for which only intra prediction is performed, is called an intra picture or an I picture (slice), and a picture (slice) for which both intra prediction and inter prediction can be performed for reconstruction is called an inter picture (slice). A picture (slice), which uses at most one motion vector and reference index to predict each unit, among inter pictures (slice) is called a predictive picture or a P picture (slice), and a picture (slice), which uses a maximum of two motion vectors and reference indices to predict each unit, among inter pictures (slice) is called a bi-predictive picture or a B picture (slice).

The intra prediction unit performs intra prediction for predicting a pixel value of a target unit from reconstructed regions in the current picture. For example, the pixel value of the current unit can be predicted from the reconstructed pixels of units located on the left and/or top centering on the current unit. In this case, the units located to the left of the current unit may include a left unit adjacent to the current unit, a top-left unit, and a bottom-left unit. Also, the units located at the top of the current unit may include a top unit adjacent to the current unit, a top-left unit, and a top-right unit.

Meanwhile, the inter prediction unit performs inter prediction for predicting the pixel value of the target unit by using information about other reconstructed pictures other than the current picture. In this case, a picture used for prediction is called a reference picture. Which reference region is to be used to predict the current unit in the inter prediction process can be indicated using an index indicating a reference picture including the corresponding reference region, motion vector information, etc.

Inter prediction may include L0 prediction, L1 prediction, and bi-prediction. L0 prediction means prediction using one reference picture included in L0 (zeroth reference picture list), and L1 prediction means prediction using one reference picture included in L1 (first reference picture list). To this end, one set of motion information (e.g., a motion vector and a reference picture index) may be required. In the bi-prediction method, a maximum of two reference regions can be used, and the two reference regions may exist in the same reference picture or in different pictures, respectively. That is, in the bi-prediction method, a maximum of two sets of motion information (e.g., a motion vector and a reference picture index) can be used, and the two motion vectors may correspond to the same reference picture index or different reference picture indices. In this case, the reference pictures can be displayed (or output) both before and after the current picture in terms of time.

A reference unit of the current unit can be obtained using the motion vector and the reference picture index. The reference unit exists in the reference picture having the reference picture index. Also, a pixel value of a unit specified by the motion vector or an interpolated value can be used as a predictor of the current unit. For motion prediction with pixel accuracy in units of sub-pels, for example, an 8-tap interpolation filter can be used for a luminance signal and a 4-tap interpolation filter can be used for a chrominance signal. However, the interpolation filter for motion prediction in units of subpels is not limited thereto. As described above, motion compensation for predicting a texture of the current unit from a previously decoded picture is performed using the motion information.

Hereinafter, an intra prediction method according to an embodiment of the present disclosure will be described in more detail with reference to FIGS. 6 and 7. As described above, the intra prediction unit predicts the pixel value of the current unit by using adjacent pixels located on the left and/or top of the current unit as reference pixels.

Figure 6:
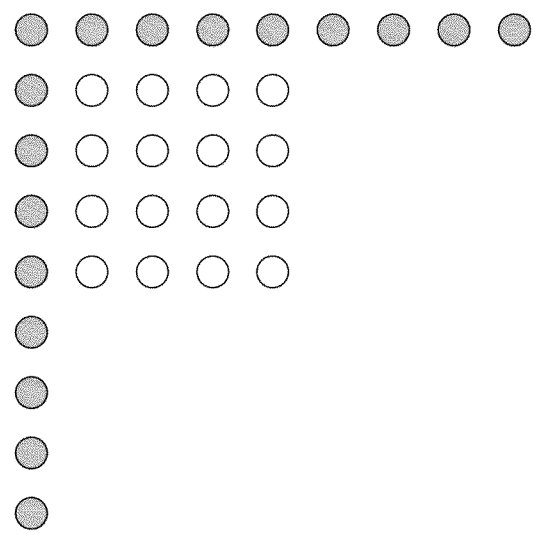
FIG. 6 is a diagram illustrating a method of obtaining a reference pixel for intra prediction.

As illustrated in FIG. 6, when the size of the current unit is N×N, the reference pixels can be set using a maximum of (4N+1) adjacent pixels located on the left and/or top of the current unit. When at least some adjacent pixels to be used as the reference pixels have not yet been reconstructed, the intra prediction unit may obtain the reference pixels by performing a reference sample padding process according to a preset rule. Also, the intra prediction unit may perform a reference sample filtering process in order to reduce an error in intra prediction. That is, the reference pixels may be obtained by performing filtering on adjacent pixels and/or pixels obtained by the reference sample padding process. The intra prediction unit predicts pixels of the current unit using the reference pixels obtained in this way.

FIG. 7 illustrates an embodiment of prediction modes used for intra prediction. For intra prediction, intra prediction mode information indicating an intra prediction direction can be signaled. When the current unit is the intra prediction unit, the video signal decoding apparatus extracts intra prediction mode information of the current unit from the bitstream. The intra prediction unit of the video signal decoding apparatus performs intra prediction for the current unit on the basis of the extracted intra prediction mode information.

According to an embodiment of the present disclosure, the intra prediction mode can include a total of 67 modes. Each intra prediction mode can be instructed through a preset index (i.e., intra mode index). For example, as illustrated in FIG. 7, intra mode index 0 can instruct a planar mode, intra mode index 1 can instruct a DC mode, and intra mode indices 2 to 66 can instruct different directional modes (i.e., angle modes), respectively. The intra prediction unit determines reference pixels and/or interpolated reference pixels to be used for intra prediction of the current unit on the basis of intra prediction mode information of the current unit. When the intra mode index instructs a specific direction mode, the reference pixel corresponding to the specific direction from the current pixel of the current unit or the interpolated reference pixel is used for prediction of the current pixel. Therefore, different sets of reference pixels and/or interpolated reference pixels can be used for intra prediction according to the intra prediction mode.

After intra prediction of the current unit is performed using the reference pixels and intra prediction mode information, the video signal decoding apparatus reconstructs pixel values of the current unit by adding the residual signal of the current unit obtained from the inverse transformation unit and intra predictor of the current unit.

FIG. 8 is a diagram illustrating inter prediction according to an embodiment of the present disclosure.

As described above, when encoding or decoding the current picture or block, it can be predicted from another picture or block. That is, it is possible to encode and decode the current picture or block on the basis of similarity with the other picture or block. The current picture or block can be encoded and decoded with signaling in which a portion similar to another picture or block is omitted from the current picture or block, which will be further described below. It is possible to make predictions in units of blocks.

Referring to FIG. 8, a reference picture exists on the left and a current picture exists on the right, and the current picture or a part of the current picture can be predicted using a similarity with the reference picture or a part of the reference picture. When a rectangle indicated by a solid line in the current picture of FIG. 8 is a block to be currently encoded and decoded, the current block can be predicted from a rectangle indicated by a dotted line in the reference picture. In this case, information indicating a block (reference block) to be referenced by the current block may exist, which may be directly signaled or may be constructed by any promise to reduce signaling overhead. The information indicating the block to be referenced by the current block can include a motion vector. This motion vector may be a vector indicating a relative position in a picture between the current block and the reference block. Referring to FIG. 8, a portion indicated by a dotted line of the reference picture exists, and a vector indicating how the current block can be moved to a block to be referenced in the reference picture may be the motion vector. That is, a block that appears when the current block is moved according to the motion vector may be the portion indicated by the dotted line in the current picture of FIG. 8, and the portion indicated by the dotted line may have the same position in the current picture as the position of the reference block of the reference picture.

Also, information indicating a block to be referenced by the current block may include information indicating a reference picture. Information indicating the reference picture may include a reference picture list and a reference picture index. The reference picture list is a list including reference pictures, and it is possible to use a reference block in a reference picture included in the reference picture list. That is, it is possible to predict the current block from the reference picture included in the reference picture list. Also, the reference picture index may be an index for indicating a reference picture to be used.

Figures 9, 10:
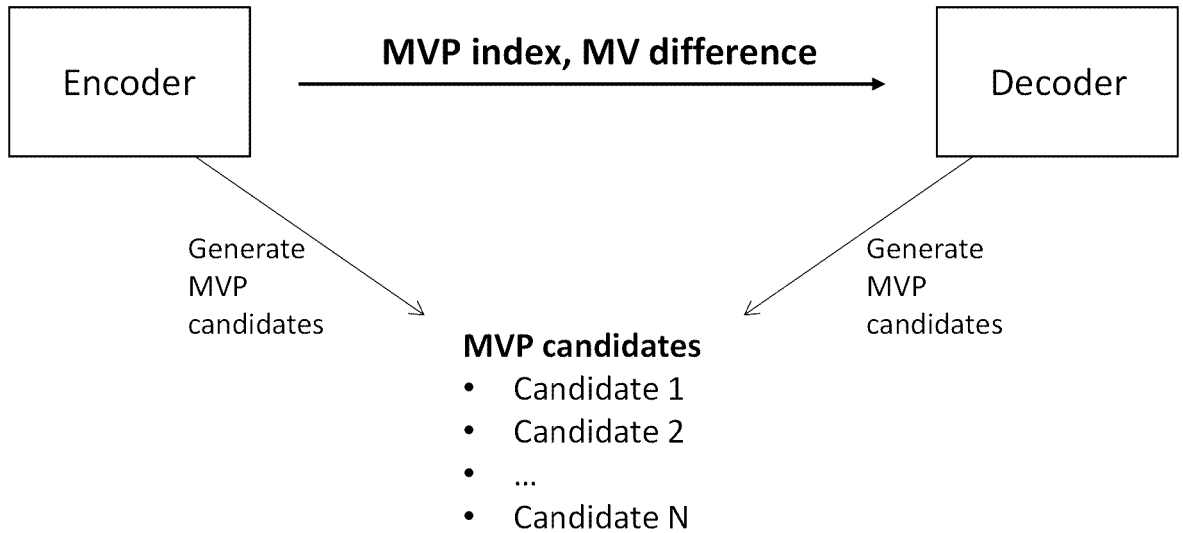
FIG. 9 is a diagram illustrating a method of signaling a motion vector according to an embodiment of the present disclosure.
FIG. 10 is a diagram illustrating motion vector difference syntax according to an embodiment of the present disclosure.

FIG. 9 is a diagram illustrating a method of signaling a motion vector according to an embodiment of the present disclosure.

According to an embodiment of the present disclosure, it is possible to generate a motion vector MV based on a motion vector predictor MVP. For example, the motion vector predictor can be the motion vector as illustrated below.

MV=MVP

As another example, the motion vector may be based on motion vector difference (MVD) as follows. The motion vector difference MVD can be added to the motion vector predictor in order to represent an accurate motion vector.

MV=MVP+MVD

Also, in video coding, the encoder can transmit determined motion vector information to the decoder, and the decoder can generate a motion vector from the received motion vector information and determine a prediction block. For example, the motion vector information may include information about a motion vector predictor and a motion vector difference. In this case, the components of the motion vector information may vary according to mode. For example, in merge mode, the motion vector information may include information about the motion vector predictor, but may not include the motion vector difference. As another example, in advanced motion vector prediction (AMVP) mode, the motion vector information may include information about the motion vector predictor and may include the motion vector difference.

In order to determine, transmit, and receive information about the motion vector predictor, the encoder and the decoder can generate motion vector predictor MVP candidates (motion vector predictor candidates) in the same way. For example, the encoder and the decoder can generate the same MVP candidate (motion vector predictor candidate) in the same order. And, the encoder can transmit an index mvp_1x_flag indicating the MVP (motion vector predictor) determined from the generated MVP candidates (motion vector predictor candidates) to the decoder, and the decoder can find out the MVP (motion vector predictor) and MV determined on the basis of this index mvp_1x_flag. The index mvp_1x_flag can include a motion vector predictor index mvp_10_flag of the zeroth reference picture list list 0 and a motion vector predictor index mvp_11_flag of the first reference picture list list 1. A method of receiving the index mvp_1x_flag will be described with reference to FIGS. 56 to 59.

The MVP candidate and MVP candidate generation method may include a spatial candidate, a temporal candidate, etc. The spatial candidate may be a motion vector for a block located at a predetermined position from the current block. For example, the spatial candidate may be a motion vector corresponding to a block or position that is adjacent to or not adjacent to the current block. The temporal candidate may be a motion vector corresponding to a block in a picture different from the current picture. Alternatively, the MVP candidate may include an affine motion vector, ATMVP, STMVP, a combination of motion vectors described above, an average vector of the motion vectors described above, a zero motion vector, etc.

Also, information indicating the reference picture described above may also be transmitted from the encoder to the decoder. Also, when the reference picture corresponding to the MVP candidate does not correspond to information indicating the reference picture, motion vector scaling can be performed. Motion vector scaling may be a calculation based on a picture order count (POC) of the current picture, the POC of the reference picture of the current block, the POC of the reference picture of the MVP candidate, and the MVP candidate.

FIG. 10 is a diagram illustrating motion vector difference syntax according to an embodiment of the present disclosure.

The motion vector difference can be coded by dividing a sign and an absolute value of the motion vector difference. That is, the sign and the absolute value of the motion vector difference may be different syntax. Also, the absolute value of the motion vector difference may be directly coded, but can be coded including a flag indicating whether or not the absolute value is greater than N as illustrated in FIG. 10. If the absolute value is greater than N, a value of (absolute value−N) can be signaled together. In the example of FIG. 10, abs_mvd_greater0_flag can be transmitted, and this flag may be a flag indicating whether or not the absolute value is greater than 0. If abs_mvd_greater0_flag is indicated that the absolute value is not greater than 0, it may be determined that the absolute value is 0. Also, if abs_mvd_greater0_flag is indicated that the absolute value is greater than 0, additional syntax may exist. For example, abs_mvd_greater_flag may exist, and this flag may be a flag indicating whether or not the absolute value is greater than 1. If abs_mvd_greater1_flag is indicated that the absolute value is not greater than 1, it may be determined that the absolute value is 1. If abs_mvd_greater_flag indicates that the absolute value is greater than 1, additional syntax may exist. For example, abs_mvd_minus2 may exist, which may be a value of (absolute value−2). It indicates (absolute value−2) because the absolute value was determined to be greater than 1 (more than 2) through the abs_mvd_greater0_flag and abs_mvd_greater_flag described above. When abs_mvd_minus2 is binarized with variable length, it is for signaling with fewer bits. For example, there are variable length binarization methods such as Exp-Golomb, truncated unary, and truncated rice. Also, mvd_sign_flag may be a flag indicating the sign of the motion vector difference.

Although the coding method has been described through motion vector difference in this embodiment, information other than the motion vector difference can also be divided about the sign and absolute value and the absolute value can be coded with a flag indicating whether or not the absolute value is greater than a certain value and a value obtained by subtracting the certain value from the absolute value. Also, [0] and [1] in FIG. 10 may represent component indices. For example, [0] and [1] can represent x-component and y-component.

Figure 11:
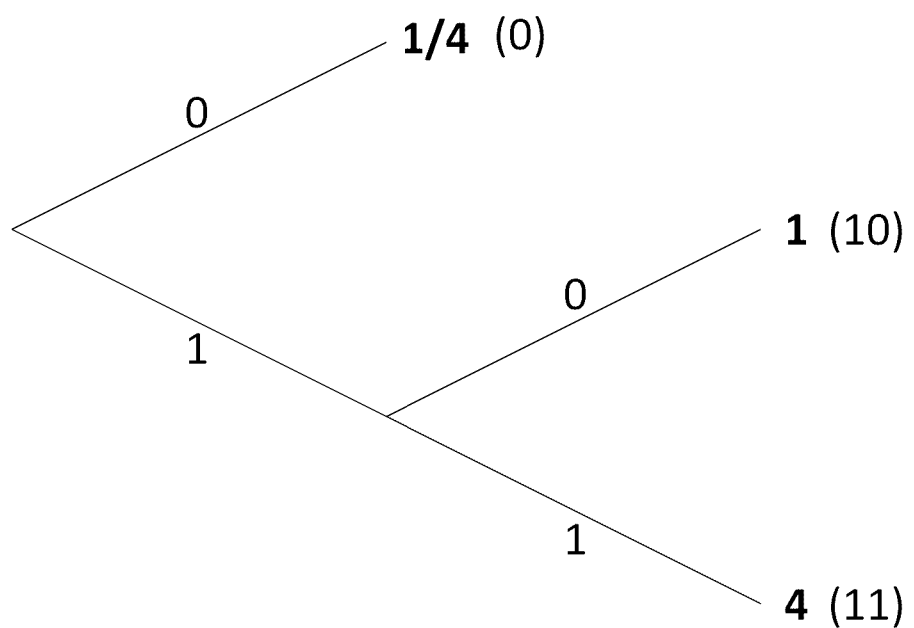
FIG. 11 is a diagram illustrating signaling of adaptive motion vector resolution according to an embodiment of the present disclosure.

FIG. 11 is a diagram illustrating signaling of adaptive motion vector resolution according to an embodiment of the present disclosure.

According to an embodiment of the present disclosure, resolution indicating the motion vector or the motion vector difference may vary. In other words, the resolution at which the motion vector or motion vector difference is coded may vary. For example, resolution can be expressed in terms of pixels (pel). For example, the motion vector or the motion vector difference can be signaled in units of quarter ¼ (quarter) pixels, ½ (half) pixels, 1 (integer) pixel, 2 pixels, 4 pixels, etc. When it is desired to represent 16, it can be coded as (¼*64=16) in order to perform signaling in units of/14, it can be coded as 4 (1*16=16) in order to perform signaling in units of 1, and it can be coded as 4 (4*4=16) in order to perform signaling in units of 4. That is, the value can be determined as follows.

valueDetermined=resolution*valuePerResolution

Here, valueDetermined is a value to be transmitted, and may be a motion vector motion vector or a motion vector difference in this embodiment. Also, valuePerResolution may be a value obtained by expressing valueDetermined in units of [/resolution].

In this case, if the value signaled as the motion vector or motion vector difference is not divided by resolution, it is possible to send an inaccurate value other than the motion vector or motion vector difference, which has best prediction performance through rounding, etc. When using high resolution, inaccuracy can be reduced, but since the coded value is large, many bits can be used, and when using low resolution, inaccuracy can be increased, but since the coded value is small, fewer bits can be used.

It is also possible to set the resolution differently in units of block, CU, slice, etc. Therefore, resolution can be applied adaptively to fit the unit.

The resolution can be signaled from the encoder to the decoder. In this case, the signaling for resolution may be signaling binarized with the variable length described above.

In this case, when signaling is performed with the index corresponding to the smallest value (frontmost value), the signaling overhead is reduced.

In one embodiment, signaling indices can be matched in the order from high resolution (signaling in detail) to low resolution.

FIG. 11 illustrates signaling for three types of resolutions. In this case, the three signalings may be 0, 10, and 11, and each of the three signalings may correspond to resolution 1, resolution 2, and resolution 3. Signaling overhead is low when signaling resolution 1 because 1 bit is required to signal resolution 1 and 2 bits are required to signal the remaining resolutions. In the example of FIG. 11, resolution 1, resolution 2, and resolution 3 are ¼ pels, 1 pel, and 4 pels, respectively.

In the following disclosures, motion vector resolution may mean resolution of the motion vector difference.

FIG. 12 is a diagram illustrating signaling of adaptive motion vector resolution according to an embodiment of the present disclosure.

As described with reference to FIG. 11, since the number of bits required to signal resolution may vary depending on resolution, it is possible to change the signaling method according to the case. For example, a signaling value for signaling a certain resolution may be different depending on the case. For example, the signaling index and resolution can be matched in a different order depending on the case. For example, the resolutions corresponding to signaling 0, 10, 110, . . . may be respectively resolution 1, resolution 2, resolution 3, . . . in a certain case, and may be in a different order than resolution 1, resolution 2, resolution 3, . . . , respectively, in another case. It is also possible to define two or more cases.

Referring to FIG. 12, the resolutions corresponding to 0, 10, and 11 may be resolution 1, resolution 2, and resolution 3 in Case 1, respectively, and may be resolution 2, resolution 1, and resolution 3 in Case 2, respectively. In this case, there may be two or more Cases.

FIG. 13 is a diagram illustrating signaling of adaptive motion vector resolution signaling according to an embodiment of the present disclosure.

As described with reference to FIG. 12, the motion vector resolution can be signaled differently depending on the case. For example, assuming that resolutions of ¼, 1, and 4 pel exist, in some cases, the signaling as described with reference to FIG. 11 may be used, and in some cases, the signaling illustrated in FIG. 13(a) or 13(b) may be used. It is possible that only two cases or all three of the cases of FIGS. 11, 13(a), and 13(b) exist. Therefore, in some cases, it is possible to signal a resolution that is not the highest resolution with fewer bits.

FIG. 14 is a diagram illustrating signaling of adaptive motion vector resolution according to an embodiment of the present disclosure.

According to an embodiment of the present disclosure, a possible resolution may be changed depending on a case in the adaptive motion vector resolution described with reference to FIG. 11. For example, a resolution value may change depending on the case. In one embodiment, it is possible to use the resolution value among resolution 1, resolution 2, resolution 3, resolution 4, . . . in a certain situation and use the resolution value among resolution A, resolution B, resolution C, resolution D, . . . in another case. Also, there may be a non-empty intersection between {resolution 1, resolution 2, resolution 3, resolution 4, . . . } and {resolution B, resolution C, resolution D, . . . }. That is, a certain resolution value may be used in two or more cases, and in the two or more cases, the set of usable resolution values may be different. Also, the number of usable resolution values may be different for each case.

Referring to FIG. 14, Resolution 1, Resolution 2, and Resolution 3 can be used in Case 1, and Resolution A, Resolution B, and Resolution C can be used in Case 2. For example, Resolution 1, Resolution 2, and Resolution 3 may be ¼, 1, and 4 pel. Also, for example, Resolution A, Resolution B, and Resolution C may be ¼, ½, and 1 pel.

FIG. 15 is a diagram illustrating signaling of adaptive motion vector resolution according to an embodiment of the present disclosure.

Referring to FIG. 15, resolution signaling may be made different according to a motion vector candidate or motion vector predictor candidate. For example, it may relate to which case described in FIGS. 12 to 14 is selected, or which candidate the signaled motion vector or motion vector predictor is. A method of making signaling different may follow the method of FIGS. 12 to 14.

For example, the case can be defined differently depending on where it is located among candidates. Alternatively, the case can be defined differently depending on how the candidate was constructed.

The encoder or decoder may generate a candidate list including at least one MV candidate (motion vector candidate) or at least one MVP candidate (motion vector predictor candidate). There may be a tendency that the MVP (motion vector predictor) at the front in the candidate list for the MV candidate (motion vector candidate) or MVP candidate (motion vector predictor candidate) has high accuracy and the MVP candidate (motion vector predictor candidate) at the back has low accuracy in the candidate list. This may be designed so that the candidate at the front in the candidate list is signaled with fewer bits, and the MVP (motion vector predictor) at the front in the candidate list has higher accuracy. In the embodiment of the present disclosure, if the accuracy of the MVP (motion vector predictor) is high, a motion vector difference (MVD) value for representing the motion vector with good prediction performance may be small, and if the accuracy of the MVP (motion vector predictor) is low, the MVD (motion vector difference) value for representing the motion vector with good prediction performance may be large. Therefore, when the accuracy of the MVP is low, it is possible to reduce the bits (e.g., a value representing the difference value based on resolution) required to represent the motion vector difference value by signaling at low resolution.

With this principle, since low resolution can be used when the MVP (motion vector predictor) accuracy is low, according to an embodiment of the present disclosure, it can be promised that resolution other than the highest resolution is signaled with the fewest bits according to the MVP candidate (motion vector predictor candidate). For example, when resolution of ¼, 1, or 4 pel is possible, 1 or 4 can be signaled with the fewest bits (1-bit). Referring to FIG. 15, for Candidate 1 and Candidate 2, ¼ pel, which is high resolution, is signaled with the fewest bits, and for Candidate N which is behind Candidate 1 and Candidate 2, resolution, which is not ¼ pel, is signaled with the fewest bits.

FIG. 16 is a diagram illustrating signaling of adaptive motion vector resolution according to an embodiment of the present disclosure.

As described with reference to FIG. 15, motion vector resolution signaling may be made different depending on which candidate the determined motion vector or motion vector predictor is. A method of making signaling different may follow the method of FIGS. 12 to 14.

Referring to FIG. 16, high resolution is signaled with the fewest bits for some candidates, and resolution other than high resolution is signaled with the fewest bits for some candidates. For example, a candidate for which resolution other than high resolution is signaled with the fewest bits may be an incorrect candidate. For example, a candidate for which resolution other than high resolution is signaled with the fewest bits may be a temporal candidate, a zero motion vector, a non-adjacent spatial candidate, a candidate according to whether or not there is a refinement process, etc.

The temporal candidate may be a motion vector from another picture. The zero motion vector may be a motion vector in which all vector components are 0. A non-adjacent spatial candidate may be a motion vector referenced from a position not adjacent to the current block. The refinement process may be a process of refining the motion vector predictor, for example, it may be refined through template matching, bilateral matching, etc.

According to an embodiment of the present disclosure, it is possible to add the motion vector difference after refining the motion vector predictor. This may be to reduce the motion vector difference value by making the motion vector predictor accurate. In this case, motion vector resolution signaling may be made different for a candidate without a refinement process. For example, resolution that is not the highest resolution can be signaled with the fewest bits.

According to another embodiment, after adding the motion vector difference to the motion vector predictor, the refinement process can be performed. In this case, for the candidate that has the refinement process, motion vector resolution signaling may be made different. For example, resolution that is not the highest resolution can be signaled with the fewest bits. This may be because, since the refinement process will be performed after adding the motion vector difference, it is possible to reduce a prediction error through the refinement process even if the MV difference (motion vector difference) is not signaled as accurately as possible (so that the prediction error is small).

As another example, when a selected candidate is different from another candidate by a certain value or more, motion vector resolution signaling can be changed.

In another embodiment, depending on which candidate the determined motion vector or motion vector predictor is, a subsequent motion vector refinement process may be made different. The motion vector refinement process may be a process for finding a more accurate motion vector. For example, the motion vector refinement process may be a process of finding a block matching the current block according to a set appointment from a reference point (e.g., template matching or bilateral matching). The reference point may be a position corresponding to the determined motion vector or motion vector predictor. In this case, the degree of movement from the reference point may vary according to a set agreement, and making the motion vector refinement process different may be to make the degree of movement from the reference point different. For example, the motion vector refinement process may start with a detailed refinement process for an accurate candidate, and start with a less detailed refinement process for an inaccurate candidate. The accurate candidate and inaccurate candidate may be determined according to a position in the candidate list or how a candidate is generated. How the candidate is generated may be about the position from which the spatial candidate was brought. Also, reference may be made to the description of FIG. 16 for this. Also, a detailed refinement or a less detailed refinement may be whether a matching block is found while moving a little or while moving a lot from the reference point. Also, in the case of finding the matching block while moving a lot, it is possible to add a process of finding while moving little by little from the most matching block found while moving a lot.

In another embodiment, motion vector resolution signaling can be changed on the basis of the POC of the current picture and the POC of the reference picture of the motion vector or motion vector predictor candidate. A method of making signaling different may follow the method of FIGS. 12 to 14.

For example, when the difference between the picture order count (POC) of the current picture and the POC of the reference picture of the motion vector or motion vector predictor candidate is large, the motion vector or motion vector predictor may be inaccurate, and resolution other than high resolution can be signaled with the fewest bits.

As another example, motion vector resolution signaling can be changed based on whether or not motion vector scaling needs to be performed. For example, when the selected motion vector or motion vector predictor is a candidate for which performing motion vector scaling is performed, resolution other than high resolution can be signaled with the fewest bits. The case of performing motion vector scaling may be a case where the reference picture for the current block and the reference picture of the referenced candidate are different.

FIG. 17 is a diagram illustrating affine motion prediction according to an embodiment of the present disclosure.

In the conventional prediction method as described with reference to FIG. 8, it is possible to predict the current block from a block from a moved position without rotation or scaling. It can be predicted from a reference block of the same size, shape, and angle as the current block. FIG. 8 is only a translation motion model. However, the content contained in an actual image can have more complex movement, and prediction performance can be further improved if predicted from various shapes.

Referring to FIG. 17, a block currently predicted is indicated by a solid line in the current picture. The current block can be predicted by referring to a block having a different shape, size, and angle from the currently predicted block, and the reference block is indicated by a dotted line in the reference picture. The same position as the position in the picture of the reference block is indicated by a dotted line in the current picture. In this case, the reference block may be a block represented by affine transformation in the current block. Through this, it is possible to represent stretching (scaling), rotation, shearing, reflection, orthogonal projection, etc.

The number of parameters representing affine motion and affine transformation may vary. If more parameters are used, more various motions can be represented than when fewer parameters are used, but there is a possibility that overhead may occur in signaling or calculation, etc.

For example, affine transformation can be represented by 6 parameters. Alternatively, the affine transformation may be represented by three control point motion vectors.

FIG. 18 is a diagram illustrating affine motion prediction according to an embodiment of the present disclosure.

It is possible to represent complex movement using affine transformation as in FIG. 17, but in order to reduce signaling overhead and computation for this, simpler affine motion prediction or affine transformation can be used. By restricting movement, simpler affine motion prediction can be made. Restricting movement may restrict the shape of the current block being transformed into a reference block.

Referring to FIG. 18, affine motion prediction can be performed using control point motion vectors of v0 and v1. Using two vectors v0 and v1 may be equivalent to using four parameters. With the two vectors v0 and v1 or the four parameters, it is possible to indicate from which shape of the reference block the current block is predicted. By using such a simple affine transformation, it is possible to represent the movement of rotation and scaling (zoom in/out) of the block. Referring to FIG. 18, the current block indicated by a solid line may be predicted from a position indicated by a dotted line in FIG. 18 in the reference picture. Each point (pixel) of the current block can be mapped to another point through affine transformation.

Figures 19, 20:
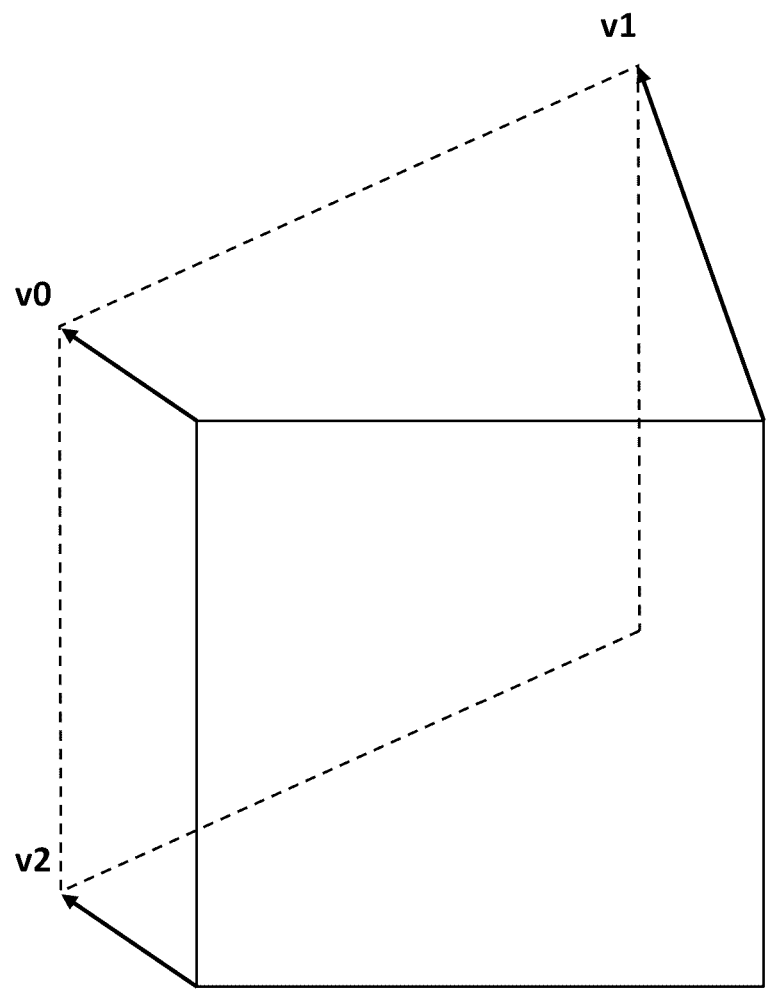
FIG. 19 is an expression illustrating a motion vector field according to an embodiment of the present disclosure.
FIG. 20 is a diagram illustrating affine motion prediction according to an embodiment of the present disclosure.

FIG. 19 is an expression illustrating a motion vector field according to an embodiment of the present disclosure. The control point motion vector v0 in FIG. 18 may be (v_0x, v_0y) and may be a motion vector of a top-left corner control point. Also, the control point motion vector v1 may be (v_1x, v_1y) and may be a motion vector of a top-right corner control point. In this case, the motion vector (v_x, v_y) at (x, y) position may be as illustrated in FIG. 19. Therefore, a motion vector for each pixel position or a certain position can be estimated according to the expression of FIG. 19, which is based on v0 and v1.

Also, (x, y) in the expression of FIG. 19 may be a relative coordinate within the block. For example, (x, y) may be a position when the left top position of the block is (0, 0).

If v0 is the control point motion vector for the position (x0, y0) on the picture and v1 is the control point motion vector for the position (x1, y1) on the picture, if it is intended to represent the position (x, y) within the block using the same coordinates as the positions of v0, v1, it can be represented by changing x and y to (x−x0) and (y−y0) in the expression of FIG. 19, respectively. Also, w (width of block) may be (x1−x0).

FIG. 20 is a diagram illustrating affine motion prediction according to an embodiment of the present disclosure.

According to an embodiment of the present disclosure, affine motion can be represented using a plurality of control point motion vectors or a plurality of parameters.

Referring to FIG. 20, affine motion prediction may be performed using control point motion vectors of v0, v1, and v2. Using three vectors v0, v1, v2 may be equivalent to using six parameters. The three vectors v0, v1, and v2 or the six parameters may indicate from what shape of the reference block the current block is predicted. Referring to FIG. 20, a current block indicated by a solid line may be predicted from a position indicated by a dotted line in FIG. 20 in the reference picture. Each point (pixel) of the current block can be mapped to another point through affine transformation.

FIG. 21 is an expression illustrating a motion vector field according to an embodiment of the present disclosure. In FIG. 20, the control point motion vector v0 may be (mv_0^x, mv_0^y) and may be the motion vector of the top-left corner control point, the control point motion vector v1 may be (mv_1^x, mv_1^y) and may be the motion vector of the top-right corner control point, and the control point motion vector v2 may be (mv_2^x, mv_2^y) and may be the motion vector of the bottom-left corner control point. In that case, the motion vector (mv^x, mv^y) of the (x, y) position may be as illustrated in FIG. 21. Therefore, a motion vector for each pixel position or a certain position can be estimated according to the expression of FIG. 21, which is based on v0, v1, and v2.

Also, (x, y) in the expression of FIG. 21 may be a relative coordinate within a block. For example, (x, y) may be a position when the left top position of the block is (0, 0).

Therefore, if it is assumed that v0 is the control point motion vector for the position (x0, y0), v1 is the control point motion vector for the position (x1, y1), and v2 is the control point motion vector for the position (x2, y2) and it is intended to represent (x, y) using the same coordinates as the positions of v0, v1, and v2, it can be represented by changing x and y to (x−x0) and (y−y0) in the expression of FIG. 21, respectively. Also, w (width of block) may be (x1−x0), and h (height of block) may be (y2−y0).

Figure 22:
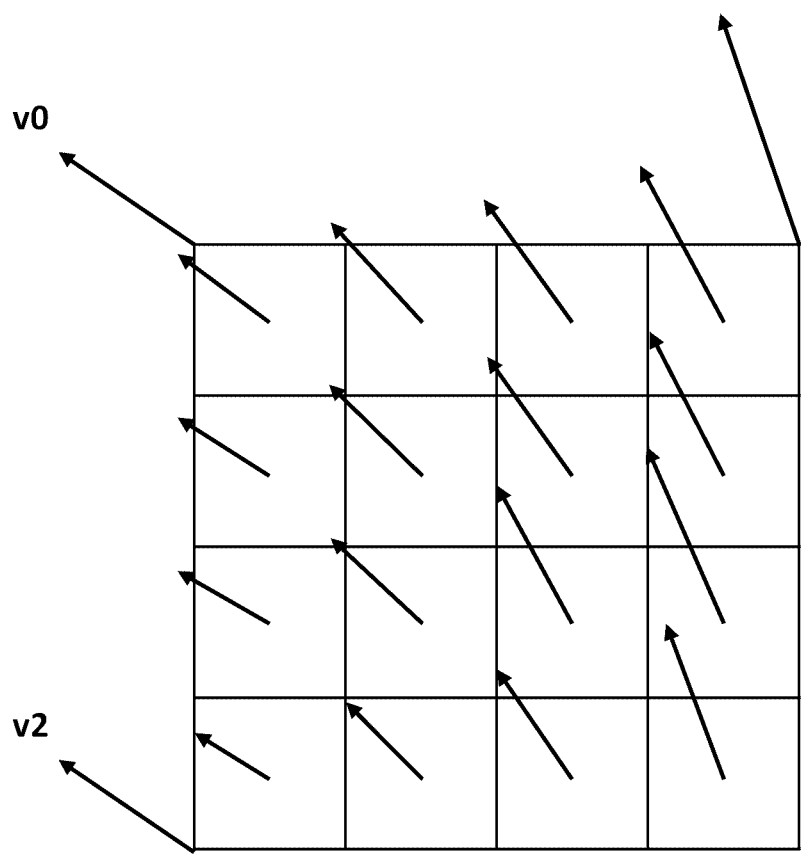
FIG. 22 is a diagram illustrating affine motion prediction according to an embodiment of the present disclosure.

FIG. 22 is a diagram illustrating affine motion prediction according to an embodiment of the present disclosure.

As described above, a motion vector field exists, and a motion vector can be calculated for each pixel, but for simplicity, affine transformation can be performed on a subblock basis as illustrated in FIG. 22. For example, a small rectangle in FIG. 22(a) is a subblock, a representative motion vector of the subblock can be constructed, and the representative motion vector can be used for pixels of the subblock. Also, as the complex movement was represented in FIGS. 17, 18, 20, etc., a subblock can correspond to a reference block by representing such a movement, or it may be made simpler by applying only a translation motion to the subblock. In FIG. 22(a), v0, v1, and v2 may be control point motion vectors.

In this case, the size of the subblock may be M*N, and M and N may be the same as illustrated in FIG. 22(b). And, MvPre may be motion vector fraction accuracy. Also, (v_0x, v_0y), (v_1x, v_1y), and (v_2x, v_2y) may be motion vectors of top-left, top-right, and bottom-left control points, respectively. (v_2x, v_2y) may be the motion vector of the bottom-left control point of the current block, for example, in the case of 4-parameter, it may be the MV (motion vector) for the bottom-left control point calculated by the expression of FIG. 19.

Also, when constructing a representative motion vector of a subblock, it is possible to calculate the representative motion vector using the center sample position of the subblock. Also, when constructing the motion vector of a subblock, a motion vector with higher accuracy than a normal motion vector can be used, and for this, a motion compensation interpolation filter can be applied.

In another embodiment, the size of the subblock is not variable and may be fixed to a specific size. For example, the subblock size may be fixed to 4*4 size.

Figure 23:
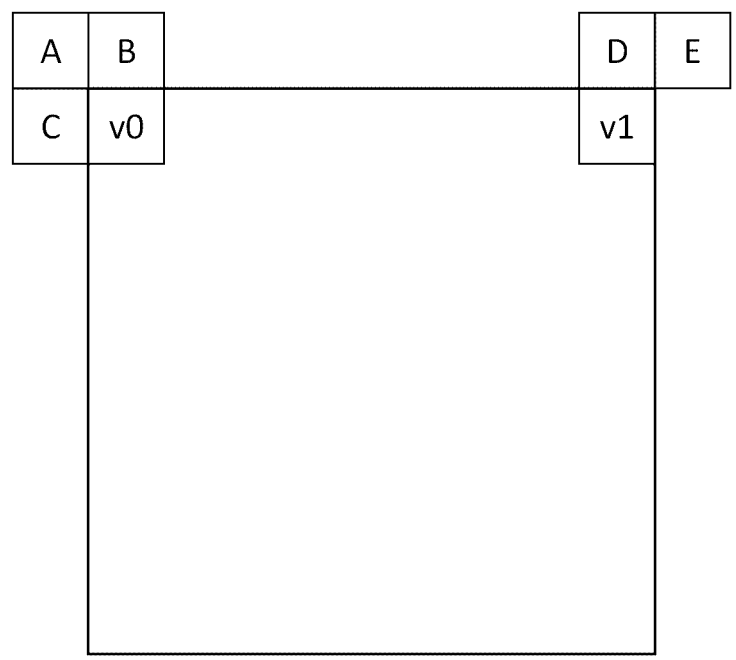
FIG. 23 is a diagram illustrating one mode of affine motion prediction according to an embodiment of the present disclosure.

FIG. 23 is a diagram illustrating one mode of affine motion prediction according to an embodiment of the present disclosure.

According to an embodiment of the present disclosure, there may be affine inter mode as an example of affine motion prediction. There may be a flag indicating that it is affine inter mode. Referring to FIG. 23, there may be blocks at positions A, B, C, D, and E near v0 and v1, and motion vectors that respectively correspond to the blocks can be called vA, vB, vC, vD, vE. Using this, it is possible to construct a candidate list for the following motion vectors or motion vector predictors.

$$\{(v0,v1)|v0=\{vA,vB,vC\},v1=\{vD,vE\}\}$$

That is, a (v0, v1) pair can be constructed with v0 selected from vA, vB, and vC and v1 selected from vD and vE. In this case, the motion vector can be scaled according to a picture order count (POC) of reference of a neighbor block, the POC of reference for current CU (current coding unit; current block), and the POC of the current CU. When a candidate list is constructed with the same motion vector pairs as described above, it is possible to signal which candidate of the candidate list is selected and whether it is selected. Also, if the candidate list is not sufficiently filled, it is possible to fill the candidate list with other inter prediction candidates. For example, it can be filled using advanced motion vector prediction (AMVP) candidates. Also, it is possible to signal the difference to be used for correction rather than directly using v0 and v1 selected from the candidate list as the control point motion vector of affine motion prediction, thereby capable of constructing a better control point motion vector. That is, in the decoder, it is possible to use v0' and v1' constructed by adding the difference to v0 and v1 selected from the candidate list as control point motion vectors for affine motion prediction.

In one embodiment, it is also possible to use the affine inter mode for a coding unit (CU) of a specific size or more.

FIG. 24 is a diagram illustrating one mode of affine motion prediction according to an embodiment of the present disclosure.

According to an embodiment of the present disclosure, there may be affine merge mode as an example of affine motion prediction. There may be a flag indicating that it is the affine merge mode. In the affine merge mode, when affine motion prediction is used around the current block, the control point motion vector of the current block can be calculated from motion vectors of the block or around the block. For example, when checking whether a neighboring block uses affine motion prediction, the neighboring block which becomes a candidate may be as illustrated in FIG. 24(a). Also, it is possible to check whether affine motion prediction is used in the order of A, B, C, D, and E, and when a block that uses affine motion prediction is found, the control point motion vector of the current block can be calculated using the motion vectors of the block or around the block. A, B, C, D, and E may be left, above, above right, left bottom, above left, respectively, as illustrated in FIG. 24(a).

In an embodiment, when the block at position A uses affine motion prediction as illustrated in FIG. 24(b), v0 and v1 can be calculated using the motion vectors of the block or around the block. The motion vectors around the block may be v2, v3, and v4.

In the previous embodiment, the order of the neighboring blocks to be referenced is determined. However, performance of a control point motion vector derived from a specific location does not always better. Therefore, in another embodiment, it is possible to signal whether to derive the control point motion vector by referring to a block located at which position. For example, the candidate positions of control point motion vector derivation are determined in the order of A, B, C, D, and E of FIG. 24(a), and it is possible to signal the candidate position to be referred to.

In another embodiment, when deriving the control point motion vector, the accuracy can be increased by taking it from a nearby block for each control point motion vector. For example, referring to FIG. 24, the left block may be referred to when deriving v0, and the above block may be referred to when deriving v1. Alternatively, A, D, or E may be referred to when deriving v0, and B or C may be referred to when deriving v1.

Figure 25:
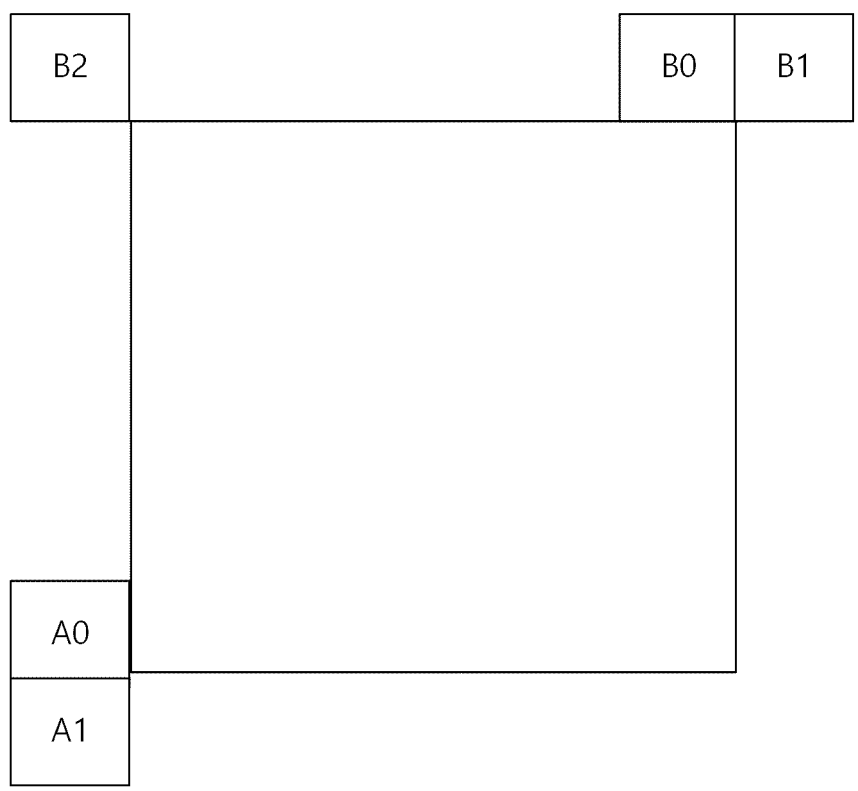
FIG. 25 is a diagram illustrating affine motion predictor derivation according to an embodiment of the present disclosure.

FIG. 25 is a diagram illustrating affine motion predictor derivation according to an embodiment of the present disclosure.

Control point motion vectors may be required for affine motion prediction, and a motion vector field, i.e., a motion vector for a subblock or a certain position, may be calculated based on the control point motion vectors. The control point motion vector may be called a seed vector.

In this case, the control point MV (control point motion vector) may be based on a predictor. For example, the predictor can be a control point MV (control point motion vector). As another example, the control point MV may be calculated based on a predictor and difference. Specifically, the control point MV (control point motion vector) can be calculated by adding or subtracting the difference to and from the predictor.

In this case, in the process of constructing the predictor of the control point MV, it is possible to derive it from the control point MVs (control point motion vectors) or MVs (motion vectors) of the neighboring block for which affine motion prediction (affine motion compensation (MC)) is performed. For example, if a block corresponding to a preset position is subjected to affine motion prediction, a predictor for affine motion compensation of the current block can be derived from control point MVs or MVs of the block. Referring to FIG. 25, preset positions may be A0, A1, B0, B1, and B2. Alternatively, the preset positions may include a position adjacent to the current block and a position not adjacent to the current block. Also, it is possible to refer to the control point MVs (control point motion vectors) or MVs (motion vectors) at a preset position (spatial), and it is possible to refer to temporal control point MVs or MVs at a preset position.

A candidate of affine motion compensation (MC) can be constructed in the same way as in the embodiment of FIG. 25, and this candidate can also be called an inherited candidate. Alternatively, such a candidate may be called a merge candidate. Also, when referring to the preset positions in the method of FIG. 25, reference may be made in a preset order.

Figures 26, 27:
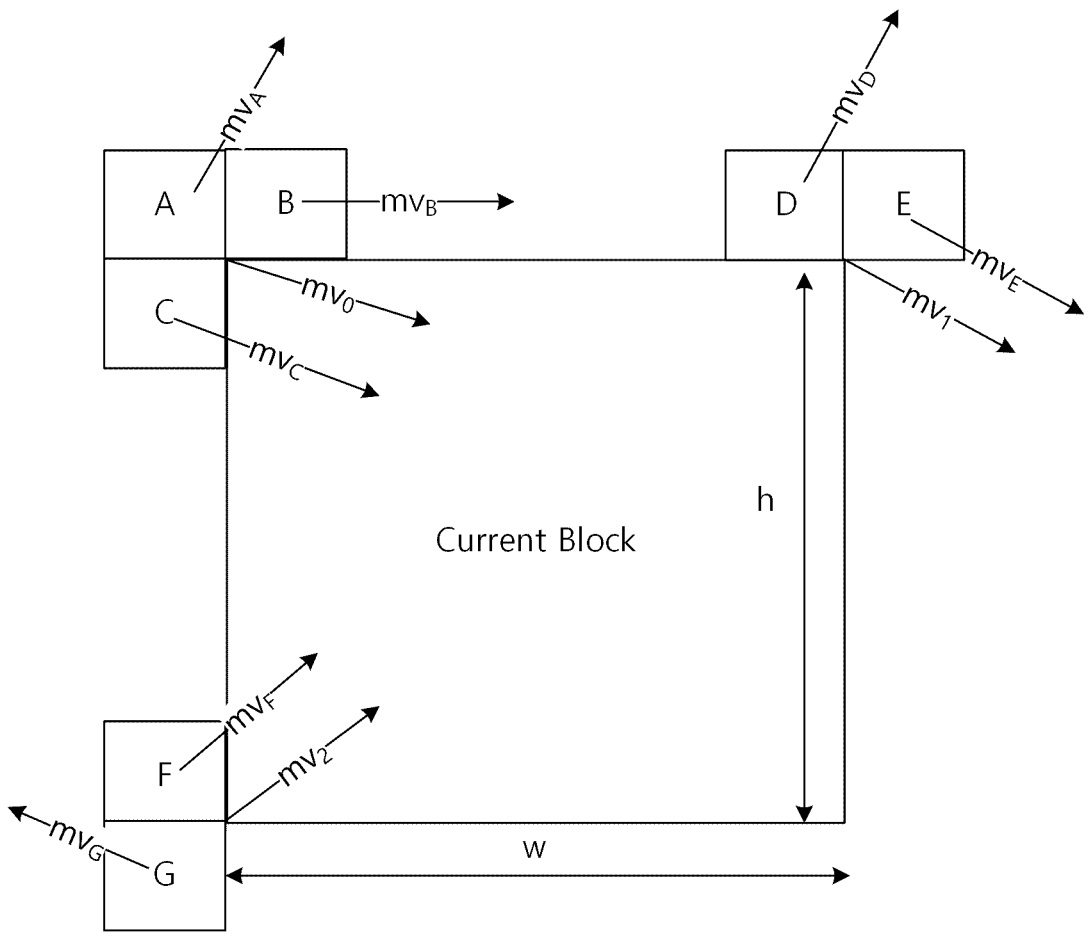
FIG. 26 is a diagram illustrating affine motion predictor derivation according to an embodiment of the present disclosure.
FIG. 27 is a diagram illustrating affine motion predictor derivation according to an embodiment of the present disclosure.

FIG. 26 is a diagram illustrating affine motion predictor derivation according to an embodiment of the present disclosure.

Control point motion vectors may be required for affine motion prediction, and the motion vector field, i.e., a motion vector for a subblock or a certain position, may be calculated based on the control point motion vectors. The control point motion vector may also be called a seed vector.

In this case, the control point MV (control point motion vector) may be based on a predictor. For example, the predictor can be a control point MV (control point motion vector). As another example, the control point MV (control point motion vector) may be calculated based on a predictor and a difference. Specifically, the control point MV (control point motion vector) can be calculated by adding or subtracting the difference to or from the predictor.

In this case, it is possible to derive it from the neighboring MVs in the process of constructing the predictor of the control point MV. In this case, the neighboring MVs may include MVs (motion vectors) that are not subjected to affine motion compensation (MC). For example, when deriving each control point MV (control point motion vector) of the current block, an MV at a preset position for each control point MV may be used as a predictor of the control point MV. For example, the preset position may be a portion included in a block adjacent to a portion of the preset position.

Referring to FIG. 26, control point MVs (control point motion vectors) mv0, mv1, and mv2 can be determined. In this case, according to an embodiment of the present disclosure, the MV (motion vector) corresponding to preset positions A, B, and C may be used as the predictor for mv0. Also, the MV (motion vector) corresponding to preset positions D and E may be used as the predictor for mv1. The MV (motion vector) corresponding to preset positions F and G may be used as the predictor for mv2.

Also, when determining each predictor of the control point MVs (control point motion vectors) mv0, mv1, and mv2 according to the embodiment of FIG. 26, the order of referring to the preset position for each control point position may be determined. Also, there may be a plurality of preset positions referred to as predictors of the control point MV for each control point, and a possible combination of preset positions may be determined.

A candidate of affine MC (affine motion compensation) can be constructed in the same way as in the embodiment of FIG. 26, and this candidate may also be called a constructed candidate. Alternatively, this candidate may be called an inter candidate or virtual candidates. Also, when referring to the preset positions in the method of FIG. 41, reference may be made according to a preset order.

According to an embodiment of the present disclosure, using the embodiments described with reference to FIG. 23 to 26 or a combination thereof, a candidate list of affine MC (affine motion compensation) or a control point MV candidate list of affine MC (affine motion compensation) can be generated.

FIG. 27 is a diagram illustrating affine motion predictor derivation according to an embodiment of the present disclosure.

As described with reference to FIGS. 24 to 25, the control point MV (control point motion vector) for affine motion prediction of the current block may be derived from a neighboring block which is subjected to affine motion prediction. In this case, the same method as in FIG. 27 can be used. In the expression of FIG. 27, the MVs or control point MV (motion vector) of the top-left, top-right, and bottom-left of the neighboring block which is subjected to affine motion prediction are respectively (v_E0x, v_E0y), (v_E1x, v_E1y), and (v_E2x, v_E2y). Also, the coordinates of the top-left, top-right, and bottom-left of the neighboring block which is subjected to affine motion prediction may be (x_E0, y_E0), (x_E1, y_E1), and (x_E2, y_E2), respectively. In this case, (v_0x, v_0y) and (v_1x, v_1y), which are predictors of the control point MVs (control point motion vectors) or the control point MVs (control point motion vectors) of the current block, can be calculated according to FIG. 27.

FIG. 28 is a diagram illustrating affine motion predictor derivation according to an embodiment of the present disclosure.

As described above, multiple control motion MVs (control point motion vectors) or multiple control point MV predictor (control point motion vector predictor) may be required for affine motion compensation. In this case, another control motion MV (control point motion vector) or control point MV predictor (control point motion vector predictor) can be derived from a certain control motion MV (control point motion vector) or control point MV predictor (control point motion vector predictor).

For example, when two control point MVs (control point motion vectors) or two control point MV predictors (control point motion vector predictors) are constructed by the method described in the previous drawings, another control point MV (control point motion vector) or another control point MV predictor (control point motion vector predictor) can be generated based on this.

Referring to FIG. 28, a method of generating mv0, mv1, and mv2, which are control point MV predictors (control point motion vector predictors) or control point MVs (control point motion vectors) of top-left, top-right, and bottom-left, is illustrated. In the drawing, x and y represent an x-component and a y-component, respectively, and the current block size may be w*h.

FIG. 29 is a diagram illustrating a method of generating a control point motion vector according to an embodiment of the present disclosure.

According to an embodiment of the present disclosure, it is possible to determine the control point MV (control point motion vector) by constructing a predictor for the control point MV (control point motion vector) in order to perform affine MC (affine motion compensation) on the current block and adding the difference thereto. According to an embodiment, it is possible to construct the predictor of the control point MV by the method described with reference to FIGS. 23 to 26. The difference can be signaled from the encoder to the decoder.

Referring to FIG. 29, differences for the control point MVs (control point motion vectors) may exist. Also, the differences for the control point MVs (control point motion vectors) may be signaled, respectively. FIG. 29(a) illustrates a method of determining mv0 and mv1, which are control point MVs of a 4-parameter model, and FIG. 29(b) illustrates a method of determining mv0, mv1, and mv2, which are control point MVs of a 6-parameter model. The control point MVs (control point motion vectors) are determined by adding mvd0, mvd1, and mvd2, which are differences for the control point MVs (control point motion vectors), to the predictor.

The terms indicated with upper bar in FIG. 29 may be predictors of the control point MVs (control point motion vectors).

FIG. 30 is a diagram illustrating a method of determining a motion vector difference through the method described with reference to FIG. 29.

As an embodiment, a motion vector difference can be signaled by the method described with reference to FIG. 10. And, the motion vector difference determined by the signaled method may be lMvd of FIG. 30. Also, a value such as the motion vector difference mvd signaled in FIG. 29, that is, a value such as mvd0, mvd1, and mvd2 may be lMvd in FIG. 30. As described with reference to FIG. 29, the signaled mvd (motion vector difference) can be determined as the difference with the predictor of the control point MV (control point motion vector), and the determined difference may be MvdL0 and MvdL1 of FIG. 30. L0 may indicate reference list 0 (zeroth reference picture list), and L1 may indicate reference list 1 (first reference picture list). compIdx is a component index, and may indicate an x, y component, etc.

FIG. 31 is a diagram illustrating a method of generating a control point motion vector according to an embodiment of the present disclosure.

According to an embodiment of the present disclosure, it is possible to determine the control point MV (control point motion vector) by constructing a predictor for the control point MV in order to perform affine MC (affine motion compensation) on the current block and adding the difference thereto. According to an embodiment, it is possible to construct the predictor of the control point MV (control point motion vector) by the method described with reference to FIGS. 23 to 26. The difference can be signaled from the encoder to the decoder.

Referring to FIG. 31, a predictor for the difference for each control point MV (control point motion vector) may exist. For example, the difference of another control point MV (control point motion vector) can be determined based on the difference of a certain control point MV (control point motion vector). This may be based on the similarity between the differences for the control point MVs (control point motion vectors). Since the differences are similar, if a predictor is determined, it may be possible to make a small difference with the predictor. In this case, the difference predictor for the control point MV (control point motion vector) can be signaled, and the difference with the difference predictor for the control point MV (control point motion vector) can be signaled.

FIG. 31(a) illustrates a method of determining mv0 and mv1, which are control point MVs (control point motion vectors) of the 4-parameter model, and FIG. 31(b) illustrates a method of determining mv0, mv1, and mv2, which are control point MVs (control point motion vectors) of the 6-parameter model.

Referring to FIG. 31, for the difference for each control point MV, the difference for the control point MV and the control point MV are determined based on a difference mvd0 of mv0, which is control point MV 0. The mvd0, mvd1, and mvd2 illustrated in FIG. 31 may be signaled from the encoder to the decoder. Compared to the method described with reference to FIG. 29, in the method of FIG. 31, the values of mvd1 and mvd2 that are signaled may be different even if the same mv0, mv1, and mv2 as those in FIG. 29 and the same predictors are used. If the difference with the predictors of the control point MVs mv0, mv1, and mv2 is similar, when the method of FIG. 31 is used, there is a possibility that the absolute values of mvd1 and mvd2 are smaller than when the method of FIG. 29 is used, and thus signaling overhead of mvd1 and mvd2 can be reduced. Referring to FIG. 31, the difference with the predictor of mv1 may be determined as (mvd1+mvd0), and the difference with the predictor of mv2 may be determined as (mvd2+mvd0).

The terms indicated with upper bar in FIG. 31 may be predictors of the control points MV.

FIG. 32 is a diagram illustrating a method of determining a motion vector difference through the method described with reference to FIG. 31.

As an embodiment, a motion vector difference can be signaled by the method described with reference to FIG. 10 or FIG. 33. Also, the motion vector difference determined based on the signaled parameter may be lMvd of FIG. 32. Also, the mvd signaled in FIG. 31, that is, a value such as mvd0, mvd1, mvd2 may be lMvd in FIG. 32.

MvdLX of FIG. 32 may be a difference between each control point MV (control point motion vector) and a predictor. That is, it may be (mv−mvp). In this case, as described with reference to FIG. 31, for control point MV 0 mv_0, the signaled motion vector difference can be directly used for the difference MvdLX for the control point MV and, for other control point MVs (mv_1, mv_2), MvdLX, which is the difference between the control point MVs, may be determined and used based on the signaled motion vector difference (mvd1 and mvd2 in FIG. 31) and the signaled motion vector difference (mvd0 in FIG. 31) for the control point MV 0 mv_0.

LX in FIG. 32 may indicate a reference list X (reference picture list X). compIdx is a component index, and may indicate an x, y component, etc. cpIdx may indicate a control point index. cpIdx may mean 0, 1, or 0, 1, 2 illustrated in FIG. 31.

The resolution of the motion vector difference may be considered in the values illustrated in FIGS. 10, 12, 13, etc. For example, when the resolution is R, a value of lMvd*R can be used for lMvd in the drawing.

FIG. 33 is a diagram illustrating motion vector difference syntax according to an embodiment of the present disclosure.

Referring to FIG. 33, motion vector difference may be coded in a similar manner to that described with reference to FIG. 10. In this case, coding may be done separately according to a control point index cpIdx.

FIG. 34 is a diagram illustrating a higher level signaling structure according to an embodiment of the present disclosure.

According to an embodiment of the present disclosure, one or more higher level signaling may exist. Higher level signaling may mean signaling at a higher level. The higher level may be a unit including any unit. For example, a higher level of a current block or current coding unit may include a CTU, a slice, a tile, a tile group, a picture, a sequence, etc. Higher level signaling may affect a lower level of the corresponding higher level. For example, if the higher level is a sequence, it may affect the CTU, slice, tile, tile group, and picture units that are lower levels of the sequence. Here, affecting is that higher level signaling affects encoding or decoding for lower levels.

Also, higher level signaling can include may include signaling indicating which mode can be used. Referring to FIG. 34, higher level signaling can include sps_modeX_enabled_flag. According to an embodiment, it may be determined whether or not mode modeX can be used based on sps_modeX_enabled_flag. For example, when sps_modeX_enabled_flag is a certain value, mode modeX may not be used. Also, it may be possible to use mode modeX when sps_modeX_enabled_flag is any other value. Also, when sps_modeX_enabled_flag is any other value, it may be judged whether or not mode modeX is used based on additional signaling. For example, the certain value may be 0, and the other value may be 1. However, the present disclosure is not limited thereto, and the certain value may be 1, and the other value may be 0.

According to an embodiment of the present disclosure, signaling indicating whether affine motion compensation can be used may exist. For example, this signaling may be higher level signaling. Referring to FIG. 34, this signaling may be sps_affine_enabled_flag (affine enabled flag). Referring to FIGS. 2 and 7, signaling may mean a signal transmitted from the encoder to the decoder through the bitstream. The decoder may parse the affine enable flag from the bitstream.

For example, if sps_affine_enabled_flag (affine enabled flag) is 0, syntax may be restricted so that affine motion compensation is not used. Also, when sps_affine_enabled_flag (affine enabled flag) is 0, inter_affine_flag (inter affine flag) and cu_affine_type_flag (coding unit affine type flag) may not exist.

For example, inter_affine_flag (inter affine flag) may be signaling indicating whether or not affine MC (affine motion compensation) is used in the block. Referring to FIGS. 2 and 7, signaling may mean a signal transmitted from the encoder to the decoder through the bitstream. The decoder may parse inter_affine_flag (inter affine flag) from the bitstream.

Also, cu_affine_type_flag (coding unit affine type flag) may be signaling indicating which type of affine MC (affine motion compensation) is used in block. Also, here, the type can indicate whether it is a 4-parameter affine model or a 6-parameter affine model. Also, when sps_affine_enabled_flag (affine enabled flag) is 1, it is possible that affine motion compensation is used.

Affine motion compensation may mean affine model based motion compensation or affine model based motion compensation for inter prediction.

Also, according to an embodiment of the present disclosure, signaling indicating that a specific type of which mode can be used may exist. For example, signaling indicating whether a specific type of affine motion compensation can be used may exist. For example, this signaling may be higher level signaling. Referring to FIG. 34, this signaling may be sps_affine_type_flag. Also, the specific type may mean the 6-parameter affine model. For example, if sps_affine_type_flag is 0, the syntax may be restricted so that the 6-parameter affine model is not used. Also, when sps_affine_type_flag is 0, cu_affine_type_flag may not exist. Also, if sps_affine_type_flag is 1, the 6-parameter affine model may be used. If sps_affine_type_flag does not exist, its value may be inferred to be equal to 0.

Also, according to an embodiment of the present disclosure, signaling indicating that a specific type of a certain mode can be used may exist when signaling indicating that the certain mode can be used exists. For example, when the signaling value indicating whether the certain mode can be used is 1, it is possible to parse signaling indicating whether the specific type of the certain mode can be used. For example, when the signaling value indicating whether the certain mode can be used is 0, it is possible not to parse signaling indicating whether the specific type of the certain mode can be used. For example, signaling indicating whether a certain mode can be used can include sps_affine_enabled_flag (affine enabled flag). Also, signaling indicating that a specific type of a certain mode can be used can include sps_affine_type_flag (affine enabled flag). Referring to FIG. 34, when sps_affine_enabled_flag (affine enabled flag) is 1, it is possible to parse sps_affine_type_flag. Also, when sps_affine_enabled_flag (affine enabled flag) is 0, it is possible not to parse sps_affine_type_flag, and it is possible to infer its value to 0.

Also, it is possible to use adaptive motion vector resolution (AMVR) as described above. It is possible to use a resolution set of AMVR differently depending on a case. For example, it is possible to use the resolution set of AMVR differently according to prediction mode. For example, the AMVR resolution set may be different when using regular inter prediction such as AMVP and when using affine MC (affine motion compensation). Also, AMVR applied to regular inter prediction such as AMVP may be applied to the motion vector difference. Alternatively, AMVR applied to regular inter prediction such as advanced motion vector prediction (AMVP) may be applied to the motion vector predictor. Also, AMVR applied to affine MC (affine motion compensation) may be applied to the control point motion vector or control point motion vector difference.

Also, according to an embodiment of the present disclosure, signaling indicating whether AMVR can be used may exist. This signaling may be higher level signaling. Referring to FIG. 34, sps_amvr_enabled_flag (AMVR enabled flag) may exist. FIGS. 2 and 7, signaling may mean a signal transmitted from the encoder to the decoder through the bitstream. The decoder can parse the AMVR enabled flag from the bitstream.

The sps_amvr_enabled_flag (AMVR enabled flag) according to an embodiment of the present disclosure may indicate whether or not adaptive motion vector differential resolution is used. Also, sps_amvr_enabled_flag (AMVR enabled flag) according to an embodiment of the present disclosure may indicate whether or not adaptive motion vector differential resolution can be used. For example, according to an embodiment of the present disclosure, when sps_amvr_enabled_flag (AMVR enabled flag) is 1, AMVR may be usable for motion vector coding. Also, according to an embodiment of the present disclosure, when sps_amvr_enabled_flag (AMVR enabled flag) is 1, AMVR can be used for motion vector coding. Also, when sps_amvr_enabled_flag (AMVR enabled flag) is 1, additional signaling for indicating which resolution is used may exist. Also, when sps_amvr_enabled_flag (AMVR enabled flag) is 0, AMVR may not be usable for motion vector coding. Also, when sps_amvr_enabled_flag (AMVR enabled flag) is 0, AMVR may not be usable for motion vector coding. According to an embodiment of the present disclosure, AMVR corresponding to sps_amvr_enabled_flag (AMVR enabled flag) may mean that it is used for regular inter prediction. For example, AMVR corresponding to sps_amvr_enabled_flag (AMVR enabled flag) may not mean that it is used for affine MC. Also, whether or not to use affine MC (affine motion compensation) may be indicated by inter_affine_flag (inter affine flag). That is, AMVR corresponding to sps_amvr_enabled_flag (AMVR enabled flag) means that it is used when inter_affine_flag (inter affine flag) is 0, or may not mean that it is used when inter_affine_flag (inter affine flag) is 1

Also, according to an embodiment of the present disclosure, signaling indicating whether AMVR can be used for affine MC (affine motion compensation) may exist. This signaling may be higher level signaling. Referring to FIG. 34, signaling sps_affine_amvr_enabled flag (affine AMVR enabled flag) indicating whether AMVR can be used for affine MC (affine motion compensation) may exist. FIGS. 2 and 7, signaling may mean a signal transmitted from the encoder to the decoder through the bitstream. The decoder may parse the affine AMVR enabled flag from the bitstream.

The sps_affine_amvr_enabled_flag (affine AMVR enabled flag) may indicate whether or not adaptive motion vector differential resolution is used for affine motion compensation. Also, sps_affine_amvr_enabled_flag (affine AMVR enabled flag) may indicate whether or not adaptive motion vector differential resolution can be used for affine motion compensation. According to an embodiment, when sps_affine_amvr_enabled_flag (affine AMVR enabled flag) is 1, it may be possible for AMVR to be used for affine inter mode motion vector coding. Also, when sps_affine_amvr_enabled_flag is (affine AMVR enabled flag) 1, AMVR may be usable for affine inter mode motion vector coding. Also, when sps_affine_amvr_enabled_flag (affine AMVR enabled flag) is 0, it may not be possible for AMVR to be used for affine inter mode motion vector coding. When sps_affine_amvr_enabled_flag (affine AMVR enabled flag) is 0, AMVR may not be usable for affine inter mode motion vector coding.

For example, when sps_affine_amvr_enabled_flag (affine AMVR enabled flag) is 1, it is possible to use the AMVR corresponding to a case where inter_affine_flag (inter affine flag) is 1 can be used for affine inter mode motion vector coding. Also, when sps_affine_amvr_enabled_flag (affine AMVR enabled flag) is 1, additional signaling for indicating which resolution is used may exist. Also, when sps_affine_amvr_enabled_flag (affine AMVR enabled flag) is 0, AMVR corresponding to the case where inter_affine_flag (inter affine flag) is 1 may not be used for affine inter mode motion vector coding.

FIG. 35 is a diagram illustrating a coding unit syntax structure according to an embodiment of the present disclosure.

As described with reference to FIG. 34, additional signaling for indicating resolution based on higher level signaling using AMVR may exist. Referring to FIG. 34, additional signaling for indicating resolution may include amvr_flag or amvr_precision_flag. The amvr_flag or amvr_precision_flag may be information about resolution of the motion vector difference.

According to an embodiment, signaling indicated when amvr_flag is 0 may exist. Also, when amvr_flag is 1, amvr_precision_flag may exist. Also, when amvr_flag is 1, resolution may be determined based on amvr-precision flag as well. For example, if amvr_flag is 0, it may be ¼ resolution. Also, if amvr_flag does not exist, the amvr_flag value may be inferred based on CuPredMode. For example, when CuPredMode is MODE_IBC, the amvr_flag value may be inferred to be equal to 1, and when CuPredMode is not MODE_IBC or CuPredMode (coding unit prediction mode) is MODE_INTER, the amvr_flag value may be inferred to be equal to 0.

Also, when inter_affine_flag is 0 and amvr_precision_flag is 0, 1-pel resolution can be used. Also, when inter_affine_flag is 1 and amvr_precision_flag is 0, ¹⁄₁₆-pel resolution can be used. Also, when inter_affine_flag is 0 and amvr_precision_flag is 1, 4-pel resolution can be used. Also, when inter_affine_flag is 1 and amvr_precision_flag is 1, 1-pel resolution can be used.

If amvr_precision_flag is 0, its value can be inferred to be equal to 0.

According to an embodiment, resolution can be applied by a MvShift value. Also, MvShift can be determined by amvr_flag and amvr_precision_flag, which are information about resolution of the motion vector difference. For example, when inter_affine_flag is 0, the MvShift value may be determined as follows.

MvShift=(amvr_flag+amvr_precision_flag)<<1

Also, a motion vector difference Mvd value may be shifted based on the MvShift value. For example, the Mvd (motion vector difference) can be shifted as follows, and accordingly, resolution of AMVR can be applied.

MvdLX=MvdLX<<(MvShift+2)

As another example, when inter_affine_flag (inter affine flag) is 1, the MvShift value can be determined as follows.

MvShift=amvr_precision_flag ? (amvr_precision_flag<<1):(−(amvr_flag<<1))

Also, a control point motion vector difference MvdCp value can be shifted based on the MvShift value. MvdCP may be a control point motion vector difference or a control point motion vector. For example, MvdCp (control point motion vector difference) is shifted as follows, and accordingly, resolution of AMVR may be applied.

MvdCpLX=MvdCpLX<<(MvShift+2)

Also, Mvd or MvdCp may be a value signaled by mvd_coding.

Referring to FIG. 35, when CuPredMode is MODE_IBC, amvr_flag, which is information about resolution of the motion vector difference, may not exist. Also, when CuPredMode is MODE_INTER, amvr_flag, which is information about resolution of motion vector difference, may exist, and in this case, it may be possible to parse amvr_flag if a certain condition is satisfied.

According to an embodiment of the present disclosure, it can be determined whether to parse AMVR-related syntax elements on the basis of a higher level signaling value indicating whether AMVR can be used. For example, when the higher level signaling value indicating whether AMVR can be used is 1, it is possible to parse AMVR-related syntax elements. Also, when the higher level signaling value indicating whether AMVR can be used is 0, AMVR-related syntax elements may not be parsed. Referring to FIG. 35, when CuPredMode is MODE_IBC and sps_amvr_enabled_flag is 0, amvr_precision_flag (AMVR enabled flag), which is information about resolution of motion vector difference, may not be parsed. Also, when CuPredMode is MODE_IBC and sps_amvr_enabled_flag (AMVR enabled flag) is 1, amvr_precision_flag, which is information about resolution of motion vector difference, can be parsed. In this case, additional conditions for parsing may be considered.

For example, it is possible to parse amvr_precision_flag when at least one non-zero value exists among MvdLX (plural motion vector differences) values. MvdLX may be an Mvd value for a reference list LX. Also, Mvd (motion vector difference) can be signaled through mvd_coding. LX can include L0 (zeroth reference picture list) and L1 (first reference picture list). Also, in MvdLX, a component corresponding to each of the x-axis and the y-axis may exist. For example, the x-axis may correspond to the horizontal axis of the picture, and the y-axis may correspond to the vertical axis of the picture. Referring to FIG. 35, it may indicate that [0] and [1] in MvdLX[x0][y0][0] and MvdLX[x0][y0] are for the x-axis and y-axis components, respectively. Also, when CuPredMode is MODE_IBC, it is possible to use only L0. Referring to FIG. 35, when 1) sps_amvr_enabled_flag is 1 and 2) MvdL0[x0][y0][0] or MvdL0[x0][y0][1] is not 0, amvr_precision_flag can be parsed. Also, when 1) sps_amvr_enabled_flag is 0 or 2) MvdL0[x0][y0][0] and MvdL0[x0][y0][1] are both 0, amvr_precision_flag may not be parsed.

Also, there may be cases where CuPredMode is not MODE_IBC. In this case, referring to FIG. 35, when sps_amvr_enabled_flag is 1, inter_affine_flag (inter affine flag) is 0, and at least one non-zero value exists among MvdLX (plural motion vector differences) values, amvr_flag can be parsed. Here, amvr_flag may be information about resolution of the motion vector difference. Also, as already described, sps_amvr_enabled_flag (AMVR enabled flag) of 1 may indicate the use of adaptive motion vector differential resolution. Also, an inter_affine_flag (inter affine flag) of 0 may indicate that affine motion compensation is not used for the current block. Also, as described with reference to FIG. 34, the plurality of motion vector differences for the current block may be corrected on the basis of information about resolution of the motion vector difference such as amvr_flag. This condition may be called conditionA.

Also, when sps_affine_amvr_enabled flag (affine AMVR enabled flag) is 1, inter_affine_flag (inter affine flag) is 1, and at least one non-zero value exists among MvdCpLX (plural control motion vector differences) values, amvr_flag can be parsed. Here, amvr_flag may be information about resolution of the motion vector difference. Also, as already described, sps_affine_amvr_enabled_flag (affine AMVR enabled flag) of 1 may indicate that adaptive motion vector differential resolution can be used for affine motion compensation. Also, inter_affine_flag (inter affine flag) of 1 can indicate the use of affine motion compensation for the current block. Also, as described with reference to FIG. 34, the plurality of control point motion vector differences for the current block can be corrected based on information about the resolution of the motion vector difference such as amvr_flag. This condition may be called conditionB.

Also, if conditionA or conditionB is satisfied, amvr_flag can be parsed. Also, if both conditionA and conditionB are not satisfied, amvr_flag, which is information about the resolution of the motion vector difference, may not be parsed. That is, when 1) sps_amvr_enabled_flag (AMVR enabled flag) is 0, inter_affine_flag (inter affine flag) is 1, or MvdLX (plural motion vector differences) is all 0, and 2) sps_affine_amvr_enabled_flag is 0, inter_affine_flag (inter affine flag) is 0, or MvdCpLX (plural control point motion vector differences) values are all 0, amvr_flag may not be parsed.

It is also possible to determine whether to parse amvr_precision_flag based on the amvr_flag value. For example, when the amvr_flag value is 1, amvr_precision_flag can be parsed. Also, when the amvr_flag value is 0, parsing of amvr_precision_flag may not be parsed.

Also, MvdCpLX (plural control motion vector differences) may mean a difference for a control point motion vector. Also, MvdCpLX (plural control motion vector differences) may be signaled through mvd_coding. LX may include L0 (zeroth reference picture list) and L1 (first reference picture list). Also, in MvdCpLX, components corresponding to control point motion vectors 0, 1, 2, etc. may exist. For example, control point motion vectors 0, 1, 2, etc. may be control point motion vectors corresponding to preset positions based on the current block.

Referring to FIG. 35, it may indicate that [0], [1], and [2] in MvdCpLX[x0][y0][0][ ], MvdCpLX[x0][y0][1][ ], and MvdCpLX[x0][y0][2][ ] correspond to control point motion vectors 0, 1, and 2, respectively. Also, the MvdCpLX (plural control point motion vector differences) value corresponding to control point motion vector 0 can be used for other control point motion vectors. For example, control point motion vector 0 may be used as used in FIG. 47. Also, in MvdCpLX (plural control point motion vector differences), components that respectively correspond to the x-axis and the y-axis may exist. For example, the x-axis may correspond to the horizontal axis of the picture, and the y-axis may correspond to the vertical axis of the picture. Referring to FIG. 35, it may indicate that [0] and [1] in MvdCpLX[x0][y0][ ][0] and MvdCpLX[x0][y0][ ][1] are for the x-axis and y-axis components, respectively.

FIG. 36 is a diagram illustrating a higher level signaling structure according to an embodiment of the present disclosure.

Higher level signaling as described with reference to FIGS. 34 to 35 may exist. For example, sps_affine_enabled_flag (affine enabled flag), sps_affine_amvr_enabled_flag, sps_amvr_enabled_flag (AMVR enabled flag), sps_affine_type_flag, etc. may exist.

According to an embodiment of the present disclosure, the higher level signaling described above may have parsing dependency. For example, it can be determined whether or not to parse other higher level signaling based on which higher level signaling value.

According to an embodiment of the present disclosure, it is possible to determine whether affine AMVR can be used based on whether affine MC (affine motion compensation) can be used. For example, it can be determined whether affine AMVR can be used on the basis of higher level signaling indicating whether affine MC can be used. More specifically, it is possible to determine whether or not to parse higher level signaling indicating whether affine AMVR can be used on the basis of higher level signaling indicating whether affine MC can be used.

In one embodiment, it is possible to use affine AMVR when affine MC can be used. Also, when affine MC cannot be used, affine AMVR may not be usable.

More specifically, if the higher level signaling indicating whether affine MC can be used is 1, affine AMVR may be usable. In this case, it is possible that additional signaling exists. Also, when the higher level signaling indicating whether affine MC can be used is 0, affine AMVR may not be usable. For example, when higher level signaling indicating whether affine MC can be used is 1, high level signaling indicating whether affine AMVR can be used can be parsed. Also, when high level signaling indicating whether affine MC can be used is 0, higher level signaling indicating whether affine AMVR can be used may not be parsed. Also, when higher level signaling indicating whether affine AMVR can be used does not exist, its value can be inferred. For example, the value can be inferred to be equal to 0. As another example, it can be inferred on the basis of higher level signaling indicating whether affine MC can be used. As another example, it can be inferred on the basis of higher level signaling indicating whether AMVR can be used.

According to an embodiment, affine AMVR may be AMVR used for affine MC described with reference to FIGS. 34 to 35. For example, high level signaling indicating whether affine MC can be used may be sps_affine_enabled_flag (affine enabled flag). Also, higher level signaling indicating whether affine AMVR can be used may be sps_affine_amvr_enabled_flag.

Referring to FIG. 36, when sps_affine_enabled_flag (affine enabled flag) is 1, sps_affine_amvr_enabled_flag can be parsed. Also, when sps_affine_enabled_flag (affine enabled flag) is 0, sps_affine_amvr_enabled_flag may not be parsed. Also, when sps_affine_amvr_enabled_flag does not exist, its value can be inferred to be equal to 0.

This may be because, in the embodiment of the present disclosure, affine AMVR may be meaningful when using affine MC.

FIG. 37 is a diagram illustrating a higher level signaling structure according to an embodiment of the present disclosure.

Higher level signaling as described with reference to FIGS. 34 to 35 may exist. For example, sps_affine_enabled_flag (affine enabled flag), sps_affine_amvr_enabled_flag (affine AMVR enabled flag), sps_amvr_enabled_flag (AMVR enabled flag), and sps_affine_type_flag, etc. may exist.

According to an embodiment of the present disclosure, the higher level signalings may have parsing dependency. For example, it can be determined whether or not to parse other higher level signaling based on a certain higher level signaling value.

According to an embodiment of the present disclosure, it is possible to determine whether affine AMVR can be used on the basis of whether AMVR can be used. For example, it can be determined whether affine AMVR can be used on the basis of higher level signaling indicating whether AMVR can be used. More specifically, it is possible to determine whether or not to parse higher level signaling indicating whether affine AMVR can be used on the basis of higher level signaling indicating whether AMVR can be used.

In one embodiment, it is possible to use affine AMVR when AMVR can be used. Also, when AMVR cannot be used, affine AMVR may not be usable.

More specifically, when the higher level signaling indicating whether AMVR can be used is 1, affine AMVR may be usable. In this case, it is possible that additional signaling exists. Also, when higher level signaling indicating whether AMVR can be used is 0, affine AMVR may not be usable. For example, when higher level signaling indicating whether AMVR can be used is 1, high level signaling indicating whether affine AMVR can be used can be parsed. Also, when high level signaling indicating whether AMVR can be used is 0, higher level signaling indicating whether affine AMVR can be used may not be parsed. Also, if there is no higher level signaling indicating whether affine AMVR can be used, its value can be inferred. For example, the value can be inferred to be equal to 0. As another example, it can be inferred on the basis of higher level signaling indicating whether affine MC can be used. As another example, it can be inferred on the basis of higher level signaling indicating whether AMVR can be used.

According to an embodiment, affine AMVR may be AMVR used for affine MC (affine motion compensation) described with reference to FIGS. 34 to 35. For example, high level signaling indicating whether AMVR can be used may be sps_amvr_enabled_flag (AMVR enabled flag). Also, higher level signaling indicating whether affine AMVR can be used may be sps_affine_amvr_enabled_flag (affine AMVR enabled flag).

Referring to FIG. 37(*a*), when sps_amvr_enabled_flag (AMVR enabled flag) is 1, sps_affine_amvr_enabled_flag (affine AMVR enabled flag) can be parsed. Also, when sps_amvr_enabled_flag (AMVR enabled flag) is 0, sps_affine_amvr_enabled_flag (affine AMVR enabled flag) may not be parsed. Also, when sps_affine_amvr_enabled_ flag (affine AMVR enabled flag) does not exist, its value may be inferred to be equal to 0.

This may be because, in the embodiment of the present disclosure, whether adaptive resolution is effective may vary according to a sequence.

Also, whether or not affine AMVR can be used can be determined by considering both whether or not affine MC can be used and whether or not AMVR can be used. For example, it is possible to determine whether or not to parse higher level signaling indicating whether affine AMVR can be used on the basis of higher level signaling indicating whether affine MC can be used and higher level signaling indicating whether AMVR can be used. According to an embodiment, when both higher level signaling indicating whether affine MC can be used and higher level signaling indicating whether AMVR can be used are 1, higher level signaling indicating whether affine AMVR can be used can be parsed. Also, when higher level signaling indicating whether affine MC can be used or higher level signaling indicating whether AMVR can be used is 0, higher level signaling indicating whether affine AMVR can be used may not be parsed. Also, if higher level signaling indicating whether affine AMVR can be used does not exist, its value can be inferred.

Referring to FIG. 37(*b*), when both sps_affine_enabled_ flag (affine enabled flag) and sps_amvr_enabled_flag (AMVR enabled flag) are 1, sps_affine_amvr_enabled_flag (affine AMVR enabled flag) can be parsed. Also, when at least one of sps_affine_enabled_flag (affine enabled flag) and sps_amvr_enabled_flag (AMVR enabled flag) is 0, sps_affine_amvr_enabled_flag (affine AMVR enabled flag) may not be parsed. Also, when sps_affine_amvr_enabled_ flag (affine AMVR enabled flag) does not exist, the value may be inferred to be equal to 0.

More specifically, referring to FIG. 37(*b*), it may be determined whether or not affine motion compensation can be used based on sps_affine_enabled_flag (affine enabled flag), at line 3701. As already described with reference to FIGS. 34 to 35, when sps_affine_enabled_flag (affine enabled flag) is 1, it may mean that affine motion compensation can be used. Also, when sps_affine_enabled_flag (affine enabled flag) is 0, it may mean that affine motion compensation cannot be used.

When it is determined that affine motion compensation is used at line 3701 of FIG. 37(*b*), it may be determined whether or not adaptive motion vector differential resolution is used based on sps_amvr_enabled_flag (AMVR enabled flag), at line 3702. As already described with reference to FIGS. 34 to 35, when sps_amvr_enabled_flag (AMVR enabled flag) is 1, it may mean that adaptive motion vector differential resolution is used. When sps_amvr_enabled_flag (AMVR enabled flag) is 0, it may mean that adaptive motion vector differential resolution is not used.

When it is determined that affine motion compensation is not used at line 3701, it may not be determined whether or not adaptive motion vector differential resolution is used, on the basis of sps_amvr_enabled_flag (AMVR enabled flag). That is, line 3702 of FIG. 37(*b*) may not be performed. Specifically, when affine motion compensation is not used, sps_affine_amvr_enabled_flag (affine AMVR enabled flag) may not be transmitted from the encoder to the decoder. That is, the decoder may not receive sps_affine_amvr_enabled_ flag (affine AMVR enabled flag), and sps_affine_amvr_en- abled_flag (affine AMVR enabled flag) may not be parsed by the decoder. In this case, since sps_affine_amvr_enabled_ flag (affine AMVR enabled flag) does not exist, it may be inferred to be equal to 0. As already described, when sps_affine_amvr_enabled_flag (affine AMVR enablex flag) is 0, it may indicate that adaptive motion vector differential resolution cannot be used for affine motion compensation.

When it is determined that adaptive motion vector differ- ential resolution is used at line 3702 of FIG. 37(*b*), sps_affine_amvr_enabled_flag indicating whether or not adaptive motion vector differential resolution can be used for affine motion compensation may be parsed from the bitstream, at line 3703.

When it is determined that adaptive motion vector differ- ential resolution is not used at line 3702, sps_affine_amvr_enabled_flag (affine AMVR enabled flag) may not be parsed from the bitstream. That is, line 3703 of FIG. 37(*b*) may not be performed. More specifically, when affine motion compensation is used and adaptive motion vector differential resolution is not used, sps_affine_amvr_enabled_flag (affine AMVR enabled flag) may not be transmitted from the encoder to the decoder. That is, the decoder may not receive sps_affine_amvr_enabled_ flag (affine AMVR enabled flag). The decoder may not parse sps_affine_amvr_enabled_flag (affine AMVR enabled flag) from the bitstream. In this case, since sps_affine_amvr_en- abled_flag (affine AMVR enabled flag) does not exist, it may be inferred to be equal to 0. As already described, when sps_affine_amvr_enabled_flag (affine AMVR enabled flag) is 0, it may indicate that adaptive motion vector differential resolution cannot be used for affine motion compensation.

By checking sps_affine_enabled_flag (affine enabled flag) first and sps_amvr_enabled_flag (AMVR enabled flag) is checked next as illustrated in FIG. 37(*b*), an unnecessary process can be reduced and efficiency can be increased. For example, when sps_amvr_enabled_flag (AMVR enabled flag) is checked first and sps_affine_enabled_flag (affine enabled flag) is checked next, sps_affine_enabled_flag (af- fine enabled flag) may need to be checked once again in order to derive sps_affine_type_flag at the 7-th line. How- ever, by checking sps_affine_enabled_flag (affine enabled flag) first and sps_amvr_enabled_flag (AMVR enabled flag) next, this unnecessary process can be reduced.

FIG. 38 is a diagram illustrating a coding unit syntax structure according to an embodiment of the present disclosure.

As described with reference to FIG. 35, it is possible to determine whether or not to parse AMVR-related syntax based on whether or not at least one non-zero value exists among MvdLX or MvdCpLX. However, MvdLX (motion vector difference) or MvdCpLX (control point motion vector difference) may be different depending on which reference list (reference picture list) is used, how many parameters the affine model uses, etc. If an initial value of MvdLX or MvdCpLX is not 0, since MvdLX or MvdCpLX not used in the current block is not 0, an unnecessary AMVR-related syntax element is signaled, and mismatch between the encoder and the decoder can be generated. FIGS. 38 to 39 can describe a method of not generating mismatch between the encoder and the decoder.

According to an embodiment, inter_pred_idc (information about the reference picture list) may indicate which reference list is used or what the prediction direction is. For example, inter_pred_idc (information about the reference picture list) may be a value of PRED_L0, PRED_L1, or PRED_BI. If inter_pred_idc (information about the reference picture list) is PRED_L0, only reference list 0 (zeroth reference picture list) may be used. Also, when inter_pred_idc (information about the reference picture list) is PRED_L1, only reference list 1 (first reference picture list) may be used. Also, when inter_pred_idc (information about the reference picture list) is PRED_BI, both reference list 0 (zeroth reference picture list) and reference list 1 (first reference picture list) may be used. When inter_pred_idc (information about the reference picture list) is PRED_L0 or PRED_L1, it may be uni-prediction. Also, when inter_pred_idc (information about the reference picture list) is PRED_BI, it may be bi-prediction.

It is also possible to determine affine model to be used on the basis of a MotionModelIdc value. It is also possible to determine whether to use affine MC on the basis of the MotionModelIdc value. For example, MotionModelIdc can indicate translational motion, 4-parameter affine motion, or 6-parameter affine motion. For example, when the MotionModelIdc value is 0, 1, and 2, translational motion, 4-parameter affine motion, and 6-parameter affine motion can be indicated, respectively. Also, according to an embodiment, MotionModelIdc can be determined on the basis of inter_affine_flag (inter affine flag) and cu_affine_type_flag. For example, when merge flag is 0 (not merge mode), MotionModelIdc can be determined on the basis of inter_affine_flag (inter affine flag) and cu_affine_type_flag. For example, MotionModelIdx may be (inter_affine_flag+cu_affine_type_flag). According to another embodiment, MotionModelIdc can be determined by merge_subblock_flag. For example, when merge flag is 1 (merge mode), MotionModelIdc can be determined by merge_subblock_flag. For example, the MotionModelIdc value may be set to a merge_subblock_flag value.

For example, when inter_pred_idc (information about the reference picture list) is PRED_L0 or PRED_BI, it is possible to use a value corresponding to L0 in MvdLX (motion vector difference) or MvdCpLX (control point motion vector difference). Therefore, when parsing AMVR-related syntax, MvdL0 or MvdCpL0 can be considered only when inter_pred_idc (information about the reference picture list) is PRED_L0 or PRED_BI. That is, when inter_pred_idc (information about the reference picture list) is PRED_L1, it is possible not to consider MvdL0 (motion vector difference for the zeroth reference picture list) or MvdCpL0 (control point motion vector difference for the zeroth reference picture list).

Also, when inter_pred_idc (information about the reference picture list) is PRED_L1 or PRED_BI, it is possible to use a value corresponding to L1 in MvdLX or MvdCpLX. Therefore, when parsing the AMVR-related syntax, MvdL1 (motion vector difference for the first reference picture list) or MvdCpL1 (control point motion vector difference for the first reference picture list) can be considered only when inter_pred_idc (information about the reference picture list) is PRED_L1 or PRED_BI. That is, when inter_pred_idc (information about the reference picture list) is PRED_L0, it is possible not to consider MvdL1 or MvdCpL1.

Referring to FIG. 38, it is possible to determine, for MvdL0 and MvdCpL0, whether or not to parse AMVR-related syntax according to whether their values are not 0 only when inter_pred_idc is not PRED_L1. That is, when inter_pred_idc is PRED_L1, even if a non-zero value exists in MvdL0 or a non-zero value exists in MvdCpL0, the AMVR-related syntax may not be parsed.

Also, when MotionModelIdc is 1, it is possible to consider only MvdCpLX[x0][y0][0][ ], MvdCpLX[x0][y0][1][ ] among MvdCpLX[x0][y0][0][ ] and MvdCpLX[x0][y0][1][ ], MvdCpLX[x0][y0][2][ ]. That is, when MotionModelIdc is 1, it is possible not to consider MvdCpLX[x0][y0][2][ ]. For example, when MotionModelIdc is 1, whether or not a non-zero value exists in MvdCpLX[x0][y0][2][ ] may not affect whether or not to parse AMVR-related syntax.

Also, when MotionModelIdc is 2, it is possible to consider all of MvdCpLX[x0][y0][0][ ], MvdCpLX[x0][y0][1][ ], and MvdCpLX[x0][y0][2][ ]. That is, when MotionModelIdc is 2, it is possible to consider MvdCpLX[x0][y0][2][ ].

Also, in the above embodiment, what is expressed as MotionModelIdc 1 or 2 may be represented as cu_affine_type_flag is 0 or 1. This may be because it can determine whether or not to use affine MC. For example, whether or not to use affine MC can be determined through inter_affine_flag (inter affine flag).

Referring to FIG. 38, whether a non-zero value exists in MvdCpLX[x0][y0][2][ ] can be considered only when MotionModelIdc is 2. When MvdCpLX[x0][y0][0][ ] and MvdCpLX[x0][y0][1][ ] are all 0 and a non-zero value exists in MvdCpLX[x0][y0][2 (according to the previous embodiment, only one of L0 and L1 may be considered by dividing L0 and L1 here), if MotionModelIdc is not 2, the AMVR-related syntax may not be parsed.

FIG. 39 is a diagram illustrating MVD default value setting according to an embodiment of the present disclosure.

As described above, MvdLX (motion vector difference) or MvdCpLX (control point motion vector difference) can be signaled through mvd_coding. Also, an lMvd value can be signaled through mvd_coding, and MvdLX or MvdCpLX can be set as an lMvd value. Referring to FIG. 39, when MotionModelIdc is 0, MvdLX can be set through the lMvd value. Also, when MotionModelIdc is not 0, MvdCpLX can be set through lMvd value. Also, depending on a refList value, it is possible to determine which operation corresponding to any of the LX to be performed.

Also, mvd_coding as described with reference to FIG. 10 or FIG. 33, FIG. 34, and FIG. 35 may exist. Also, mvd_coding may include a step of parsing or determining abs_mvd_greater0_flag, abs_mvd_greater_flag, abs_mvd_minus2, mvd_sign_flag, etc. Also, lMvd can be determined through abs_mvd_greater0_flag, abs_mvd_greater1_flag, abs_mvd_minus2, mvd_sign_flag, etc.

Referring to FIG. 39, lMvd may be set as follows.

lMvd=abs_mvd_greater0_flag*(abs_mvd_minus2+2)
*(1−2*mvd_sign_flag)

It is possible to set a default value of MvdLX (motion vector difference) or MvdCpLX (control point motion vector difference) to a preset value. According to an embodiment of the present disclosure, it is possible to set the default value of MvdLX or MvdCpLX to 0. Alternatively, it is possible to set the default value of lMvd to a preset value. Alternatively, it is possible to set a default value of a related syntax element so that the value of lMvd, MvdLX, or MvdCpLX becomes a preset value. The default value of the syntax element may mean a value to be inferred when the syntax element does not exist. The preset value may be 0.

According to an embodiment of the present disclosure, abs_mvd_greater0_flag can indicate whether the absolute value of the MVD is greater than 0 or not. Also, according to an embodiment of the present disclosure, when abs_mvd_greater0_flag does not exist, its value can be inferred to be equal to 0. In this case, the lMvd value can be set to 0. Also, in this case, MvdLX or MvdCpLX value can be set to 0.

Alternatively, according to an embodiment of the present disclosure, when the lMvd, MvdLX, or MvdCpLX value is not set, its value may be set as a preset value. For example, the value can be set to 0.

Also, according to an embodiment of the present disclosure, when abs_mvd_greater0_flag does not exist, the corresponding lMvd, MvdLX, or MvdCpLX value can be set to 0.

Also, abs_mvd_greater1_flag may indicate whether the absolute value of MVD is greater than 1 or not. Also, when abs_mvd_greater_flag does not exist, its value can be inferred to be equal to 0.

Also, (abs_mvd_minus2+2) can indicate an absolute value of MVD. Also, when the value of abs_mvd_minus2 does not exist, it can be inferred to be equal to −1.

Also, mvd_sign_flag can indicate the sign of MVD. When mvd_sign_flag is 0 and 1, it may indicate that the corresponding MVDs have positive and negative values, respectively. If mvd_sign_flag does not exist, the value can be inferred to be equal to 0.

FIG. 40A and FIG. 40B illustrate MVD default value setting according to an embodiment of the present disclosure.

By setting the initial value of MvdLX or MvdCpLX to 0, MvdLX (plural motion vector differences) or MvdCpLX (plural control point motion vector differences)) value can be initialized as described with reference to FIG. 39 in order not to generate mismatch between the encoder and the decoder. Also, in this case, the initialized value may be 0. The embodiment of FIG. 40A and FIG. 40B describes this in more detail.

According to an embodiment of the present disclosure, MvdLX (plural motion vector differences) or MvdCpLX (plural control point motion vector differences) values can be initialized to a preset value. Also, the initializing position may be ahead of the positions at which AMVR-related syntax elements are parsed. The AMVR-related syntax elements may include amvr_flag, amvr_precision_flag, etc. of FIG. 40A and FIG. 40B. The amvr_flag or amvr_precision_flag may be information about resolution of the motion vector difference.

Also, resolution of MVD (motion vector difference) or MV (motion vector) or resolution, which is signaled, of MVD or MV can be determined by the AMVR-related syntax elements. Also, the preset value used for initialization in the embodiments of the present disclosure may be 0.

Since MvdLX and MvdCpLX values between the encoder and the decoder can be the same when parsing AMVR-related syntax elements by performing initialization, mismatch between encoder and decoder may not be generated. Also, by performing initialization to be set to a value of 0, AMVR-related syntax elements may not be included in the bitstream unnecessarily.

According to an embodiment of the present disclosure, MvdLX can be defined for a reference list (L0, L1, etc.), an x- or y-component, etc. Also, MvdCpLX can be defined for the reference list (L0, L1, etc.), x- or y-component, control point 0, 1, or 2, etc.

According to an embodiment of the present disclosure, it is possible to initialize both MvdLX or MvdCpLX values. Also, the initializing position may be ahead of the position at which mvd_coding for the corresponding MvdLX or MvdCpLX is performed. For example, it is possible to initialize MvdLX or MvdCpLX corresponding to L0 even in a prediction block using only L0. Condition check may be required in order to initialize only those for which initialization is essential, but by performing initialization without distinction in this way, the burden of condition check can be reduced.

According to another embodiment of the present disclosure, it is possible to initialize a value corresponding to MvdLX or MvdCpLX value, whichever is not used. Here, the value not being used may mean that the value is not used in the current block. For example, a value corresponding to a reference list that is not currently used among MvdLX or MvdCpLX can be initialized. For example, when L0 is not used, the value corresponding to MvdL0 or MvdCpL0 can be initialized. L0 may not be used when inter_pred_idc is PRED_L1. Also, when L1 is not used, the value corresponding to MvdL1 or MvdCpL1 can be initialized. L1 may not be used when inter_pred_idc is PRED_L0. L0 may be used when inter_pred_idc is PRED_L0 or PRED_BI, and L1 may be used when inter_pred_idc is PRED_L1 or PRED_BI. Referring to FIG. 40A and FIG. 40B, when inter_pred_idc is PRED_L1, MvdL0[x0][y0][0], MvdL0[x0][y0][1], MvdCpL0[x0][y0][0][0], MvdCpL0[x0][y0][0][1], MvdCpL0[x0][y0][1][0], MvdCpL0[x0][y0][1][1], MvdCpL0[x0][y0][2][0], and MvdCpL0[x0][y0][2][1] can be initialized. Also, the initialized value may be 0. Also, when inter_pred_idc is PRED_L0, MvdL1[x0][y0][0], MvdL1[x0][y0][1], MvdCpL[x0][y0][0][0], MvdCpL[x0][y0][0][1], MvdCpL[x0][y0][1][0], MvdCpL1[x0][y0][1][1], MvdCpL1[x0][y0][2][0], and MvdCpL1[x0][y0][2][1] can be initialized. Also, the initialized value may be 0.

MvdLX[x][y][compIdx] may be a motion vector difference for a (x, y) position for reference list LX and component index compIdx. MvdCpLX[x][y][cpIdx][compIdx] may be a motion vector difference for reference list LX. Also, MvdCpLX[x][y][cpIdx][compIdx] may be a motion vector difference for the position (x, y), control point motion vector index cpIdx, and component index compIdx. Here, the component may indicate an x or y component.

Also, according to an embodiment of the present disclosure, MvdLX (motion vector difference) or MvdCpLX (control point motion vector difference), whichever is not used, may depend on whether affine motion compensation is used or not. For example, MvdLX can be initialized when affine motion compensation is used. Also, MvdCpLX can be initialized when affine motion compensation is not used. For example, a signaling indicating whether affine motion compensation is used may exist. Referring to FIG. 40A and FIG.

40B, inter_affine_flag (inter affine flag) may be signaling indicating whether affine motion compensation is used. For example, when inter_affine_flag (inter affine flag) is 1, affine motion compensation may be used. Alternatively, MotionModelIdc may be signaling indicating whether affine motion compensation is used. For example, when MotionModelIdc is not 0, affine motion compensation may be used.

Also, according to an embodiment of the present disclosure, MvdLX or MvdCpLX, whichever is not used, may relate to which affine motion model is used. For example, MvdLX or MvdCpLX that is not used can be different depending on whether the 4-parameter affine model or the 6-parameter affine model is used. For example, depending on which affine motion model is used, MvdCpLX that is not used for cpIdx of MvdCpLX[x][y][cpIdx][compIdx] can be different. For example, when using the 4-parameter affine model, only a part of MvdCpLX[x][y][cpIdx][compIdx] can be used. Alternatively, when the 6-parameter affine model is not used, only a part of MvdCpLX[x][y][cpIdx][compIdx] can be used. Therefore, MvdCpLX that is not used can be initialized to a preset value. In this case, MvdCpLX that is not used may correspond to cpIdx used in the 6-parameter affine model and not used in the 4-parameter affine model. For example, when the 4-parameter affine model is used, a value in which cpIdx of MvdCpLX[x][y][cpIdx][compIdx] is 2 may not be used, and this may be initialized to a preset value. Also, as described above, signaling or a parameter indicating whether the 4-parameter affine model or the 6-parameter affine model is used may exist. For example, it can be known whether the 4-parameter affine model is used or the 6-parameter affine model is used by MotionModelIdc or cu_affine_type_flag. MotionModelIdc values of 1 and 2 may indicate that the 4-parameter affine model and the 6-parameter affine model are used, respectively. Referring to FIG. 40A and FIG. 40B, when MotionModelIdc is 1, it is possible to initialize MvdCpL0[x0][y0][2][0], MvdCpL0[x0][y0][2][1], MvdCpL1[x0][y0][2][0] and MvdCpL1[x0][y0][2][1] to preset values. Also, in this case, it is possible to use a condition when MotionModelIdc is not 2 instead of when MotionModelIdc is 1. The preset value may be 0.

Also, according to an embodiment of the present disclosure, MvdLX or MvdCpLX, whichever is not used, can be based on a value of mvd_l1_zero_flag (motion vector difference zero flag for the first reference picture list). For example, when mvd_l1_zero_flag is 1, it is possible to initialize MvdL1 and MvdCpL1 to preset values. Also, in this case, additional conditions may be considered. For example, MvdLX or MvdCpLX, whichever is not used, may be determined on the basis of mvd_l1_zero_flag and inter_pred_idc (information about the reference picture list). For example, when mvd_l1_zero_flag is 1 and inter_pred_idc is PRED_BI, it is possible to initialize MvdL1 and MvdCpL1 to preset values. For example, mvd_l1_zero_flag (motion vector difference zero flag for the first reference picture list) may be higher level signaling that may indicate that MVD values (e.g., MvdLX or MvdCpLX) for reference list L1 are 0. Signaling may mean a signal transmitted from the encoder to the decoder through the bitstream. The decoder may parse mvd_l1_zero_flag (motion vector difference zero flag for the first reference picture list) from the bitstream.

According to another embodiment of the present disclosure, it is possible to initialize all Mvd and MvdCp to preset values before performing mvd_coding for a certain block. In this case, mvd_coding may mean all mvd_codings for a certain CU. Therefore, parsing the mvd_coding syntax and initializing the determined Mvd or MvdCp value can be prevented from being generated, and the problem described above can be solved by initializing all Mvd and MvdCp values.

FIG. 41 is a diagram illustrating an AMVR-related syntax structure according to an embodiment of the present disclosure.

The embodiment of FIG. 41 may be based on the embodiment of FIG. 38.

As described with reference to FIG. 38, it may be checked whether at least one non-zero value exists among MvdLX (motion vector difference) and MvdCpLX (control point motion vector difference). In this case, MvdLX or MvdCpLX to be checked can be determined on the basis of mvd_l1_zero flag (a motion vector difference zero flag for the first reference picture list). Therefore, it is possible to determine whether or not parse AMVR-related syntax on the basis of mvd_l1_zero_flag. As described above, when mvd_l1_zero_flag is 1, it may indicate that MVDs (motion vector differences) for reference list L1 are 0 and thus, in this case, MvdL1 (motion vector difference for the first reference picture list) or MvdCpL1 (control point motion vector difference for first reference picture list) may not be considered. For example, when mvd_l1_zero_flag is 1, regardless of whether MvdL1 or MvdCpL1 is 0 or not, AMVR-related syntax can be parsed based on whether or not at least one value equal to 0 exists among MvdL0 (motion vector difference for the zeroth reference picture list) or MvdCpL0 (control point motion vector difference for the 0th reference picture list). According to an additional embodiment, the mvd_l1_zero_flag indicating that the MVDs for reference list L1 are 0 may only be for a block which is bi-prediction. Therefore, AMVR-related syntax can be parsed on the basis of mvd_l1_zero_flag and inter_pred_idc (information about the reference picture list). For example, MvdLX or MvdCpLX for judging whether or not at least one non-zero value exists on the basis of mvd_l1_zero_flag and inter_pred_idc (information about the reference picture list) may be determined. For example, MvdL1 or MvdCpL1 may not be considered on the basis of mvd_l1_zero_flag and inter_pred_idc. For example, when mvd_l1_zero_flag is 1 and inter_pred_idc is PRED_BI, MvdL1 or MvdCpL1 may not be considered. For example, when mvd_l1_zero_flag is 1 and inter_pred_idc is PRED_BI, the AMVR-related syntax can be parsed on the basis of whether or not at least one value of 0 exists among MvdL0 or MvdCpL0 regardless of whether MvdL1 or MvdCpL1 is 0.

Referring to FIG. 41, when mvd_l1_zero_flag is 1 and inter_pred_idc[x0][y0]==PRED_BI, an operation regardless of whether a non-zero value exists among MvdL1[x0][y0][0], MvdL1[x0][y0][1], MvdCpL1[x0][y0][0][0], MvdCpL1[x0][y0][0][1], MvdCpL1[x0][y0][1][0], MvdCpL1[x0][y0][1][1], MvdCpL1[x0][y0][2][0], and MvdCpL1[x0][y0][2][1] can be performed. For example, when mvd_l1_zero_flag is 1 and inter_pred_idc[x0][y0]==PRED_BI, if a non-zero value does not exist among MvdL0 or MvdCpL0, AMVR-related syntax may not be parsed even if the non-zero value exists among MvdL1[x0][y0][0], MvdL1[x0][y0][1], MvdCpL1[x0][y0][0][0], MvdCpL1[x0][y0][0][1], MvdCpL1[x0][y0][1][0], MvdCpL[x0][y0][1][1], MvdCpL1[x0][y0][2][0], and MvdCpL1[x0][y0][2][1].

Also, when mvd_l1_zero_flag is 0 or inter_pred_idc[x0][y0] !=PRED_BI, whether a non-zero value exists among MvdL1[x0][y0][0], MvdL1[x0][y0][1], MvdCpL1[x0][y0][0][0], MvdCpL1[x0][y0][0][1], MvdCpL[x0][y0][1][0], MvdCpL[x0][y0][1][1], MvdCpL1[x0][y0][2][0], and MvdCpL1[x0][y0][2][1] may be considered. For example, when mvd_l1_zero_flag is 0 or inter pred_idc[x0][y0] !=PRED_BI, if a non-zero value exists among MvdL1[x0][y0][0], MvdL1[x0][y0][1], MvdCpL1[x0][y0][0][0], MvdCpL1[x0][y0][0][1], MvdCpL1[x0][y0][1][0], MvdCpL1[x0][y0][1][1], MvdCpL1[x0][y0][2][0], and MvdCpL1[x0][y0][2][1], AMVR-related syntax can be parsed. For example, when mvd_l1_zero_flag is 0 or inter_pred_idc[x0][y0] !=PRED_BI, if a non-zero value exists among MvdL1[x0][y0][0], MvdL1[x0][y0][1], MvdCpL1[x0][y0][0][0], MvdCpL1[x0][y0][0][1], MvdCpL1[x0][y0][1][0], MvdCpL1[x0][y0][1][1], MvdCpL1[x0][y0][2][0], and MvdCpL1[x0][y0][2][1], AMVR-related syntax can be parsed even if both MvdL0 and MvdCpL0 are 0.

FIG. 42A and FIG. 42B illustrate an inter prediction-related syntax structure according to an embodiment of the present disclosure.

According to an embodiment of the present disclosure, mvd_l1_zero_flag (motion vector difference zero flag for the first reference picture list) may be signaling indicating that Mvd (motion vector difference) values for reference list L1 (first reference picture list) are 0. Also, this signaling may be signaled at a higher level than the current block. Therefore, Mvd values for reference list L1 in a plurality of blocks may be 0 on the basis of the mvd_l1_zero_flag value. For example, when the mvd_l1_zero_flag value is 1, the Mvd values for reference list L1 may be 0. Alternatively, the Mvd values for reference list L1 may be 0 on the basis of mvd_l1_zero_flag and inter_pred_idc (information about the reference picture list). For example, when mvd_l1_zero_flag is 1 and inter_pred_idc is PRED_BI, the Mvd values for reference list L1 may be 0. In this case, the Mvd values may be MvdL1[x][y][compIdx]. Also, in this case, the Mvd values may not mean control point motion vector differences. That is, in this case, the Mvd values may not mean MvdCp values.

According to another embodiment of the present disclosure, mvd_l1_zero_flag may be signaling indicating that the Mvd and MvdCp values for reference list L1 are 0. Also, this signaling may be signaled at a higher level than the current block. Therefore, the Mvd and MvdCp values for reference list L1 in a plurality of blocks may be 0. For example, when the mvd_l1_zero_flag value is 1, the Mvd and MvdCp values for reference list L1 may be 0 on the basis of the mvd_l1_zero_flag value. Alternatively, the Mvd and MvdCp values for reference list L1 may be 0 on the basis of the mvd_l1_zero_flag value, mvd_l1_zero_flag and inter_pred_idc. For example, when mvd_l1_zero_flag is 1 and inter_pred_idc is PRED_BI, the Mvd and MvdCp values for reference list L1 may be 0. In this case, the Mvd values may be MvdL1[x][y][compIdx]. Also, the MvdCp values may be MvdCpL1[x][y][cpIdx][compIdx].

Alternatively, the Mvd or MvdCp values of 0 may mean that the corresponding mvd_coding syntax structure is not parsed. That is, for example, when the value of mvd_l1_zero_flag is 1, the mvd_coding syntax structure corresponding to MvdL1 or MvdCpL1 may not be parsed. Also, when the mvd_l1_zero_flag value is 0, the mvd_coding syntax structure corresponding to MvdL1 or MvdCpL1 can be parsed.

According to an embodiment of the present disclosure, when the Mvd or MvdCp values are 0 on the basis of mvd_l1_zero_flag, signaling indicating MVP may not be parsed. Signaling indicating MVP may include mvp_l1_flag. Also, according to the description of mvd_l1_zero_flag described above, signaling of mvd_l1_zero_flag may mean indicating that it is 0 for both Mvd and MvdCp. For example, when a condition indicating that the Mvd or MvdCp values for reference list L1 is 0 is satisfied, signaling indicating MVP may not be parsed. In this case, signaling indicating MVP may be inferred to a preset value. For example, when signaling indicating MVP does not exist, its value may be inferred to be equal to 0. Also, when the condition indicating that the Mvd or MvdCp values are 0 on the basis of mvd_l1_zero_flag is not satisfied, signaling indicating MVP can be parsed. However, in this embodiment, when the Mvd or MvdCp values are 0, the degree of freedom in selecting MVP may be lost, and thus coding efficiency may be reduced.

More specifically, when the condition indicating that the Mvd or MvdCp values for reference list L1 are 0 is satisfied and affine MC is used, signaling indicating MVP may not be parsed. In this case, signaling indicating MVP may be inferred to a preset value.

Referring to FIG. 42A and FIG. 42B, when mvd_l1_zero_flag is 1 and the inter_pred_idc value is PRED_BI, mvp_l1_flag may not be parsed. Also, in this case, the value of mvp_l1_flag may be inferred to be equal to 0. Alternatively, when mvd_l1_zero_flag is 0 or the inter_pred_idc value is not PRED_BI, mvp_l1_flag can be parsed.

In this embodiment, determining whether or not to parse signaling indicating MVP on the basis of mvd_l1_zero_flag can occur when a specific condition is satisfied. For example, the specific condition may include a condition in which general_merge_flag is 0. For example, general_merge_flag may have the same meaning as merge_flag described above. Also, the specific condition may include a condition based on CuPredMode. More specifically, the specific condition may include a condition in which CuPredMode is not MODE_IBC. Alternatively, the specific condition may include a condition in which CuPredMode is MODE_INTER. When CuPredMode is MODE_IBC, it is possible to use prediction with the current picture as a reference. Also, when CuPredMode is MODE_IBC, a block vector or motion vector corresponding to the block may exist. When CuPredMode is MODE_INTER, it is possible to use prediction with a picture other than the current picture as a reference. When CuPredMode is MODE_INTER, a motion vector corresponding to the block may exist.

Therefore, according to the embodiment of the present disclosure, when general_merge_flag is 0, CuPredMode is not MODE_IBC, mvd_l1_zero_flag is 1, and inter_pred_idc is PRED_BI, mvp_l1_flag may not be parsed. Also, when mvp_l1_flag does not exist, its value can be inferred to be equal to 0.

More specifically, when general_merge_flag is 0, CuPredMode is not MODE_IBC, mvd_l1_zero_flag is 1, inter_pred_idc is PRED_BI, and affine MC is used, mvp_l1_flag may not be parsed. Also, when mvp_l1_flag does not exist, its value can be inferred to be equal to 0.

Referring to FIG. 42A and FIG. 42B, sym_mvd_flag may be signaling indicating symmetric MVD. In the case of symmetric MVD, another MVD may be determined on the basis of a certain MVD. In the case of symmetric MVD, another MVD may be determined on the basis of explicitly signaled MVD. For example, in the case of symmetric MVD, MVD for another reference list may be determined on the basis of MVD for one reference list. For example, in the case of symmetric MVD, MVD for reference list L1 may be determined on the basis of MVD for reference list L0. When determining another MVD based on a certain MVD, it is possible to determine a value obtained by inverting the sign of the certain MVD as the other MVD.

FIG. 43A and FIG. 43B illustrate an inter prediction-related syntax structure according to an embodiment of the present disclosure.

The embodiment of FIG. 43A and FIG. 43B may be an embodiment for solving the problem described with reference to FIG. 42A and FIG. 42B.

According to an embodiment of the present disclosure, when the Mvd (motion vector difference) or MvdCp (control point motion vector difference) values are 0 on the basis of mvd_l1_zero_flag (motion vector difference zero flag for the first reference picture list), it is possible to parse signaling indicating MVP (motion vector predictor). Signaling indicating MVP may include mvp_l1_flag (motion vector predictor index for the first reference picture list). Also, according to the description of mvd_l1_zero_flag described above, mvd_l1_zero_flag signaling may mean indicating that it is 0 for both Mvd and MvdCp. For example, when the condition indicating that the Mvd or MvdCp values for reference list L1 (first reference picture list) is 0 is satisfied, signaling indicating the MVP may be parsed. Therefore, signaling indicating MVP may not be inferred. Therefore, even when the Mvd or MvdCp value is 0 on the basis of mvd_l1_zero_flag, it is possible to have the degree of freedom in selecting MVP. Therefore, coding efficiency may be improved. Also, even when the condition indicating that Mvd or MvdCp values are 0 is not satisfied on the basis of mvd_l1_zero_flag, signaling indicating MVP can be parsed.

More specifically, when the condition indicating that the Mvd or MvdCp values for reference list L1 are 0 is satisfied and affine MC is used, signaling indicating MVP can be parsed.

Referring to line 4301 of FIG. 43A, information inter_pred_idc about the reference picture list for the current block may be obtained. Referring to line 4302, when information inter_pred_idc about the reference picture list indicates that only the zeroth reference picture list list 0 is not used, motion vector predictor index mvp_l1_flag of the first reference picture list list 1 can be parsed from the bitstream, at line 4303.

The mvd_l1_zero_flag (motion vector difference zero flag) can be obtained from the bitstream. The mvd_l1_zero_flag (motion vector difference zero flag) can indicate whether or not MvdLX (motion vector difference) and MvdCpLX (plural control point motion vector differences) are set to 0 for the first reference picture list. Signaling may mean a signal transmitted from the encoder to the decoder through the bitstream. The decoder may parse mvd_l1_zero_flag (motion vector difference zero flag) from the bitstream.

When mvd_l1_zero_flag (motion vector difference zero flag) is 1 and inter_pred_idc (information about the reference picture list) is PRED_BI, mvp_l1_flag (motion vector predictor index) can be parsed. Here, PRED_BI may indicate that both list 0 (zeroth reference picture list) and list 1 (first reference picture list) are used. Alternatively, when mvd_l1_zero_flag (motion vector difference zero flag) is 0 or inter_pred_idc (information about the reference picture list) is not PRED_BI, mvp_l1_flag (motion vector predictor index) can be parsed. That is, when mvd_l1_zero_flag (motion vector difference zero flag) is 1, regardless of whether inter_pred_idc (information about the reference picture list) indicates that both the zeroth reference picture list and the first reference picture list are used, mvp_l1_flag (motion vector predictor index) can be parsed.

In this embodiment, determining Mvd and MvdCp on the basis of mvd_l1_zero_flag (motion vector difference zero flag of the first reference picture list) and parsing signaling indicating MVP can occur when a specific condition is satisfied. For example, the specific condition may include a condition in which general_merge_flag is 0. For example, general_merge_flag may have the same meaning as merge flag described above. Also, the specific condition may include a condition based on CuPredMode. More specifically, the specific condition may include a condition in which CuPredMode is not MODE_IBC. Alternatively, the specific condition may include a condition in which CuPredMode is MODE_INTER. When CuPredMode is MODE_IBC, it is possible to use prediction with the current picture as a reference. Also, when CuPredMode is MODE_IBC, a block vector or motion vector corresponding to the block may exist. If CuPredMode is MODE_INTER, it is possible to use prediction with a picture other than the current picture as a reference. When CuPredMode is MODE_INTER, a motion vector corresponding to the block may exist.

Therefore, according to the embodiment of the present disclosure, when general_merge_flag is 0, CuPredMode is not MODE_IBC, mvd_l1_zero_flag is 1, and inter_pred_idc is PRED_BI, mvp_l1_flag may be parsed. Therefore, mvp_l1_flag (motion vector predictor index for the first reference picture list) exists, and its value may not be inferred.

More specifically, when general_merge_flag is 0, CuPredMode is not MODE_IBC, mvd_l1_zero_flag (motion vector difference zero flag for the first reference picture list) is 1, inter_pred_idc (information about the reference picture list) is PRED_BI, and affine MC is used, mvp_l1_flag can be parsed. Also, mvp_l1_flag (motion vector predictor index for the first reference picture list) exists, and its value may not be inferred.

It is also possible to implement the embodiment of FIGS. 43, 40A and 40B together. For example, it is possible to parse mvp_l1_flag after initializing Mvd or MvdCp. In this case, initialization of Mvd or MvdCp may be the initialization described with reference to FIG. 40A and FIG. 40B. Also, mvp_l1_flag parsing may follow the description of FIG. 43A and FIG. 43B. For example, when the Mvd and MvdCp values for reference list L1 are not 0 based on mvd_l1_zero_flag, if the MotionModelIdc value is 1, the MvdCpL1 values of the control point index 2 may be initialized and the mvp_l1 flag can be parsed.

FIG. 44A and FIG. 44B illustrate an inter prediction-related syntax structure according to an embodiment of the present disclosure.

The embodiment of FIG. 44A and FIG. 44B may be an embodiment for increasing coding efficiency by not removing the degree of freedom in selecting MVP. Also, the embodiment of FIG. 44A and FIG. 44B may be an embodiment obtained by describing the embodiment described with reference to FIG. 43A and FIG. 43B in a different manner. Therefore, a description redundant with the embodiment of FIG. 43A and FIG. 43B may be omitted.

In the embodiment of FIG. 44A and FIG. 44B, when it indicates that the Mvd or MvdCp value is 0 based on mvd_l1_zero_flag, signaling indicating MVP can be parsed. Signaling indicating MVP may include mvp_l1_flag.

FIG. 45A and FIG. 45B illustrate an inter prediction-related syntax according to an embodiment of the present disclosure.

According to an embodiment of the present disclosure, the inter prediction method may include skip mode, merge mode, inter mode, etc. According to an embodiment, a residual signal may not be transmitted in skip mode. Also, an MV determination method such as merge mode can be used in skip mode. Whether or not to use skip mode may be determined according to a skip flag. Referring to FIG. 33, whether or not to use skip mode can be determined according to a value of cu_skip_flag.

According to an embodiment, the motion vector difference may not be used in merge mode. A motion vector can be determined on the basis of a motion candidate index. Whether or not to use merge mode can be determined according to a merge flag. Referring to FIG. 33, whether or not to use merge mode can be determined according to a merge flag value. Also, it is possible to use merge mode when skip mode is not used.

In skip mode or merge mode, it is possible to selectively use one or more candidate list types. For example, it is possible to use a merge candidate or a subblock merge candidate. Also, the merge candidate can include a spatial neighboring candidate, a temporal candidate, etc. Also, the merge candidate may include a candidate using a motion vector for the entire current block (CU; coding unit). That is, the motion vector of each subblock belonging to the current block may include the same candidate. Also, the subblock merge candidate may include a subblock-based temporal MV, an affine merge candidate, etc. Also, the subblock merge candidate can include a candidate for which a different motion vector for each subblock of the current block (CU) can be used. The affine merge candidate may be a method constructed by a method of determining the control point motion vector of the affine motion prediction without using the motion vector difference when determining the control point motion vector. Also, the subblock merge candidate can include methods for determining a motion vector in units of subblocks in the current block. For example, the subblock merge candidate may include planar MV, regression based MV, STMVP, etc. in addition to the subblock-based temporal MV and affine merge candidate mentioned above.

According to an embodiment, a motion vector difference can be used in inter mode. A motion vector predictor can be determined on the basis of the motion candidate index, and a motion vector can be determined on the basis of a difference between the motion vector predictor and the motion vector difference. Whether or not to use inter mode can be determined according to whether or not other modes are used. In another embodiment, whether or not to use inter mode may be determined by a flag. FIG. 45A and FIG. 45B illustrate an example of using inter mode when skip mode and merge mode, which are other modes, are not used.

Inter mode may include AMVP mode, affine inter mode, etc. Inter mode may be mode for determining the motion vector on the basis of the motion vector predictor and the motion vector difference. Affine inter mode may be a method of using the motion vector difference when determining a control point motion vector of affine motion prediction.

Referring to FIG. 45A and FIG. 45B, it is possible to determine whether to use a subblock merge candidate or a merge candidate after skip mode or merge mode is determined. For example, when a specific condition is satisfied, merge_subblock_flag indicating whether or not the subblock merge candidate is used can be parsed. Also, the specific condition may be a condition related to block size. For example, it may be a condition related to a width, height, area, etc., and a combination of these may be used. Referring to FIG. 45A and FIG. 45B, for example, it may be a condition when the width and height of the current block (CU) are greater than or equal to a specific value. When parsing merge_subblock_flag, its value can be inferred to be equal to 0. If merge_subblock_flag is 1, the subblock merge candidate may be used, and if merge_subblock_flag is 0, the merge candidate may be used. When the subblock merge candidate is used, merge_subblock_idx, which is a candidate index, can be parsed, and when the merge candidate is used, merge_idx, which is a candidate index, can be parsed. In this case, when the maximum number of candidate lists is 1, parsing may not be performed. When merge_subblock_idx or merge_idx is not parsed, it can be inferred to be equal to 0.

FIG. 45A and FIG. 45B illustrate a coding unit function, in which intra prediction related content may be omitted, and FIG. 45A and FIG. 45B may illustrate a case inter prediction is determined.

Figure 46:
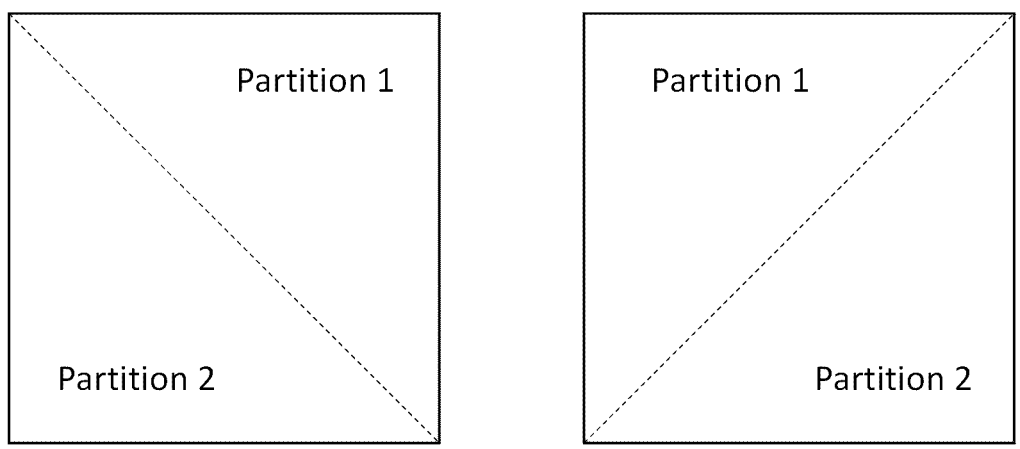
FIG. 46 is a diagram illustrating triangle partitioning mode according to an embodiment of the present invention.

FIG. 46 is a diagram illustrating triangle partitioning mode according to an embodiment of the present disclosure.

The triangle partitioning mode (TPM) mentioned in this disclosure may be called various names such as triangle partition mode, triangle prediction, triangle based prediction, triangle motion compensation, triangular prediction, triangle inter prediction, triangular merge mode, and triangle merge mode. Also, the TPM may be included in geometric partitioning mode (GPM).

As illustrated in FIG. 46, the TPM may be a method of dividing a rectangular block into two triangles. However, GPM can split a block into two blocks in various ways. For example, the GPM may split one rectangular block into two triangular blocks as illustrated in FIG. 46. Also, the GPM can split one rectangular block into one pentagonal block and one triangular block. Also, the GPM can split one rectangular block into two quadrangle blocks. Here, the rectangle may include a square. Hereinafter, for convenience of description, the description is made based on the TPM, which is a simple version of the GPM, but should be interpreted as including the GPM.

According to an embodiment of the present disclosure, uni-prediction may exist as a prediction method. The uni-prediction may be a prediction method using one reference list. A plurality of referent lists may exist, and according to an embodiment, two referent lists of L0 and L1 may exist. When using the uni-prediction, it is possible to use one reference list in one block. Also, when using the uni-prediction, it is possible to use one motion information to predict one pixel. In the present disclosure, a block may mean a coding unit (CU) or a prediction unit (PU). Also, in the present disclosure, a block may mean a transformation unit (TU).

According to another embodiment of the present disclosure, bi-prediction may exist as a method for prediction. The bi-prediction may be a prediction method using a plurality of reference lists. In an embodiment, the bi-prediction may be a prediction method using two reference lists. For example, the bi-prediction can use L0 and L1 reference lists. When using the bi-prediction, it is possible to use multiple reference lists in one block. For example, when using the bi-prediction, it is possible to use two reference lists in one block. Also, when using the bi-prediction, it is possible to use multiple motion information to predict one pixel.

The motion information can include a motion vector, a reference index, and a prediction list utilization flag.

The reference list may be a reference picture list.

In the present disclosure, motion information corresponding to the uni-prediction or bi-prediction may be defined as one motion information set.

According to an embodiment of the present disclosure, it is possible to use a plurality of motion information sets when using the TPM. For example, when using the TPM, it is possible to use two motion information sets. For example, when using the TPM, it is possible to use at most two motion information sets. Also, the method in which two motion information sets are applied within a block using the TPM can be based on a position. For example, within a block for which the TPM is used, it is possible to use one motion information set for a preset position and use another motion information set for another preset position. Additionally, for another preset position, it is possible to use two motion information sets together. For example, for the other preset position, Prediction 3 based on Prediction 1, which is based on one motion information set, and Prediction 2, which is based on another motion information set, may be used for prediction. For example, Prediction 3 may be a weighted sum of Prediction 1 and Prediction 2.

Referring to FIG. 46, Partition 1 and Partition 2 may schematically represent the preset position and the other preset position. When using the TPM, one of two split methods can be used as illustrated in FIG. 46. The two split methods may include a diagonal split and an anti-diagonal split. The block can also be divided into two triangle-shaped partitions by splitting. As already described, the TPM can be included in the GPM. Since the GPM has already been described, a redundant description will be omitted.

According to an embodiment of the present disclosure, when using the TPM, it is possible to use only the uni-prediction for each partition. That is, it is possible to use one motion information for each partition. This may be to reduce memory access and complexity such as computational complexity. Therefore, it is possible to use only two motion information for each CU.

It is also possible to determine each motion information from the candidate list. According to an embodiment, the candidate list used for the TPM can be based on a merge candidate list. In another embodiment, the candidate list used for the TPM can be based on an AMVP candidate list. Therefore, it is possible to signal the candidate index in order to use the TPM. Also, for a block using the TPM, it is possible to encode, decode, and parse the candidate index as many as the number of partitions or at most the number of partitions in the TPM.

Also, even if a block is predicted on the basis of multiple motion information by the TPM, it is possible to perform transform and quantization on the entire block.

FIG. 47 is a diagram illustrating merge data syntax according to an embodiment of the present disclosure.

According to an embodiment of the present disclosure, the merge data syntax may include signaling related to various modes. The various modes may include regular merge mode, merge with MVD (MMVD), subblock merge mode, combined intra- and inter-prediction (CIIP), TPM, etc. Regular merge mode may be the same mode as merge mode in HEVC. Also, signaling indicating whether the various modes are used in the block may exist. Also, these signaling may be parsed as syntax elements or may be implicitly signaled. Referring to FIG. 47, signaling indicating whether regular merge mode, MMVD, subblock merge mode, CIIP, and TPM is used may be regular_merge_flag, mmvd_merge_flag (or mmvd_flag), merge_subblock_flag, ciip_flag (or mh_intra_flag), MergeTriangleFlag (or merge_triangle_flag), respectively.

According to an embodiment of the present disclosure, when merge mode is used, if it is signaled that all modes except for certain mode among various modes are not used, it can be determined to use the certain mode. Also, when merge mode is used, if it is signaled that at least one of modes except for a certain mode among the various modes is used, it can be determined that the certain mode is not used. Also, higher level signaling indicating whether mode can be used may exist. The higher level may be a unit including a block. The higher level may be a sequence, picture, slice, tile group, tile, CTU, etc. If higher level signaling indicating whether mode can be used indicates that it can be used, additional signaling indicating whether the mode is used may exist, and the mode may or may not be used. If higher level signaling indicating whether mode can be used indicates that it cannot be used, the mode may not be used. For example, when using merge mode, if it is signaled that all of regular merge mode, MMVD, subblock merge mode, and CIIP are not used, it can be determined to use the TPM. Also, when using the merge mode, if it is signaled that at least one of regular merge mode, MMVD, subblock merge mode, and CIIP is used, it can be determined not to use the TPM. Also, signaling indicating whether merge mode is used may exist. For example, signaling indicating whether to use merge mode may be general merge flag or merge flag. If merge mode is used, the merge data syntax as illustrated in FIG. 47 can be parsed.

Also, the block size that can be used for the TPM may be limited. For example, it is possible to use the TPM when both the width and height are 8 or more.

If the TPM is used, TPM-related syntax elements can be parsed. The TPM-related syntax elements can include signaling indicating a split method and signaling indicating a candidate index. The split method may mean a split direction. Multiple signaling (e.g., two signaling) indicating the candidate index may exist for a block using the TPM. Referring to FIG. 47, signaling indicating the split method may be merge_triangle_split_dir. Also, signaling indicating the candidate index may be merge_triangle_idx0 and merge_triangle_idx1.

In the present disclosure, the candidate indices for the TPM may be m and n. For example, candidate indices for Partition 1 and Partition 2 of FIG. 46 may be m and n, respectively. According to an embodiment, m and n can be determined based on signaling indicating the candidate index described with reference to FIG. 47. According to an embodiment of the present disclosure, one of m and n can be determined on the basis of one of merge_triangle_idx0 and merge_triangle_idx1, and the other one of m and n can be determined on the basis of both merge_triangle_idx0 and merge_triangle_idx1.

Alternatively, one of m and n can be determined on the basis of one of merge_triangle_idx0 and merge_triangle_idx1, and the other of m and n can be determined on the basis of the other of merge_triangle_idx0 and merge_triangle_idx1.

More specifically, it is possible that m is determined on the basis of merge_triangle_idx0 and n is determined on the basis of merge_triangle_idx0 (or m) and merge_triangle_idx1. For example, m and n can be determined as follows.

$$m = \text{merge\_triangle\_idx0}$$

$$n = \text{merge\_triangle\_idx1} + (\text{merge\_triangle\_idx1} >= m) ? 1 : 0$$

According to an embodiment of the present disclosure, m and n may not be the same. This is because, in TPM, when two candidate indices are the same, that is, when two motion information is the same, the effect of partitioning may not be obtained. Therefore, the above signaling method may be for reducing the number of signaling bits in a case of n>m when signaling n. Since m will not be n among all candidates, it can be excluded from signaling.

If the candidate list used in the TPM is mergeCandList, mergeCandList[m] and mergeCandList[n] can be used as motion information in the TPM.

FIG. 48 is a diagram illustrating higher level signaling according to an embodiment of the present disclosure.

According to an embodiment of the present disclosure, multiple higher level signaling may exist. Higher level signaling may be signaling transmitted in a higher level unit. The higher level unit may include one or more lower level units. Higher level signaling may be signaling applied to one or more lower level units. For example, a slice or sequence may be a higher level unit for a CU, PU, TU, or the like. In contrast, the CU, PU, or TU may be a low level unit for the slice or sequence.

According to an embodiment of the present disclosure, higher level signaling may include signaling indicating the maximum number of candidates. For example, higher level signaling may include signaling indicating the maximum number of merge candidates. For example, higher level signaling may include signaling indicating the maximum number of candidates used in the TPM. Signaling indicating the maximum number of merge candidates or signaling indicating the maximum number of candidates used in the TPM can be signaled and parsed when inter prediction is allowed. Whether inter prediction is allowed can be determined by a slice type. As the slice types, I, P, B, etc. may exist. For example, when the slice type is I, inter prediction may not be allowed. For example, when the slice type is I, only intra prediction or intra block copy IBC can be used. Also, when the slice type is P or B, inter prediction can be allowed. Also, when the slice type is P or B, intra prediction, IBC, etc. can be allowed. Also, when the slice type is P, it is possible to use at most one reference list to predict pixels. Also, when the slice type is B, it is possible to use multiple reference lists to predict pixels. For example, if the slice type is B, it is possible to use two reference lists to predict pixels.

According to an embodiment of the present disclosure, when signaling a maximum number, it is possible to signal on the basis of a reference value. For example, it is possible to signal (reference value−maximum number). Therefore, it is possible to derive the maximum number on the basis of the value obtained by parsing by the decoder and the reference value. For example, (reference value−value obtained by parsing) can be determined as the maximum number.

According to an embodiment, a reference value in signaling indicating the maximum number of the merge candidates may be 6.

According to an embodiment, the reference value in signaling indicating the maximum number of candidates used in the TPM may be a maximum number of the merge candidates.

Referring to FIG. 48, signaling indicating the maximum number of merge candidates may be six_minus_max_num_merge_cand. Here, the merge candidate may mean a candidate for merge motion vector prediction. Hereinafter, for convenience of description, six_minus_max_num_merge_cand is also called first information. Referring to FIGS. 2 and 7, signaling may mean a signal transmitted from the encoder to the decoder through the bitstream. The six_minus_max_num_merge_cand (first information) may be signaled in units of sequences. The decoder can parse six_minus_max_num_merge_cand (first information) from the bitstream.

Also, signaling indicating the maximum number of candidates used in the TPM can be max_num_merge_cand_minus_max_num_triangle_cand. Referring to FIGS. 2 and 7, signaling may mean a signal transmitted from the encoder to the decoder through the bitstream. The decoder can parse max_num_merge_cand_minus_max_num_triangle_cand (third information) from the bitstream. The max_num_merge_cand_minus_max_num_triangle_cand (third information) may be information related to the maximum number of merge mode candidates for a partitioned block.

Also, the maximum number of merge candidates may be MaxNumMergeCand (maximum number of merge candidates), and this value may be based on six_minus_max_num_merge_cand (first information). Also, the maximum number of candidates used in the TPM may be MaxNumTriangleMergeCand, and this value may be based on max_num_merge_cand_minus_max_num_triangle_cand. MaxNumMergeCand (maximum number of merge candidates) can be used for merge mode, and is information that can be used when a block is partitioned or not partitioned for motion compensation. In the above, the description has been made based on the TPM, but the GPM may also be described in the same manner.

According to an embodiment of the present disclosure, higher level signaling indicating whether the TPM mode can be used may exist. Referring to FIG. 48, higher level signaling indicating whether the TPM mode can be used may be sps_triangle_enabled_flag (second information). Information indicating whether or not TPM mode can be used may be the same as information indicating whether or not the block can be partitioned as illustrated in FIG. 46 for inter prediction. Since the GPM includes the TPM, information indicating whether or not a block can be partitioned may be the same as the information indicating whether or not to use GPM mode. Performing inter prediction may indicate performing motion compensation. That is, sps_triangle_enabled_flag (second information) may be information indicating whether or not a block can be partitioned for inter prediction. When second information indicating whether or not the block can be partitioned is 1, it may indicate that the TPM or the GPM can be used. Also, when second information is 0, it may indicate that the TPM or the GPM cannot be used. However, the present disclosure is not limited thereto, and when second information is 0, it may indicate that the TPM or the GPM can be used. Also, when second information is 1, it may indicate that the TPM or the GPM cannot be used.

Referring to FIGS. 2 and 7, signaling may mean a signal transmitted from the encoder to the decoder through the bitstream. The decoder can parse sps_triangle_enabled_flag (second information) from the bitstream.

According to an embodiment of the present disclosure, it is possible to use the TPM only when candidates used in the TPM greater than or equal to the number of partitions of the TPM can exist. For example, when the TPM is partitioned into two partitions, it is possible to use the TPM only when two or more candidates used in the TPM can exis. According to an embodiment, the candidate used in the TPM may be based on the merge candidate. Therefore, according to an embodiment of the present disclosure, it may be possible to use the TPM when the maximum number of merge candidates is 2 or more. Therefore, when the maximum number of merge candidates is 2 or more, it is possible to parse signaling related to the TPM. Signaling related to the TPM may be signaling indicating the maximum number of candidates used in the TPM.

Referring to FIG. 48, when sps_triangle_enabled_flag is 1 and MaxNumMergeCand is 2 or more, it is possible to parse max_num_merge_cand_minus_max_num_triangle_cand.

Also, when sps_triangle_enabled_flag is 0 or MaxNum-

MergeCand is less than 2, it is possible not to parse max_num_merge_cand_minus_max_num_triangle_cand.

FIG. 49 is a diagram illustrating the maximum number of candidates used in TPM according to an embodiment of the present disclosure.

Referring to FIG. 49, the maximum number of candidates used in the TPM may be MaxNumTriangleMergeCand. Also, signaling indicating the maximum number of candidates used in the TPM may be max_num_merge_cand_minus_max_num_triangle_cand. Also, the contents described with reference to FIG. 48 may be omitted.

According to an embodiment of the present disclosure, the maximum number of candidates used in the TPM may exist in a range, from "the number of partitions of TPM" to "a reference value in signaling indicating the maximum number of candidates used in TPM", inclusive. Therefore, when the number of partitions of the TPM is 2 and the reference value is the maximum number of merge candidates, MaxNumTriangleMergeCand may exist in the range from 2 to MaxNumMergeCand, inclusive, as illustrated in FIG. 49.

According to an embodiment of the present disclosure, when signaling indicating the maximum number of candidates used in the TPM does not exist, it is possible to infer signaling indicating the maximum number of candidates used in the TPM or infer the maximum number of candidates used in the TPM. For example, when signaling indicating the maximum number of candidates used in the TPM does not exist, the maximum number of candidates used in the TPM can be inferred to be equal to 0. Alternatively, when signaling indicating the maximum number of candidates used in the TPM does not exist, signaling indicating the maximum number of candidates used in the TPM can be inferred to a reference value.

Also, when signaling indicating the maximum number of candidates used in the TPM does not exist, it is possible not to use the TPM. Alternatively, when the maximum number of candidates used in the TPM is less than the number of partitions in the TPM, it is possible not to use the TPM. Alternatively, when the maximum number of candidates used in the TPM is 0, it is possible not to use the TPM.

However, according to the embodiment of FIGS. 48 to 49, when the number of partitions of the TPM and "a reference value in signaling indicating the maximum number of candidates used in the TPM" are the same, there may be only one possible value as the maximum number of candidates used in the TPM. However, according to the embodiment of FIGS. 48 to 49, even in such a case, signaling indicating the maximum number of candidates used in the TPM may be parsed, which may be unnecessary. When MaxNumMergeCand is 2, referring to FIG. 49, a possible value as MaxNumTriangleMergeCand may be only 2. However, referring to FIG. 48, even in such a case, max_num_merge_cand_minus_max_num_triangle_cand can be parsed.

Referring to FIG. 49, MaxNumTriangleMergeCand can be determined as (MaxNumMergeCand−max_num_merge_cand_minus_max_num_triangle_cand).

FIG. 50 is a diagram illustrating higher level signaling related to the TPM according to an embodiment of the present disclosure.

According to an embodiment of the present disclosure, when the number of partitions of the TPM and the "reference value in signaling indicating the maximum number of candidates used in the TPM" are the same, signaling indicating the maximum number of candidates used in the TPM may not be parsed. Also, according to the embodiment described above, the number of partitions of the TPM may be 2. Also, the "reference value in signaling indicating the maximum number of candidates used in the TPM" may be the maximum number of merge candidates. Therefore, when the maximum number of merge candidates is 2, signaling indicating the maximum number of candidates used in the TPM may not be parsed.

Alternatively, when the "reference value in signaling indicating the maximum number of candidates used in the TPM" is less than or equal to the number of partitions in the TPM, signaling indicating the maximum number of candidates used in the TPM may not be parsed. Therefore, when the maximum number of merge candidates is 2 or less, signaling indicating the maximum number of candidates used in the TPM may not be parsed.

Referring to line 5001 of FIG. 50, when MaxNumMergeCand (maximum number of merge candidates) is 2 or MaxNumMergeCand (maximum number of merge candidates) is 2 or less, max_num_merge_cand_minus_max_num_triangle_cand (third information) may not be parsed. Also, when sps_triangle_enabled_flag (second information) is 1 and MaxNumMergeCand (maximum number of merge candidates) is greater than 2, max_num_merge_cand_minus_max_num_triangle_cand (third information) can be parsed. Also, when sps_triangle_enabled_flag (second information) is 0, max_num_merge_cand_minus_max_num_triangle_cand (third information) may not be parsed. Therefore, when sps_triangle_enabled_flag (second information) is 0 or MaxNumMergeCand (maximum number of merge candidates) is 2 or less, max_num_merge_cand_minus_max_num_triangle_cand (third information) may not be parsed.

FIG. 51 is a diagram illustrating a maximum number of candidates used in the TPM according to an embodiment of the present disclosure.

The embodiment of FIG. 51 can be implemented together with the case of the embodiment of FIG. 50. Also, descriptions of those described above may be omitted in this drawing.

According to an embodiment of the present disclosure, when the "reference value in signaling indicating the maximum number of candidates used in the TPM" is the number of partitions in the TPM, the maximum number of candidates used in the TPM may be inferred and set to the number of partitions of the TPM. Also, inferring and setting may be performed in a case where signaling indicating the maximum number of candidates used in the TPM does not exist. According to the embodiment of FIG. 50, when the "reference value in signaling indicating the maximum number of candidates used in the TPM" is the number of partitions in the TPM, signaling indicating the maximum number of candidates used in the TPM may not be parsed, and when signaling indicating the maximum number of candidates used in the TPM does not exist, the value of the maximum number of candidates used in the TPM may be inferred to be the number of partitions in the TPM. It is also possible to perform inferring and setting when an additional condition is satisfied. The additional condition may be a condition in which higher level signaling indicating whether the TPM mode can be used is 1.

Also, in this embodiment, although inferring and setting the maximum number of candidates used in the TPM has been described, it is also possible to infer and set signaling indicating the maximum number of candidates used in the TPM so that the maximum number value of the candidate used in the described TPM is derived, instead of inferring and setting the maximum number of candidates used in the TPM.

Referring to FIG. 50, when sps_triangle_enabled_flag (second information) indicates 1 and MaxNumMergeCand (maximum number of merge candidates) is greater than 2, max_num_merge_cand_minus_max_num_triangle_cand (third information) may be received. In this case, referring to line 5101 of FIG. 51, MaxNumTriangleMergeCand (maximum number of merge mode candidates for a partitioned block) may be obtained using clearly signaled max_num_merge_cand_minus_max_num_triangle_cand (third information). In summary, when sps_triangle_enabled_flag (second information) indicates 1 and MaxNumMergeCand (maximum number of merge candidates) is greater than or equal to 3, MaxNumTriangleMergeCand (maximum number of merge mode candidates for a patitioned block) may be obtained by subtracting third information (max_num_merge_cand_minus_max_num_triangle_cand) from MaxNumMergeCand (maximum number of merge candidates).

Referring to line 5102 of FIG. 51, when sps_triangle_enabled_flag (second information) is 1 and MaxNumMergeCand (maximum number of merge candidates) is 2, it is possible to set MaxNumTriangleMergeCand (maximum number of merge mode candidates for a partitioned block) to 2. More specifically, as already described, when sps_triangle_enabled_flag (second information) indicates 1 and MaxNumMergeCand (maximum number of merge candidates) is greater than 2, max_num_merge_cand_minus_max_num_triangle_cand (third information) can be received, and thus, as at line 5102, when sps_triangle_enabled_flag (second information) is 1 and MaxNumMergeCand (maximum number of merge candidates) is 2, max_num_merge_cand_minus_max_num_triangle_cand (third information) may not be received. In this case, MaxNumTriangleMergeCand (maximum number of merge mode candidates for a partitioned block) can be determined without max_num_merge_cand_minus_max_num_triangle_ cand (third information).

Also, referring to line 5103 of FIG. 51, when sps_triangle_enabled_flag (second information) is 0 or MaxNumMergeCand (maximum number of merge candidates) is not 2, it is possible to infer and set MaxNumTriangleMergeCand (maximum number of merge mode candidates for a partitioned block) to 0. In this case, as already described with reference to line 5101, when sps_triangle_enabled_flag (second information) indicates 1 and MaxNumMergeCand (maximum number of merge candidates) is greater than or equal to 3, max_num_merge_cand_minus_max_num_triangle_cand (third information) may be signaled, and thus a case where MaxNumTriangleMergeCand is inferred and set to 0 may be a case where the second information is 0 or the maximum number of merge candidates is 1. In summary, when sps_triangle_enabled_flag (second information) is 0 or MaxNumMergeCand (maximum number of merge candidates) is 1, MaxNumTriangleMergeCand (maximum number of merge mode candidates for a partitioned block) can be set to 0.

MaxNumMergeCand (maximum number of merge candidates) and MaxNumTriangleMergeCand (maximum number of merge mode candidates for a partitioned block) can be used for different purposes. For example, MaxNumMergeCand (maximum number of merge candidates) can be used when a block is partitioned or not partitioned for motion compensation. However, MaxNumTriangleMergeCand (maximum number of merge mode candidates for a partitioned block) is information that can be used when the block is partitioned. The number of candidates for a partitioned block, which is in merge mode, cannot exceed MaxNum-TriangleMergeCand (maximum number of merge mode candidates for a partitioned block).

It is also possible to use another embodiment. In the embodiment of FIG. 51, the case where MaxNumMergeCand is not 2 includes a case where MaxNumMergeCand is greater than 2, and in that case, the meaning of inferring and setting MaxNumTriangleMergeCand to 0 may be unclear, but in such a case, since signaling indicating the maximum number of candidates used in the TPM exists, inferring is not performed, and accordingly, there is no problem in operation. However, in this embodiment, inferring can be performed by making use of the meaning.

If sps_triangle_enabled_flag (second information) is 1 and MaxNumMergeCand (maximum number of merge candidates) is 2 or more, it is possible to infer and set MaxNumTriangleMergeCand to 2 (or MaxNumMergeCand). Otherwise (that is, when sps_triangle_enabled_flag is 0 or MaxNumMergeCand is less than 2), it is possible to infer and set MaxNumTriangleMergeCand to 0.

Alternatively, if sps_triangle_enabled_flag is 1 and MaxNumMergeCand is 2, it is possible to infer and set MaxNumTriangleMergeCand to 2. Otherwise, if sps_triangle_enabled_flag is 0, it is possible to infer and set MaxNumTriangleMergeCand to 0.

Therefore, according to the embodiment of FIG. 50 in the above embodiments, when MaxNumMergeCand is 0 or 1 or 2, signaling indicating the maximum number of candidates used in the TPM may not exist, and when MaxNumMergeCand is 0 or 1, the maximum number of candidates used in the TPM can be inferred and set to 0. When MaxNumMergeCand is 2, the maximum number of candidates used in the TPM may be inferred and set to 2.

FIG. 52 is a diagram illustrating TPM-related syntax elements according to an embodiment of the present disclosure.

As described above, the maximum number of candidates used in the TPM may exist, and the number of partitions of the TPM may be preset. Also, candidate indices used in the TPM may be different.

According to an embodiment of the present disclosure, when the maximum number of candidates used in the TPM is the same as the number of partitions in the TPM, signaling different from the case where they are not the same can be performed. For example, when the maximum number of candidates used in the TPM is the same as the number of partitions in the TPM, signaling different from the case where they are not the same can be performed. Accordingly, it is possible to signal with fewer bits. Alternatively, when the maximum number of candidates used in the TPM is less than or equal to the number of partitions of the TPM, signaling different from the case where the maximum number of candidates is greater than the number of partitions can be performed (Of these, when the number of partitions is smaller than the number of partitions of the TPM, it may be the case that the TPM cannot be used).

When there are two partitions of the TPM, two candidate indices can be signaled. If the maximum number of candidates used in the TPM is 2, there may be only two possible candidate index combinations. The two combinations may be a combination in which m and n are 0 and 1, respectively, and a combination in which m and n are 1 and 0, respectively. Therefore, two candidate indices can be signaled only by 1-bit signaling.

Referring to FIG. 52, when MaxNumTriangleMergeCand is 2, candidate index signaling different from the case where it is not (otherwise, when TPM is used, the case where MaxNumTriangleMergeCand is greater than 2) can be performed. Alternatively, when MaxNumTriangleMergeCand is 2 or less, candidate index signaling different from the case where it is not (otherwise, when TPM is used, the case where MaxNumTriangleMergeCand is greater than 2) can be performed. Different candidate index signaling may be merge_triangle_idx_indicator parsing when referring to FIG. 52. Different candidate index signaling may be a signaling method that does not parse merge_triangle_idx0 or merge_triangle_idx1. This will be further described with reference to FIG. 53.

FIG. 53 is a diagram illustrating signaling of a TPM candidate index according to an embodiment of the present disclosure.

According to an embodiment of the present disclosure, when index signaling different from that described with reference to FIG. 52 is used, a candidate index may be determined based on merge_triangle_idx_indicator. Also, when different index signaling is used merge_triangle_idx0 or merge_triangle_idx1 may not exist.

According to an embodiment of the present disclosure, when the maximum number of candidates used in the TPM is the same as the number of partitions in the TPM, the TPM candidate index can be determined on the basis of merge_triangle_idx_indicator. Also, this may be a case of a block using the TPM.

More specifically, when MaxNumTriangleMergeCand is 2 (or when MaxNumTriangleMergeCand is 2 and MergeTriangleFlag is 1), the TPM candidate index may can be determined on the basis of merge_triangle_idx_indicator. In this case, if merge_triangle_idx_indicator is 0, m and n, which are TPM candidate indices, can be set to 0 and 1, respectively, and if merge_triangle_idx_indicator is 1, m and n, which are TPM candidate indices, can be set to 1 and 0, respectively. Alternatively, merge_triangle_idx0 or merge_triangle_idx1, which is a value (syntax element) that can be parsed such that m and n are the same as those described, can be inferred and set.

Referring to the method of setting m and n on the basis of merge_triangle_idx0 and merge_triangle_idx1 described in FIG. 47 and referring to FIG. 53, when merge_triangle_idx0 does not exist, if MaxNumTriangleMergeCand is 2 and merge_triangle_idx_indicator is 1 (or if MaxNumTriangleMergeCand is 2 and MergeTriangleFlag is 1), the merge_triangle_idx0 value can be inferred to be equal to 1. Also, otherwise, the value of merge_triangle_idx0 may be inferred to be equal to 0. Also, when merge_triangle_idx1 does not exist, merge_triangle_idx1 can be inferred to be equal to 0. Therefore, if MaxNumTriangleMergeCand is 2, when merge_triangle_idx_indicator is 0, merge_triangle_idx0 and merge_triangle_idx1 are 0 and 0, respectively, and accordingly, m and n can be 0 and 1, respectively. Also, if MaxNumTriangleMergeCand is 2, when merge_triangle_idx_indicator is 1, merge_triangle_idx0 and merge_triangle_idx1 are 1 and 0, respectively, and accordingly, m and n can be 1 and 0, respectively.

FIG. 54 is a diagram illustrating signaling of a TPM candidate index according to an embodiment of the present disclosure.

The method of determining TPM candidate indices has been described with reference to FIG. 47, but another determination method and a signaling method are described in the embodiment of FIG. 54. A description that is redundant with that described above may be omitted. Also, m and n may represent candidate indices as described with reference to FIG. 47.

According to an embodiment of the present disclosure, a smaller value among m and n can be signaled to a preset syntax element among merge_triangle_idx0 and merge_triangle_idx1. Also, a value based on the difference between m and n may be signaled to the other one of merge_triangle_idx0 and merge_triangle_idx1. Also, it is possible to signal a value indicating a magnitude relationship of m and n.

For example, merge_triangle_idx0 may be a smaller value of m and n. Also, merge_triangle_idx1 may be a value based on |m−n|. The merge_triangle_idx1 may be (|m−n|−1). This is because m and n may not be the same. Also, a value representing the magnitude relationship between m and n may be merge_triangle_bigger of FIG. 54.

Using this relationship, m and n may be determined on the basis of merge_triangle_idx0, merge_triangle_idx1, and merge_triangle_bigger. Referring to FIG. 54, another operation may be performed on the basis of the merge_triangle_bigger value. For example, when merge_triangle_bigger is 0, n may be greater than m. In this case, m may be merge_triangle_idx0. Also, n may be (merge_triangle_idx1+m+1). Also, when merge_triangle_bigger is 1, m may be greater than n. In this case, n may be merge_triangle_idx0. Also, m may be (merge_triangle_idx1+n+1).

The method in FIG. 54 has an advantage in that signaling overhead can be reduced when the small valueer of m and n is not 0 (or larger), compared to the method in FIG. 47. For example, when m and n are 3 and 4, respectively, in the method of FIG. 47, merge_triangle_idx0 and merge_triangle_idx1 may need to be signaled as 3 and 3, respectively. However, in the method of FIG. 54, when m and n are 3 and 4, respectively, merge_triangle_idx0 and merge_triangle_idx1 may need to be signaled as 3 and 0, respectively (in addition to this, signaling indicating a magnitude relationship may be required). Therefore, when variable length signaling is used, it is possible to use fewer bits because the size of encoding and decoding values is reduced.

FIG. 55 is a diagram illustrating signaling of a TPM candidate index according to an embodiment of the present disclosure.

The method of determining TPM candidate indices has been described with reference to FIG. 47, but another determination method and a signaling method will be described in the embodiment of FIG. 55. A description that is redundant with that described above may be omitted. Also, m and n may represent candidate indices as described with reference to FIG. 47.

According to an embodiment of the present disclosure, a value based on a larger value among m and n may be signaled to a preset syntax element among merge_triangle_idx0 and merge_triangle_idx1. Also, a value based on a smaller value among m and n may be signaled to the other one of merge_triangle_idx0 and merge_triangle_idx1. Also, it is possible to signal a value indicating the magnitude relationship of m and n.

For example, merge_triangle_idx0 can be based on the larger value among m and n. According to an embodiment, since m and n are not equal, the larger value among m and n will therefore be greater than or equal to 1. Therefore, it is possible to signal with fewer bits considering that a larger value among m and n, which is 0, is excluded. For example, merge_triangle_idx0 may be ((larger value among m and n)−1). In this case, the maximum value of merge_triangle_idx0 may be (MaxNumTriangleMergeCand−1−1) (−1 because it is a value starting from 0, and −1 because a larger value of 0 can be excluded). The maximum value can be used in binarization, and when the maximum value is reduced, there may be cases where fewer bits are used. Also, merge_triangle_idx1 may be a smaller value among m and n. Also, the maximum value of merge_triangle_idx1 may be merge_triangle_idx0. Therefore, there may be a case where fewer bits than setting the maximum value to MaxNumTriangleMergeCand are used. Also, when merge_triangle_idx0 is 0, that is, when the larger value among m and n is 1, the smaller value among m and n is 0, and thus additional signaling may not exist. For example, when merge_triangle_idx0 is 0, that is, when the larger value among m and n is 1, the smaller value among m and n can be determined as 0. Alternatively, when merge_triangle_idx0 is 0, that is, when the larger value among m and n is 1, merge_triangle_idx1 can be inferred to be equal to and determined as 0. Referring to FIG. 22, it is possible to determine whether or not to parse merge_triangle_idx1 on the basis of merge_triangle_idx0. For example, when merge_triangle_idx0 is greater than 0, merge_triangle_idx1 can be parsed, and when merge_triangle_idx0 is 0, merge_triangle_idx1 may not be parsed.

Also, a value representing the magnitude relationship of m and n may be merge_triangle_bigger of FIG. 55.

Using this relationship, m and n can be determined on the basis of merge_triangle_idx0, merge_triangle_idx1, and merge_triangle_bigger. Referring to FIG. 55, another operation may be performed on the basis of the value of merge triangle bigger. For example, when merge_triangle_bigger is 0, m may be greater than n. In this case, m may be (merge_triangle_idx0+1). Also, n may be merge_triangle_idx1. Also, when merge triangle bigger is 1, n may be greater than m. In this case, n may be (merge_triangle_idx0+1). Also, m may be merge_triangle_idx1. Also, when merge_triangle_idx1 does not exist, its value can be inferred to be equal to 0.

The method in FIG. 55 has an advantage in that signaling overhead can be reduced according to m and n values, compared to the method in FIG. 47. For example, when m and n are 1 and 0, respectively, in the method of FIG. 47, merge_triangle_idx0 and merge_triangle_idx1 may need to be signaled as 1 and 0, respectively. However, in the method of FIG. 55, when m and n are 1 and 0, respectively, merge_triangle_idx0 and merge_triangle_idx1 may need to be signaled as 0 and 0, respectively, but merge_triangle_idx1 can be inferred without encoding or parsing (in addition to this, signaling indicating the magnitude relationship may be required). Therefore, when variable length signaling is used, it is possible to use fewer bits because the size of encoding and decoding values is reduced. Alternatively, when m and n are 2 and 1, respectively, it may be need to signal merge_triangle_idx0 and merge_triangle_idx1 as 2 and 1 respectively, in the method of FIG. 47, and merge_triangle_idx0 and merge_triangle_idx1 as 1 and 1, respectively, in the method of FIG. 55. However, in this case, in the method of FIG. 55, since the maximum value of merge_triangle_idx1 is (3−1−1)=1, 1 can be signaled with fewer bits than when the maximum value is large. For example, the method of FIG. 55 may be a method having an advantage when the difference between m and n is small, for example, when the difference is 1.

It has also been described that merge_triangle_idx0 is referred to in order to determine whether or not to parse merge_triangle_idx1 in the syntax structure of FIG. 55, but it is also possible to determine whether or not to parse merge_triangle_idx1 on the basis of the larger value among m and n. That is, it can be classified into a case where the larger value among m and n is 1 or more and a case where it is not. However, in this case, merge_triangle_bigger parsing may need to occur prior to the determination of whether or not to parse merge_triangle_idx1.

In the above description, the configuration has been described through specific embodiments, but those skilled in the art can make modifications and changes without departing from the spirit and scope of the present disclosure. Therefore, what can be easily inferred by a person in the technical field to which the present disclosure belongs from the detailed description and embodiments of the present disclosure is construed as being fallen within the scope of right of the present disclosure.

What is claimed is:

1. A method for processing a video signal, comprising:
parsing, from a bitstream, a first syntax element indicating whether adaptive motion vector differential resolution is enabled; and
parsing, from the bitstream, a second syntax element indicating whether affine motion compensation is enabled;
when the first syntax element indicates that the adaptive motion vector differential resolution is enabled and the second syntax element indicates that the affine motion compensation is enabled, parsing, from the bitstream, a third syntax element indicating whether the adaptive motion vector differential resolution is enabled for the affine motion compensation.

2. The method of claim 1,
wherein at least one of the first syntax element, the second syntax element, and/or the third syntax element is signaled as a sequence unit.

3. The method of claim 1,
wherein, when the first syntax element indicates that the adaptive motion vector differential resolution is not enabled and the second syntax element indicates that the affine motion compensation is enabled, a value of the third syntax element is inferred as a value indicating that the adaptive motion vector differential resolution is not enabled for the affine motion compensation.

4. The method of claim 1,
wherein, when the second syntax element indicates that the affine motion compensation is not enabled, a value of the third syntax element is inferred as a value indicating that the adaptive motion vector differential resolution is not enabled for the affine motion compensation.

5. The method of claim 1, the method further comprising:
parsing, from the bitstream, a fourth syntax element indicating whether the affine motion compensation is used for a current block;
when the first syntax element indicates that the adaptive motion vector differential resolution is enabled, the fourth syntax element indicates that the affine motion compensation is not used for the current block and at least one of a plurality of motion vector differences for the current block is non-zero, parsing, from the bitstream, a fifth syntax element indicating a resolution of a motion vector difference; and
modifying the plurality of motion vector differences for the current block on the basis of the fifth syntax element.

6. The method of claim 1, the method further comprising:
parsing, from the bitstream, a fourth syntax element indicating whether the affine motion compensation is used for a current block;
when the third syntax element indicates that the adaptive motion vector differential resolution is enabled for the affine motion compensation, the fourth syntax element indicates that the affine motion compensation is used for the current block and at least one of a plurality of control point motion vector differences for the current block is non-zero, parsing, from the bitstream, a fifth syntax element indicating a resolution of a motion vector difference; and modifying the plurality of control point motion vector differences for the current block on the basis of the fifth syntax element.

7. The method of claim 1, the method further comprising:
parsing, from the bitstream, a sixth syntax element related to a reference picture list for a current block,
when the sixth syntax element indicates that a reference picture list other than a reference picture list 0 is available, parsing, from the bitstream, a seventh syntax element indicating a motion vector predictor index of a reference picture list 1.

8. The method of claim 7, the method further comprising:
parsing, from the bitstream, an eighth syntax element indicating whether a motion vector difference and a plurality of control point motion vector differences are set to zero for the reference picture list 1,
wherein the seventh syntax element is parsed regardless of the eighth syntax element.

9. A decoding apparatus for processing a video signal, the decoding apparatus comprising:
a processor,
wherein the processor is configured to:
parse, from a bitstream, a first syntax element indicating whether adaptive motion vector differential resolution is enabled,
parse, from the bitstream, a second syntax element indicating whether affine motion compensation is enabled, and
when the first syntax element indicates that the adaptive motion vector differential resolution is enabled and the second syntax element indicates that the affine motion compensation is enabled, parse, from the bitstream, a third syntax element indicating whether the adaptive motion vector differential resolution is enabled for the affine motion compensation.

10. The decoding apparatus of claim 9,
wherein at least one of the first syntax element, the second syntax element, and/or the third syntax element is signaled as a sequence unit.

11. The decoding apparatus of claim 9,
wherein, when the
first syntax element indicates that the adaptive motion vector differential resolution is not enabled and the second syntax element indicates that the affine motion compensation is enabled, a value of the third syntax element is inferred as a value indicating that the adaptive motion vector differential resolution is not enabled for the affine motion compensation.

12. The decoding apparatus of claim 9,
wherein, when the second syntax element indicates that the affine motion compensation is not enabled, a value of the third syntax element is inferred as a value indicating that the adaptive motion vector differential resolution is not enabled for the affine motion compensation.

13. The decoding apparatus of claim 9,
wherein the processor is configured to:
parse, from the bitstream, a fourth syntax element indicating whether the affine motion compensation is used for a current block,
when the first syntax element indicates that the adaptive motion vector differential resolution is enabled, the fourth syntax element indicates that the affine motion compensation is not used for the current block and at least one of a plurality of motion vector differences for the current block is non-zero, parse, from the bitstream, a fifth syntax element indicating a resolution of a motion vector difference, and
modify the plurality of motion vector differences for the current block on the basis of the fifth syntax element.

14. The decoding apparatus of claim 9,
wherein the processor is configured to:
parse, from the bitstream, a fourth syntax element indicating whether the affine motion compensation is used for a current block,
when the third syntax element indicates that the adaptive motion vector differential resolution is enabled for the affine motion compensation, the fourth syntax element indicates that the affine motion compensation is used for the current block and at least one of a plurality of control point motion vector differences for the current block is non-zero, parse, from the bitstream, a fifth syntax element indicating a resolution of a motion vector difference, and
modify the plurality of control point motion vector differences for the current block on the basis of the fifth syntax element.

15. The decoding apparatus of claim 9,
wherein the processor is configured to:
parse, from the bitstream, a sixth syntax element related to a reference picture list for a current block,
when the sixth syntax element indicates that a reference picture list other than a reference picture list 0 is available, parse, from the bitstream, a seventh syntax element indicating a motion vector predictor index of a reference picture list 1.

16. The decoding apparatus of claim 15,
wherein the processor is configured to:
parse, from the bitstream, an eighth syntax element indicating whether a motion vector difference and a plurality of control point motion vector differences are set to zero for the reference picture list 1,
wherein the seventh syntax element is parsed regardless of the eighth syntax element.

17. An encoding apparatus for processing a video signal, the encoding apparatus comprising:
a processor,
wherein the processor is configured to
obtain a bitstream to be decoded by a decoder using a decoding method,
wherein the decoding method comprising:
parsing, from the bitstream, a first syntax element indicating whether adaptive motion vector differential resolution is enabled;
parsing, from the bitstream, a second syntax element indicating whether affine motion compensation is enabled; and
when the first syntax element indicates that the adaptive motion vector differential resolution is enabled and the second syntax element indicates that the affine motion compensation is enabled, parsing, from the bitstream, a third syntax element indicating whether the adaptive motion vector differential resolution is enabled for the affine motion compensation.

18. The encoding apparatus of claim 17,
wherein at least one of the first syntax element, the second syntax element, and/or the third syntax element is signaled as a sequence unit.

19. The encoding apparatus of claim 17,
wherein when the first syntax element indicates that the adaptive motion vector differential resolution is not enabled and the second syntax element indicates that the affine motion compensation is enabled, a value of the third syntax element is inferred as a value indicating that the adaptive motion vector differential resolution is not enabled for the affine motion compensation.

20. A method for generating bitstream, comprising:
generating a first syntax element indicating whether adaptive motion vector differential resolution is enabled;
generating a second syntax element indicating whether affine motion compensation is enabled;
when the first syntax element indicates that the adaptive motion vector differential resolution is enabled and the second syntax element indicates that the affine motion compensation is enabled, generating a third syntax element indicating whether the adaptive motion vector differential resolution is enabled for the affine motion compensation; and
generating a bitstream including at least one of the first syntax element, the second syntax element, and/or the third syntax element.

\* \* \* \* \*